US009915827B2

(12) United States Patent
Gordon

(10) Patent No.: US 9,915,827 B2
(45) Date of Patent: Mar. 13, 2018

(54) SYSTEM, METHOD AND COMPUTER PROGRAM PRODUCT TO PROJECT LIGHT PATTERN

(71) Applicant: MANTISVISION LTD., Petach Tikva (IL)

(72) Inventor: Eyal Gordon, Haifa (IL)

(73) Assignee: MANTIS VISION LTD., Petach Tikva (IL)

( * ) Notice: Subject to any disclaimer, the term of this patent is extended or adjusted under 35 U.S.C. 154(b) by 8 days.

(21) Appl. No.: 14/822,961

(22) Filed: Aug. 11, 2015

(65) Prior Publication Data

US 2016/0050401 A1 Feb. 18, 2016

Related U.S. Application Data

(60) Provisional application No. 62/036,158, filed on Aug. 12, 2014.

(51) Int. Cl.
*G06K 9/20* (2006.01)
*G02B 27/42* (2006.01)
(Continued)

(52) U.S. Cl.
CPC ...... *G02B 27/4233* (2013.01); *G01B 11/2513* (2013.01); *G01C 3/02* (2013.01);
(Continued)

(58) Field of Classification Search
CPC .......... G06T 7/521; G06T 2207/10028; G01B 11/2545; G01B 11/22; G01B 11/167;
(Continued)

(56) References Cited

U.S. PATENT DOCUMENTS

| 4,175,862 A | * | 11/1979 | DiMatteo | G01B 11/245 250/558 |
| 8,090,194 B2 | * | 1/2012 | Golrdon | G01B 11/2513 382/154 |

(Continued)

OTHER PUBLICATIONS

Song Zhang et al., High-resolution, Real-time 3D Shape Acquisition, IEEE Computer Society, Proceedings of the 2004 IEEE Computer Society Conference on Computer Vision and Pattern Recognition Workshops (CVPRW'04), 2004, 10 pages total.*

(Continued)

*Primary Examiner* — Brian P Werner
(74) *Attorney, Agent, or Firm* — Vladimir Sherman; Professional Patent Solutions Ltd.

(57) ABSTRACT

Disclosed are methods, circuits, optical assemblies, devices, systems and associated computer executable code for estimating for three dimensional imaging. According to some embodiments, there may be provided a projector operable to project a bi-dimensionally coded pattern to provide a first projection of the bi-dimensionally coded pattern and a second projection of the bi-dimensionally coded pattern. The first projection and the second projection may be offset or rigidly shifted with respect to one another, such that a first reflection off an object which is associated with the first projection and a second reflection off the object which is associated with the second projection are provided. A signal corresponding to the first reflection and a signal corresponding to the second reflection may be co-processed.

38 Claims, 42 Drawing Sheets

(51) Int. Cl.
  *G01B 11/25* (2006.01)
  *G01C 3/02* (2006.01)
  *G02B 27/00* (2006.01)
  *G02B 27/09* (2006.01)
  *H04N 5/33* (2006.01)
  *H04N 13/02* (2006.01)
  *G03B 21/10* (2006.01)
  *G03B 21/606* (2014.01)

(52) U.S. Cl.
  CPC ......... *G02B 27/0037* (2013.01); *G02B 27/09* (2013.01); *G06K 9/2036* (2013.01); *H04N 5/332* (2013.01); *H04N 13/0253* (2013.01); *G03B 21/10* (2013.01); *G03B 21/606* (2013.01)

(58) Field of Classification Search
  CPC ........... G06K 9/2036; G06K 2209/401; H04N 13/0253; H04N 2013/0081
  See application file for complete search history.

(56) References Cited

U.S. PATENT DOCUMENTS

2013/0250066 A1* 9/2013 Abraham ........... H04N 13/0203
  348/46
2015/0022642 A1* 1/2015 Appia ................ H04N 13/0007
  348/48

* cited by examiner

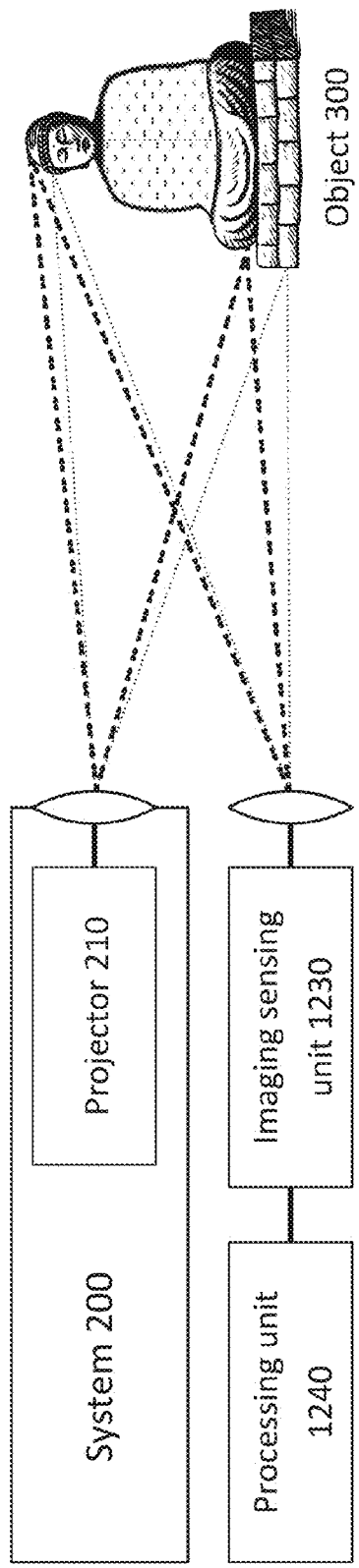
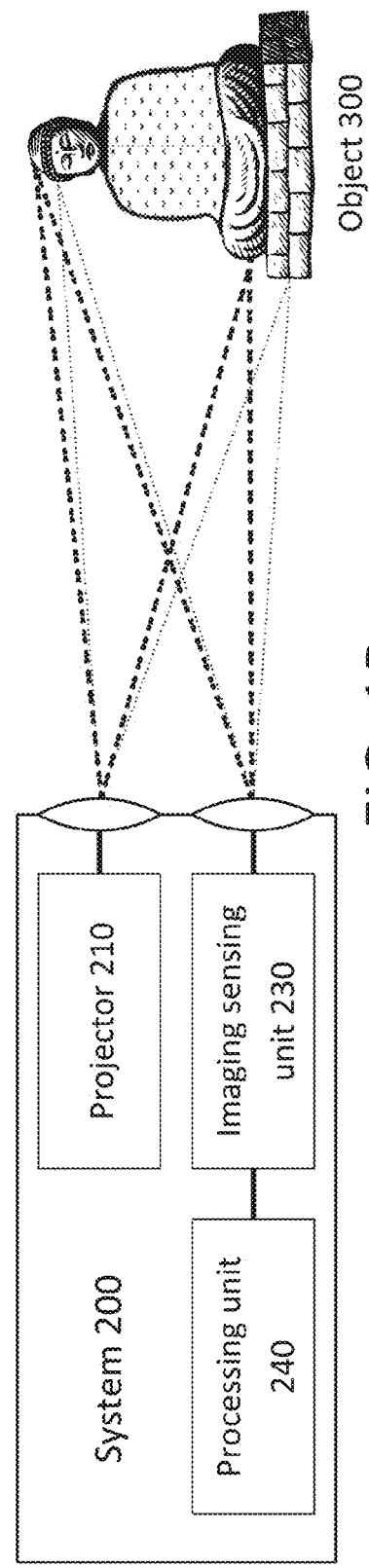

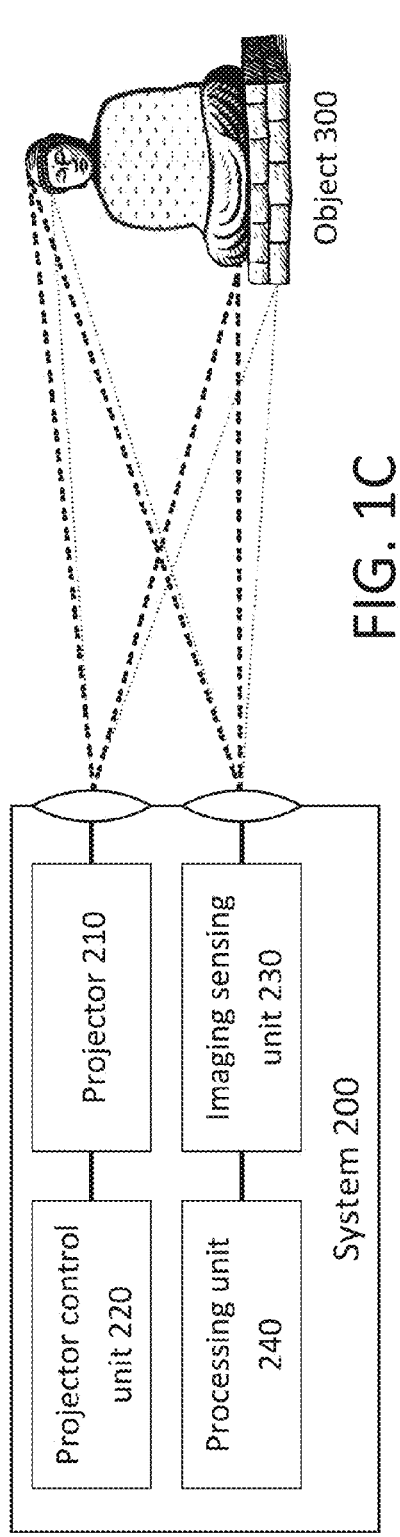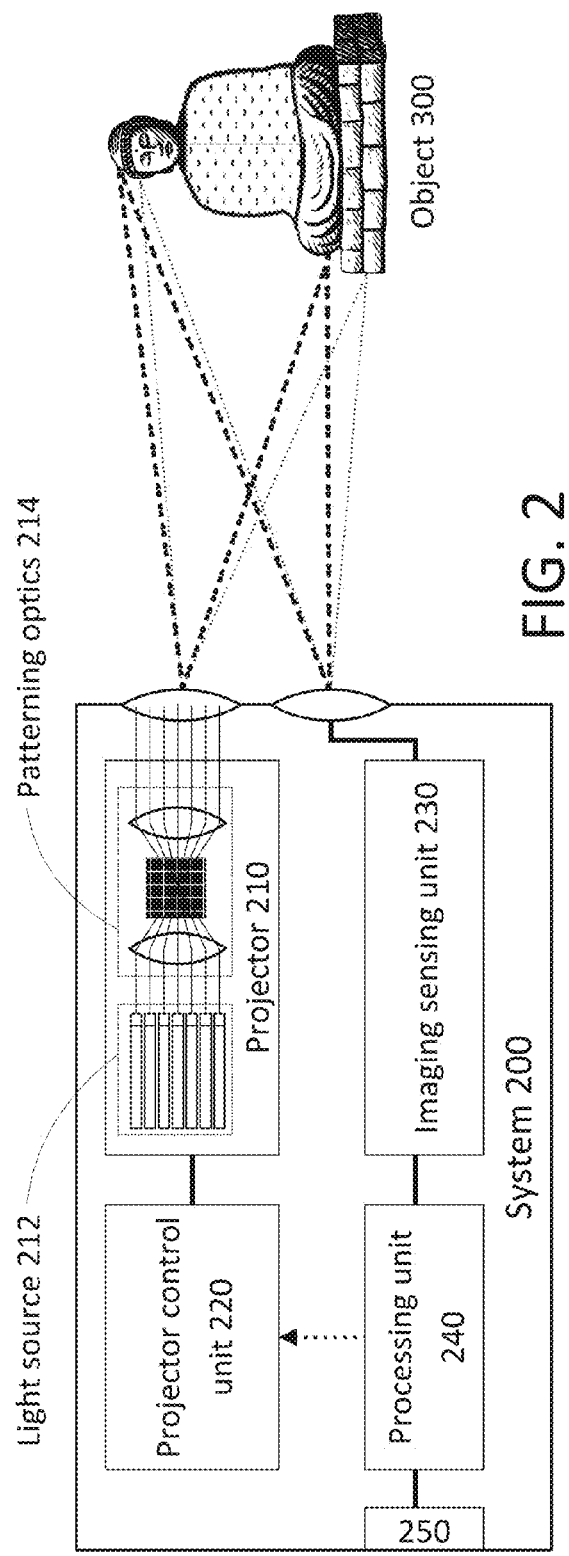

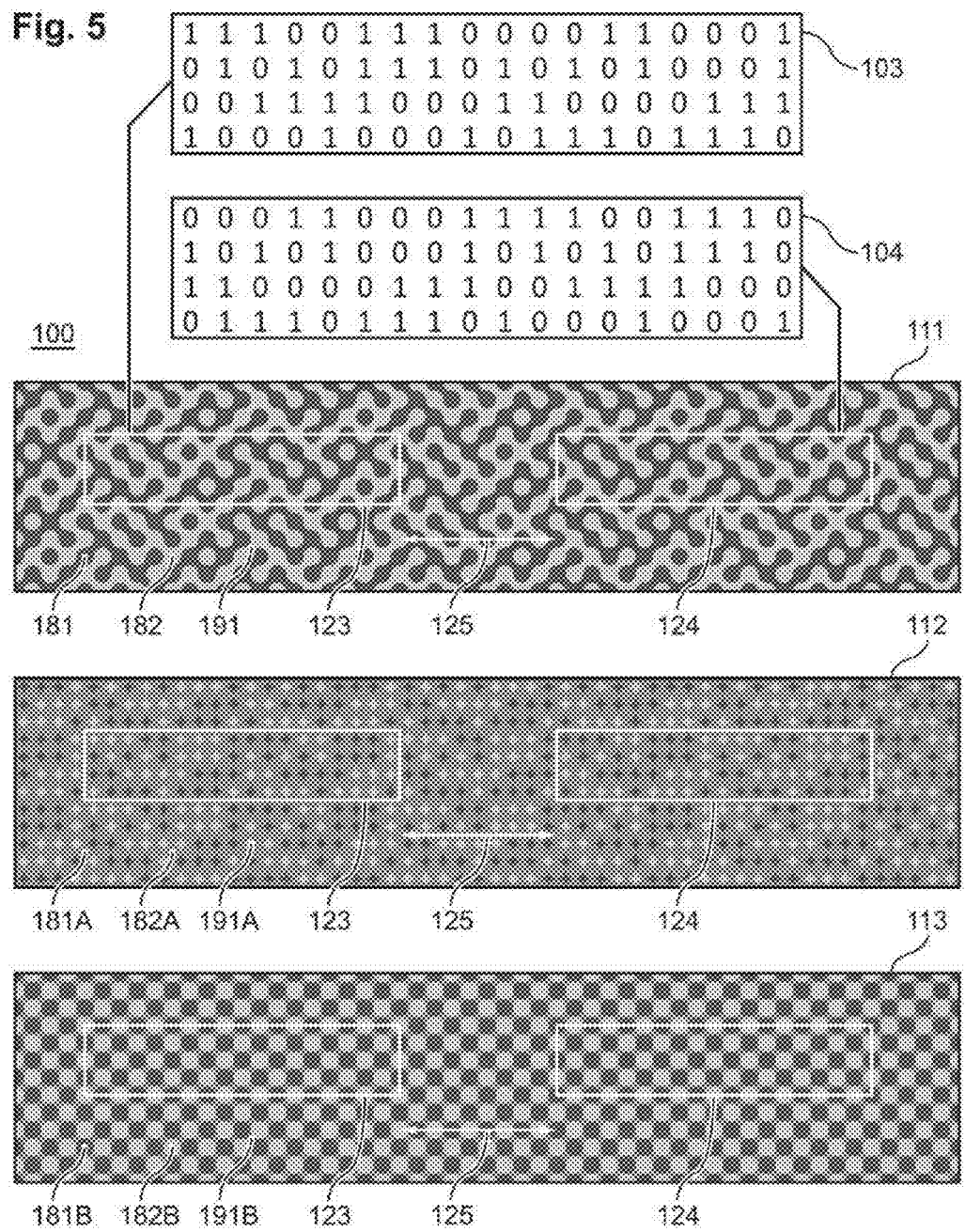

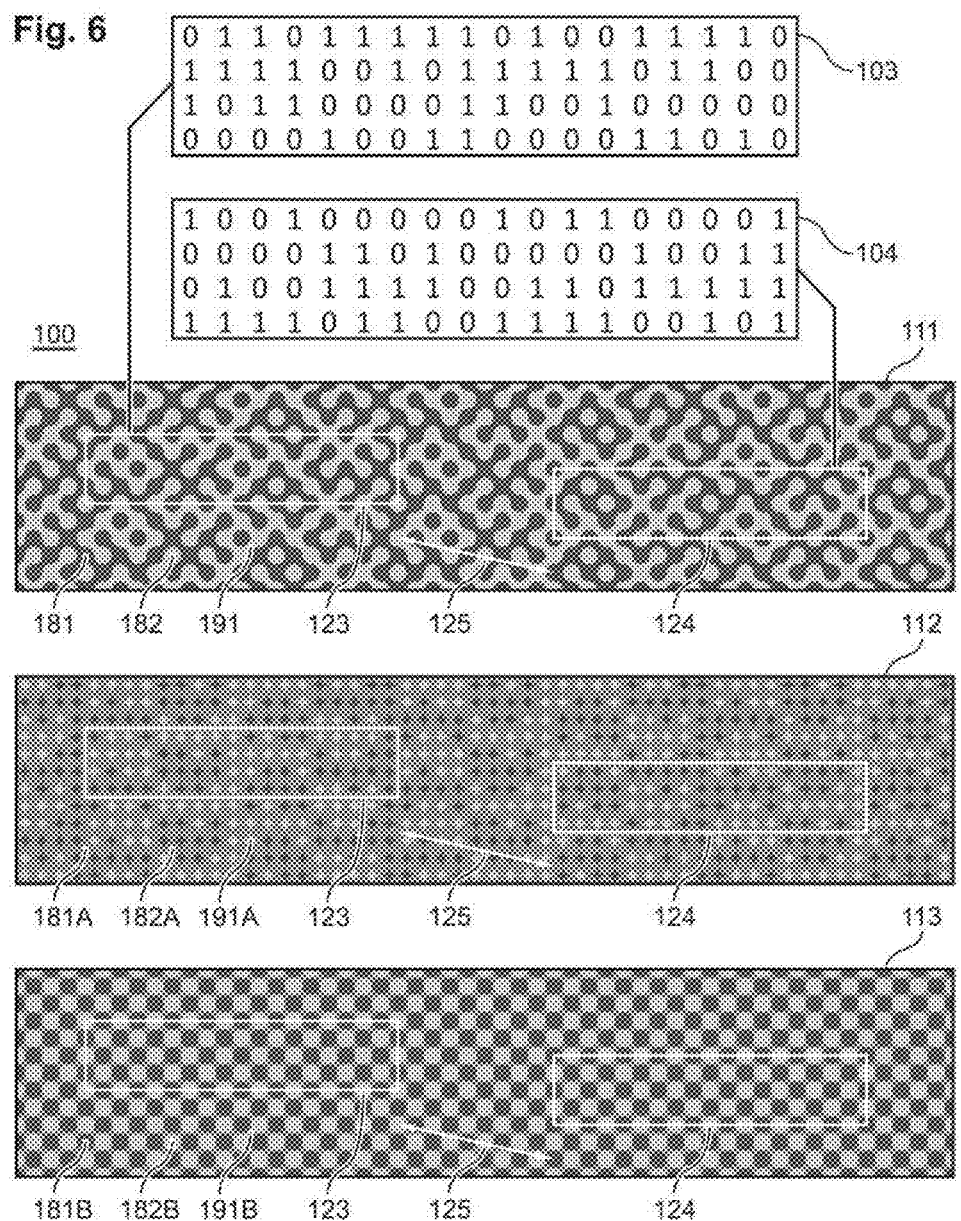

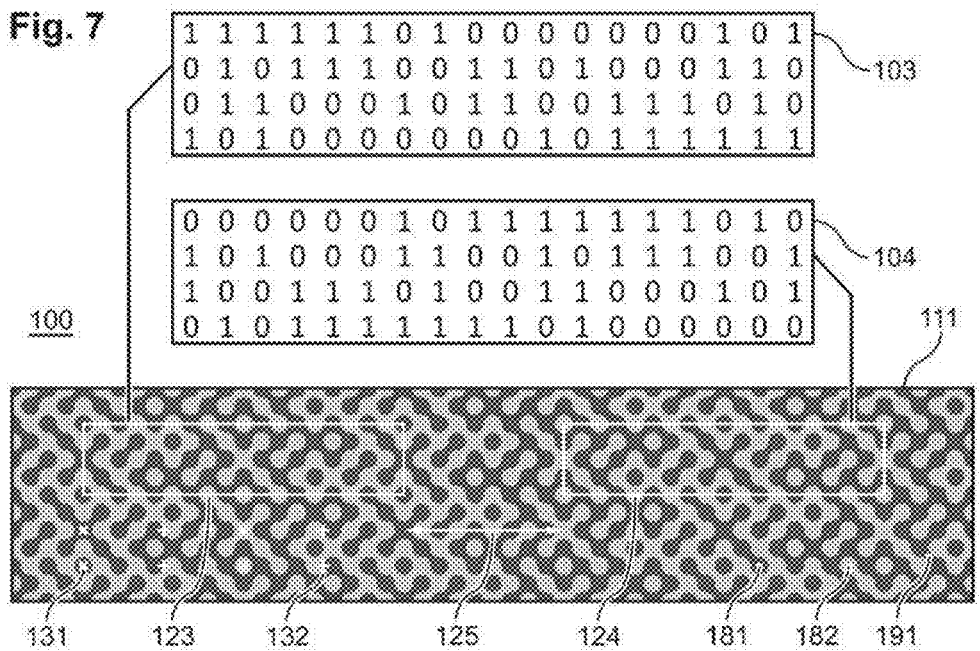
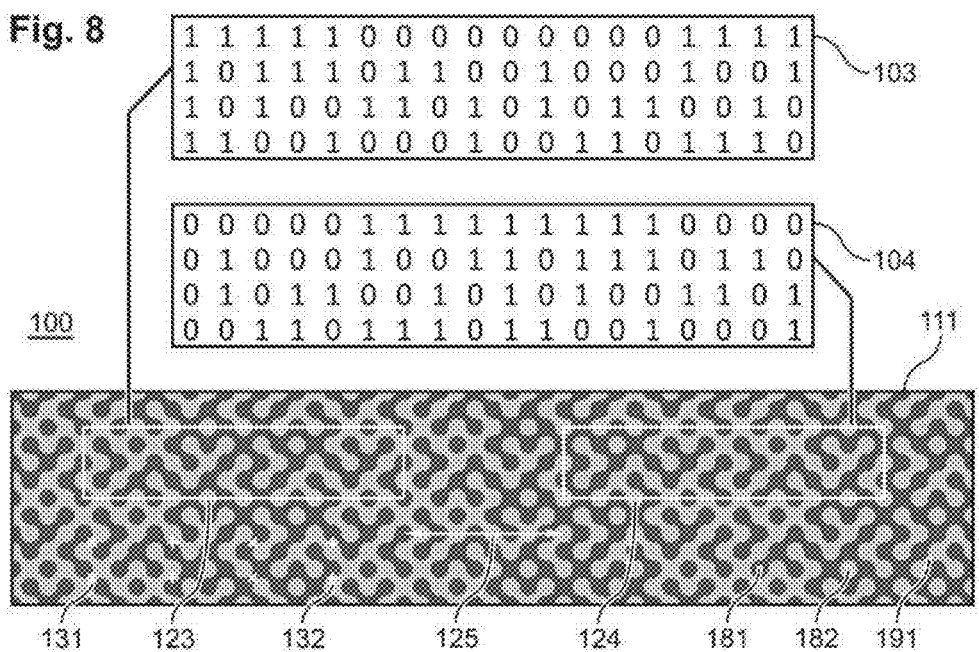

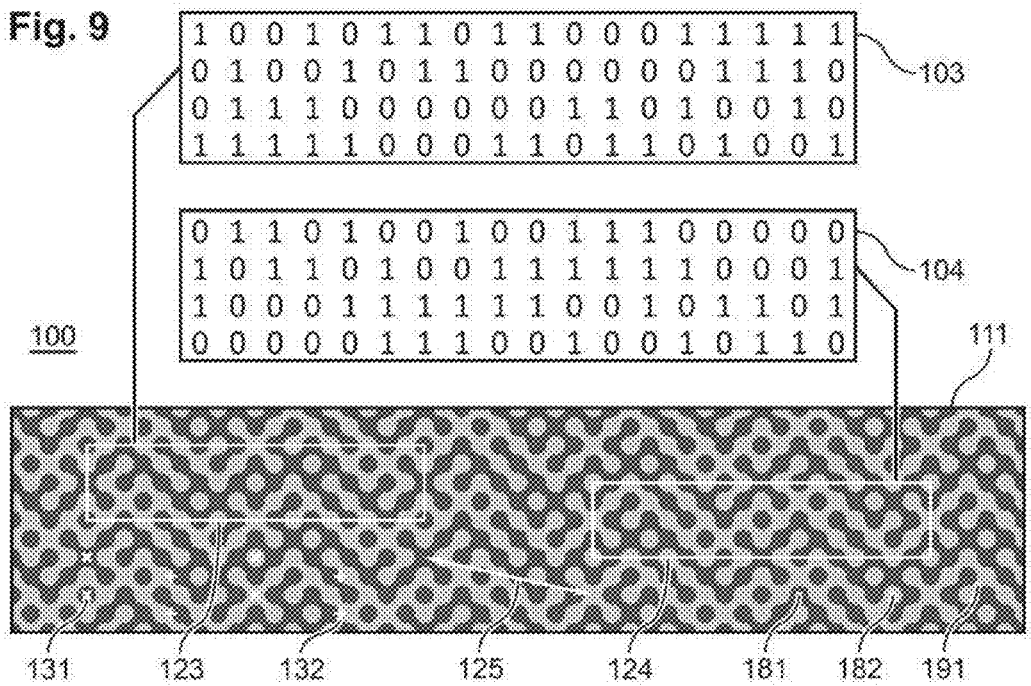
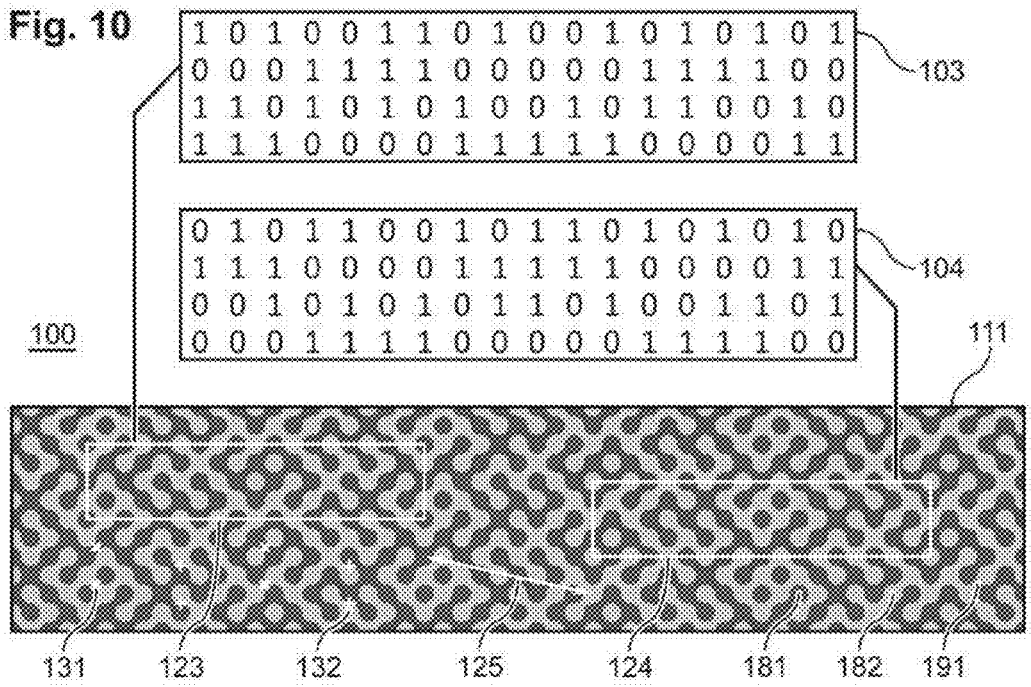

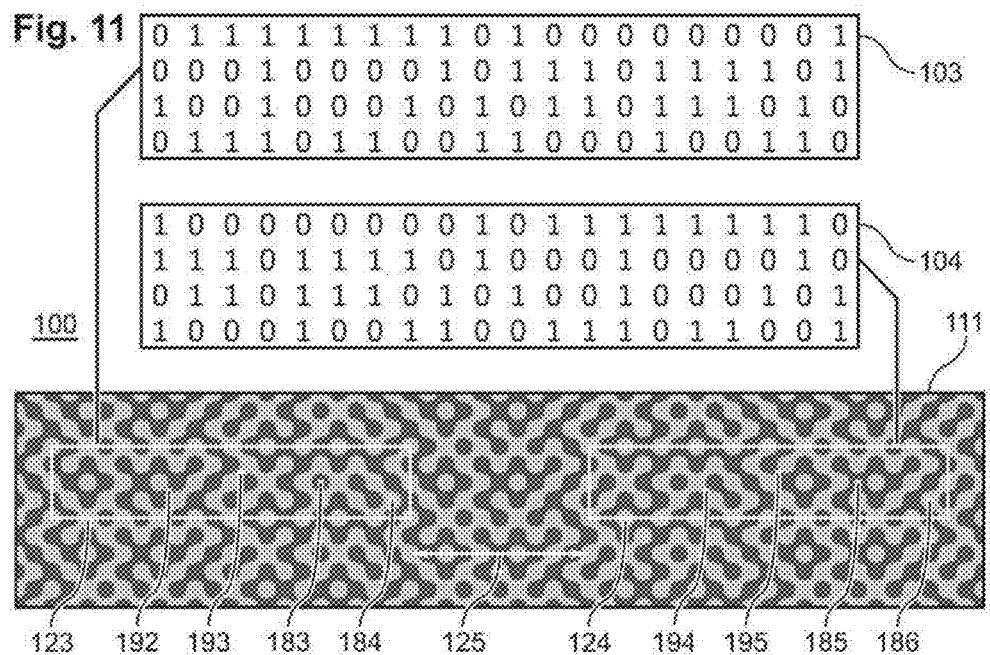
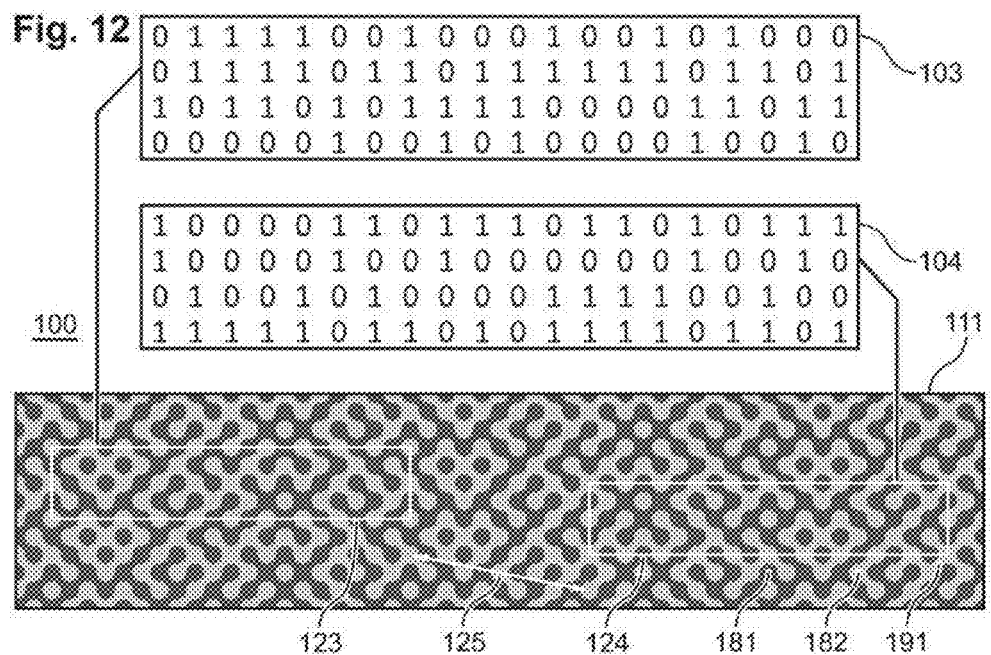

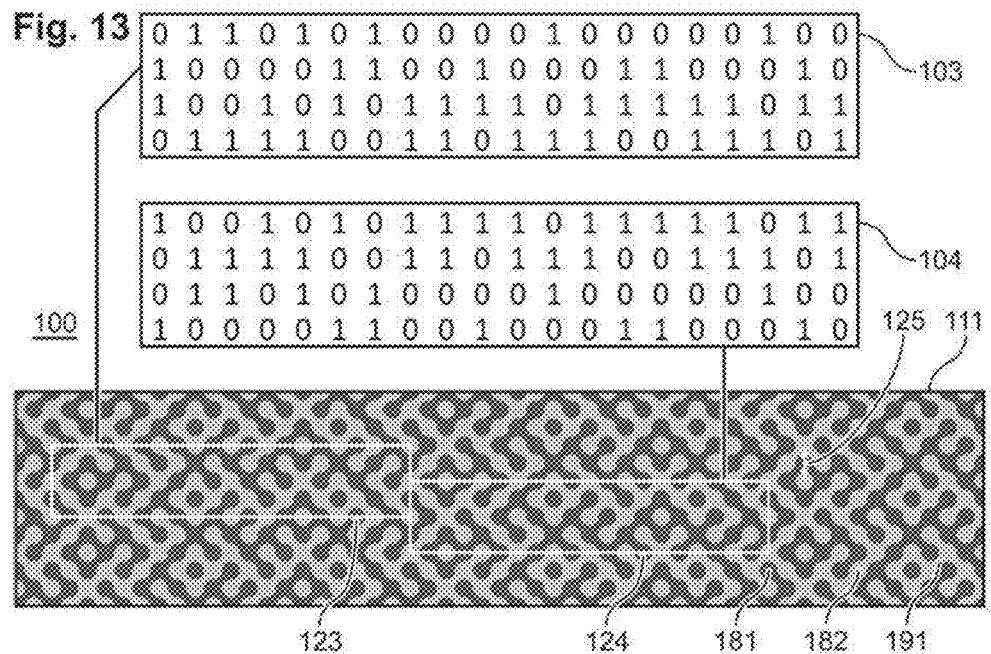
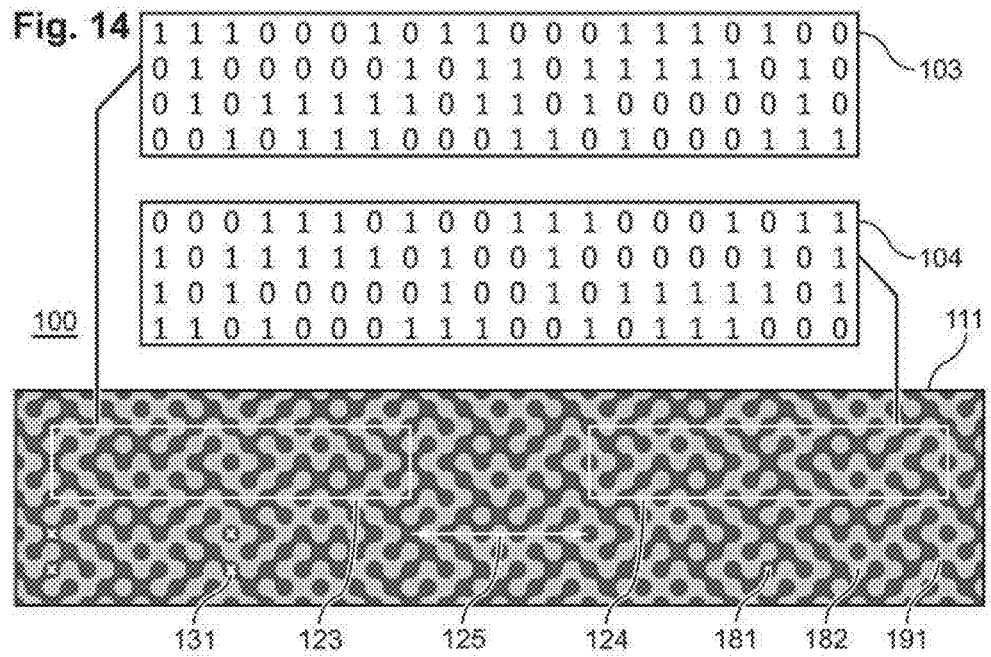

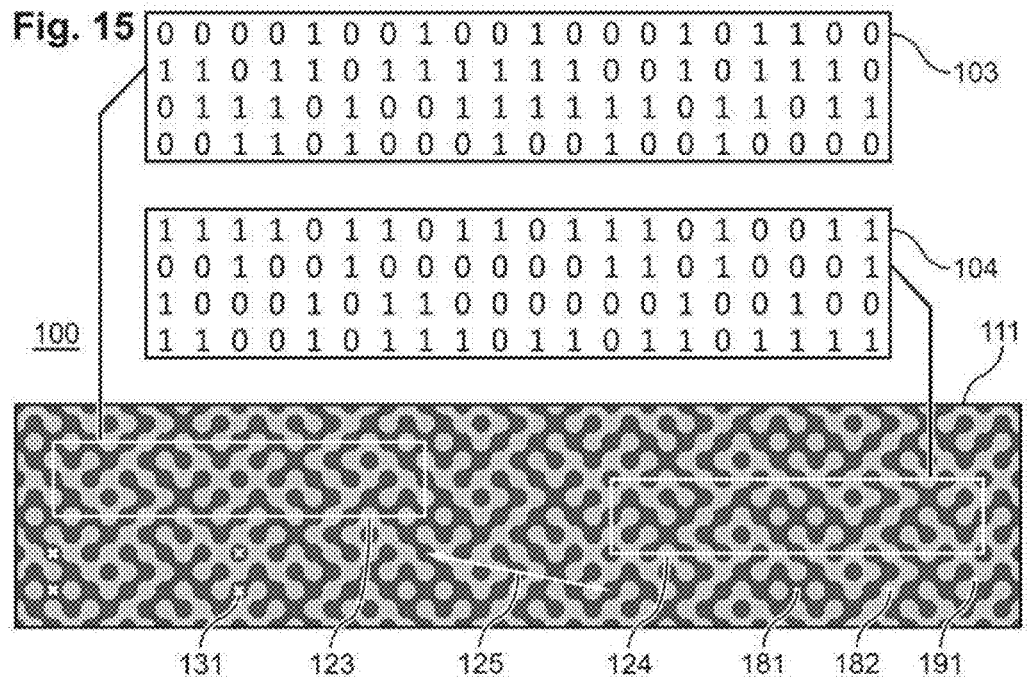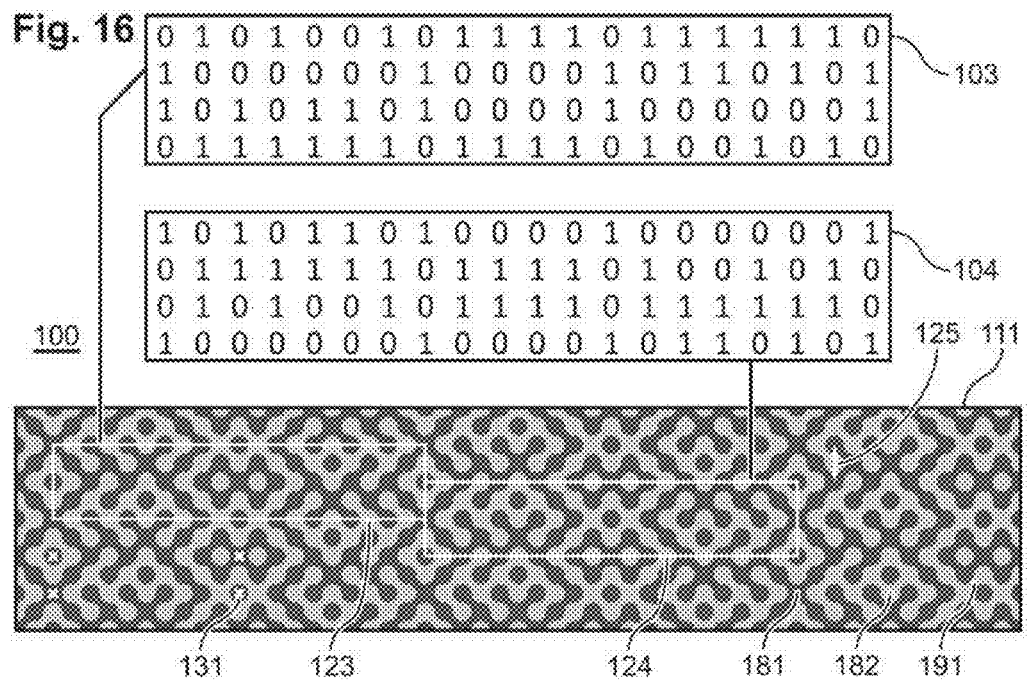

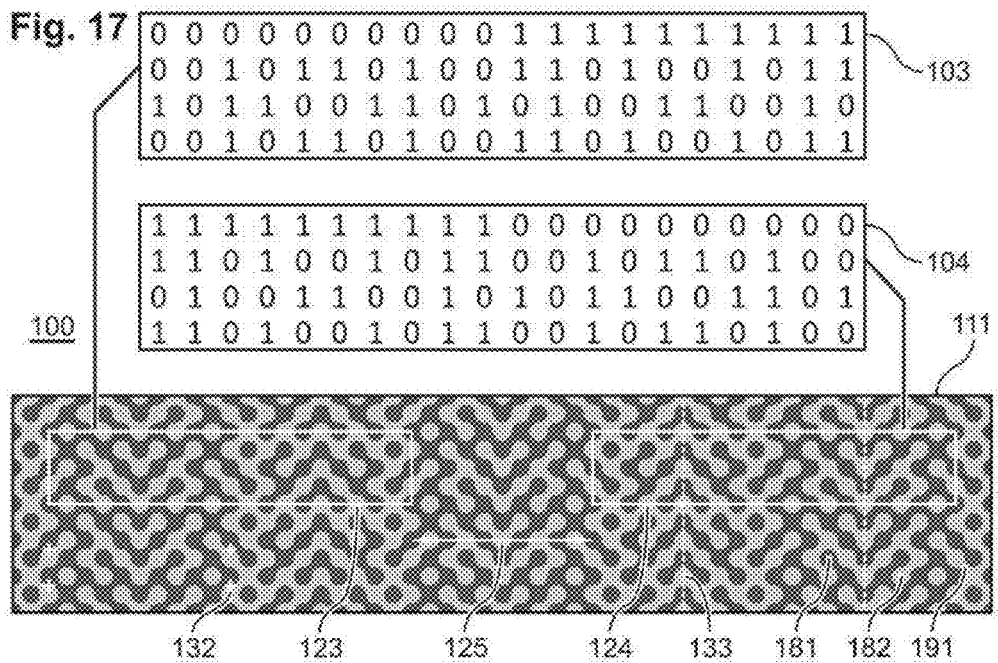
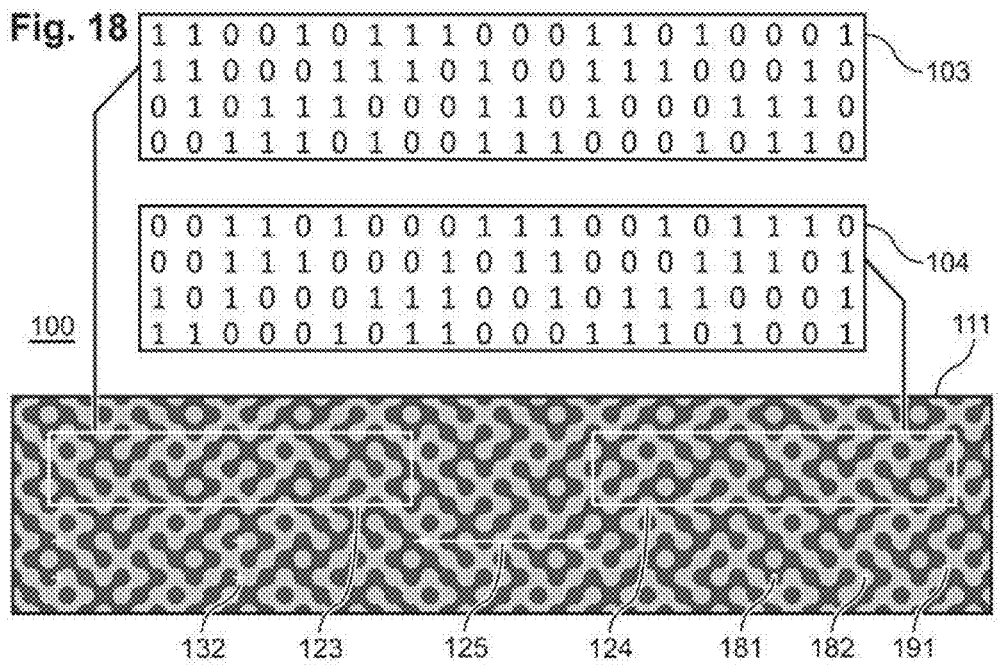

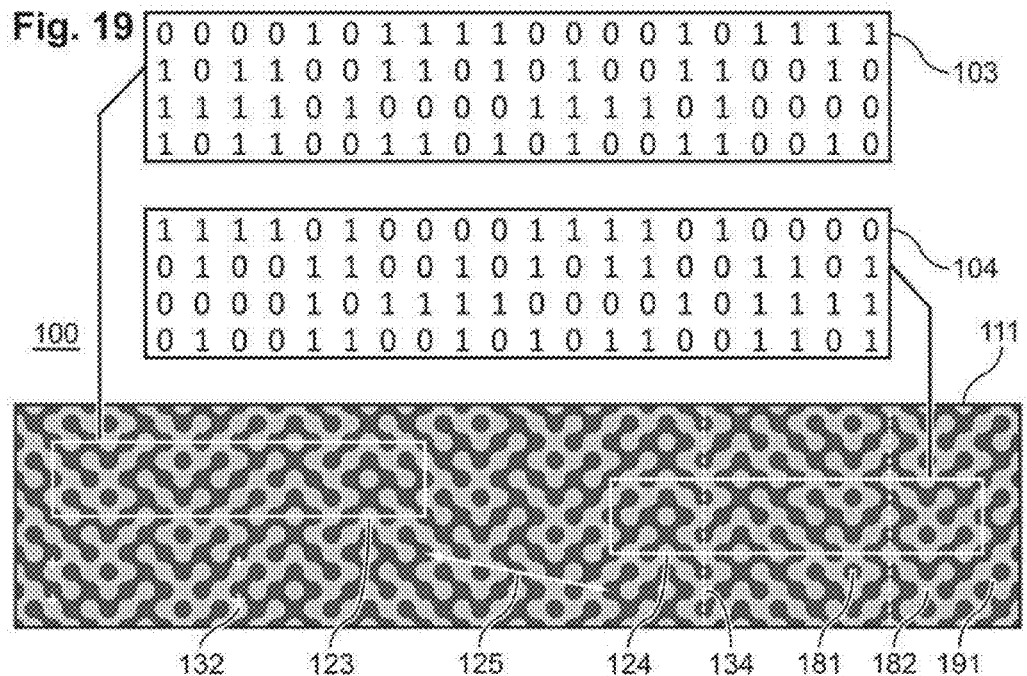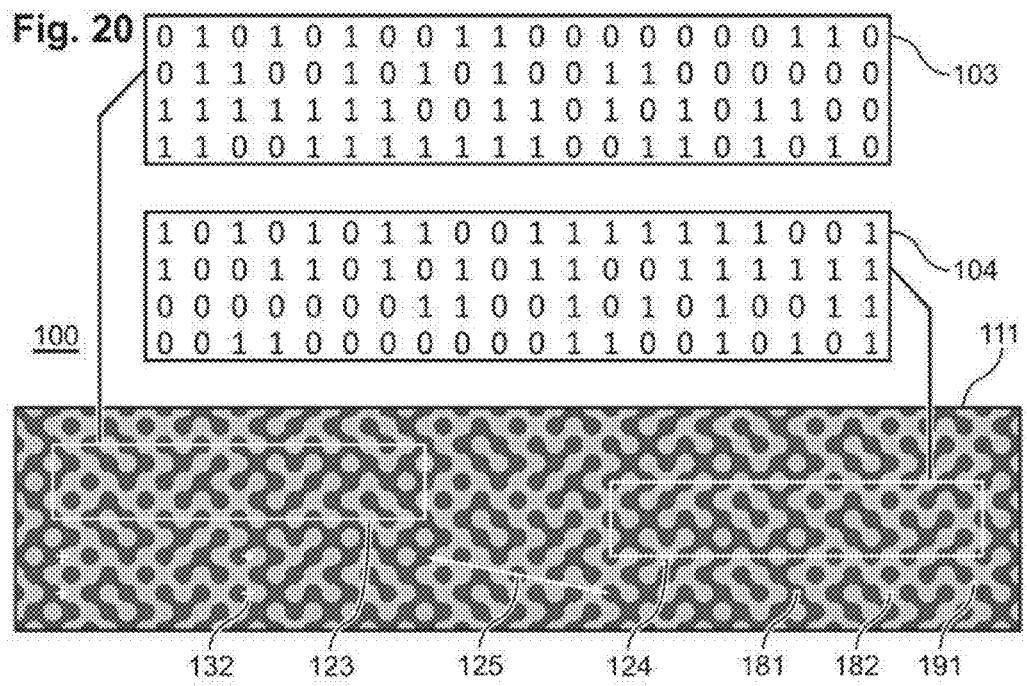

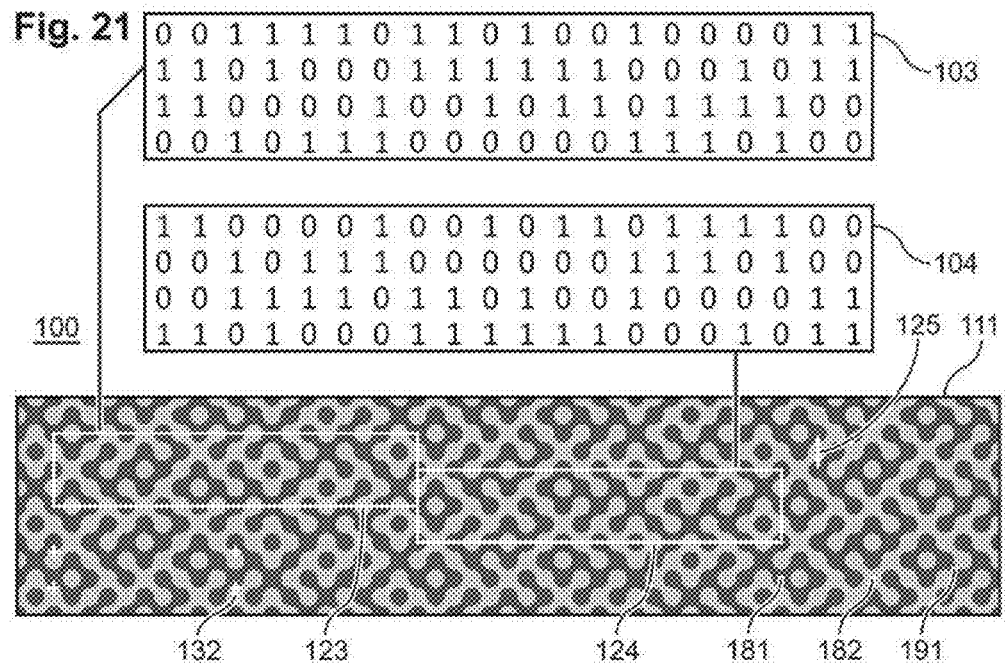
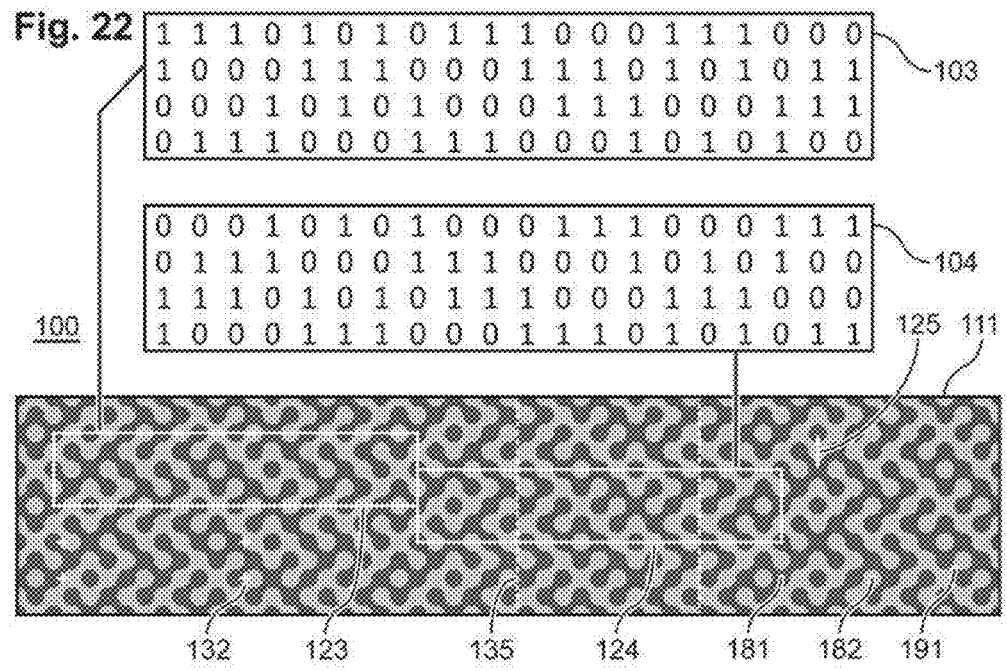

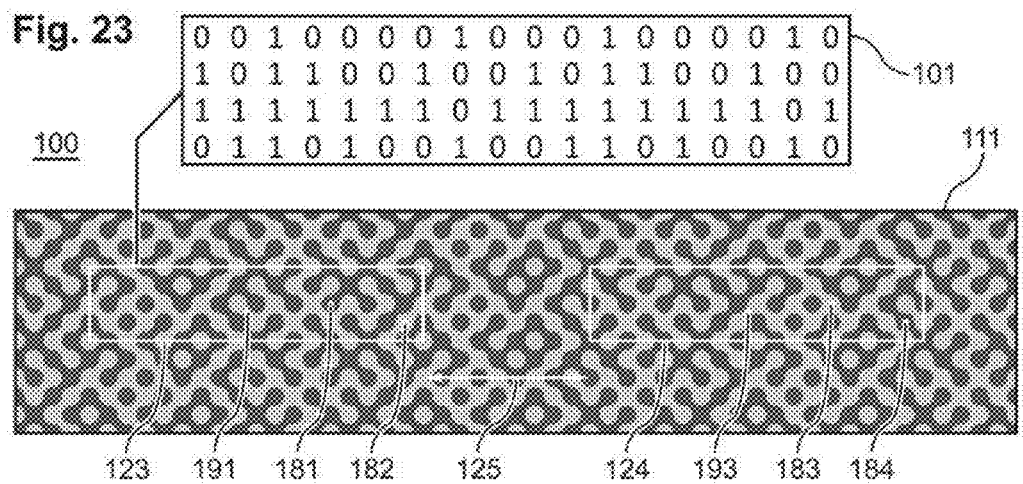
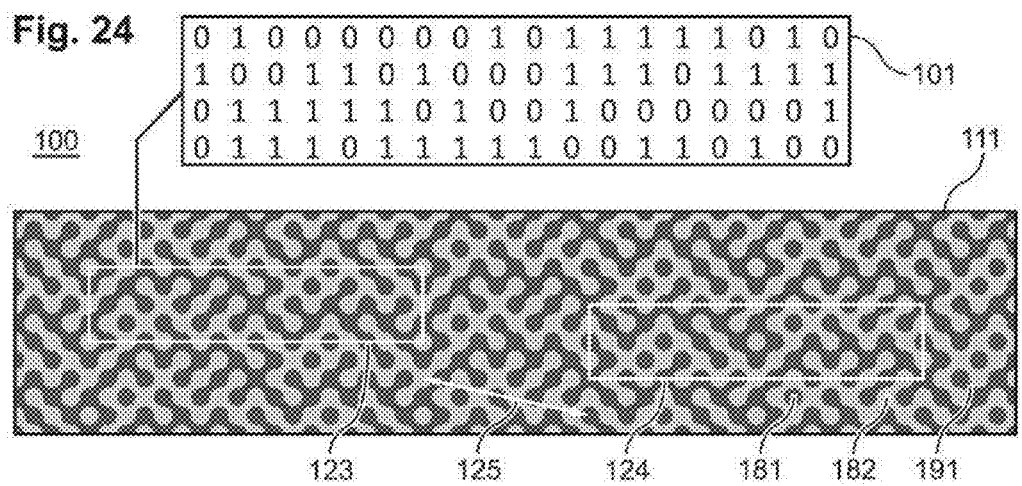
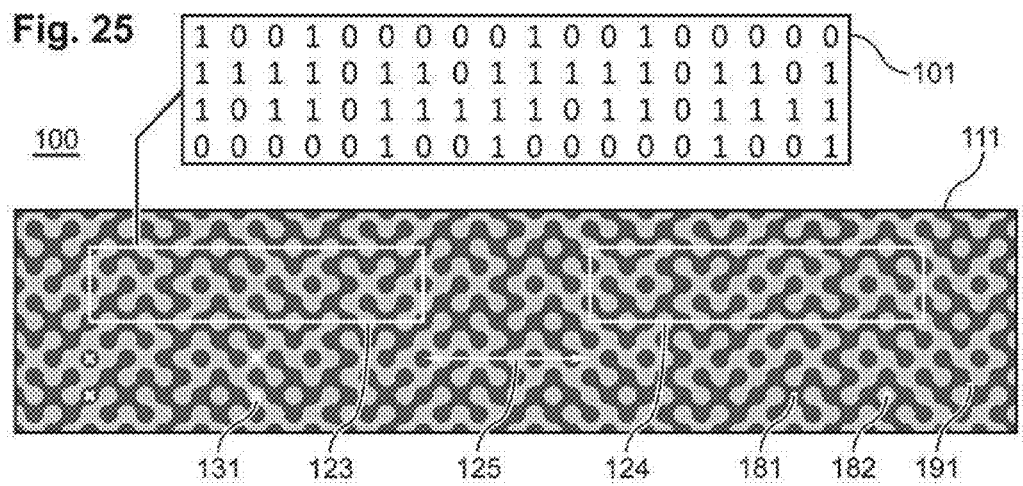

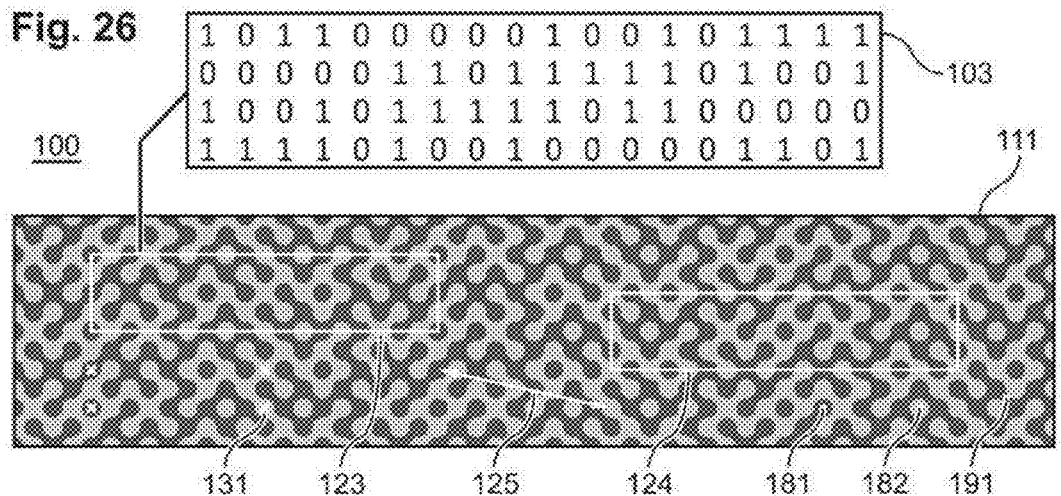
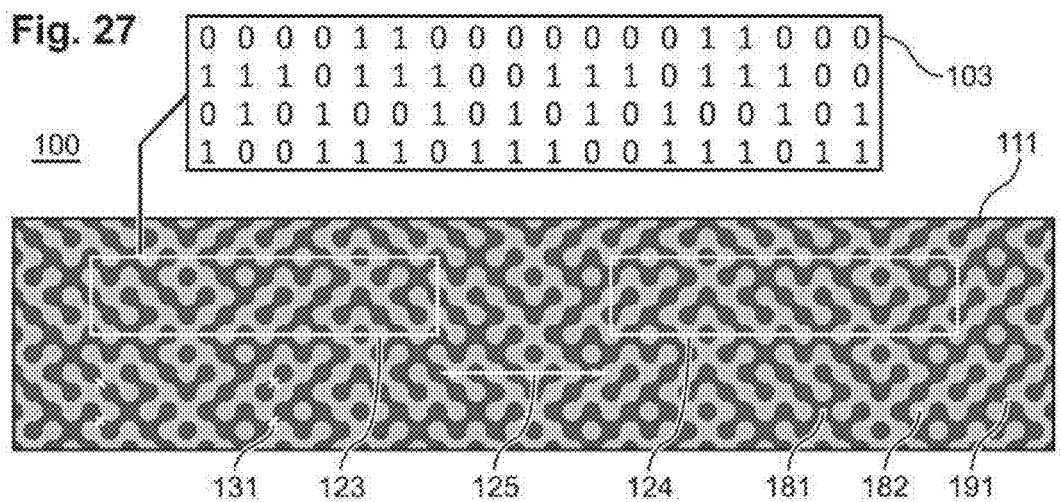
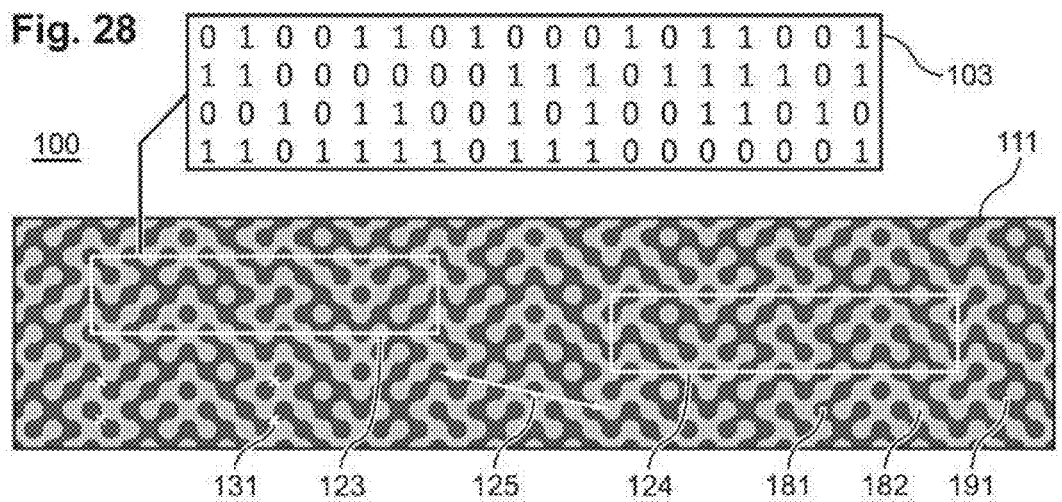

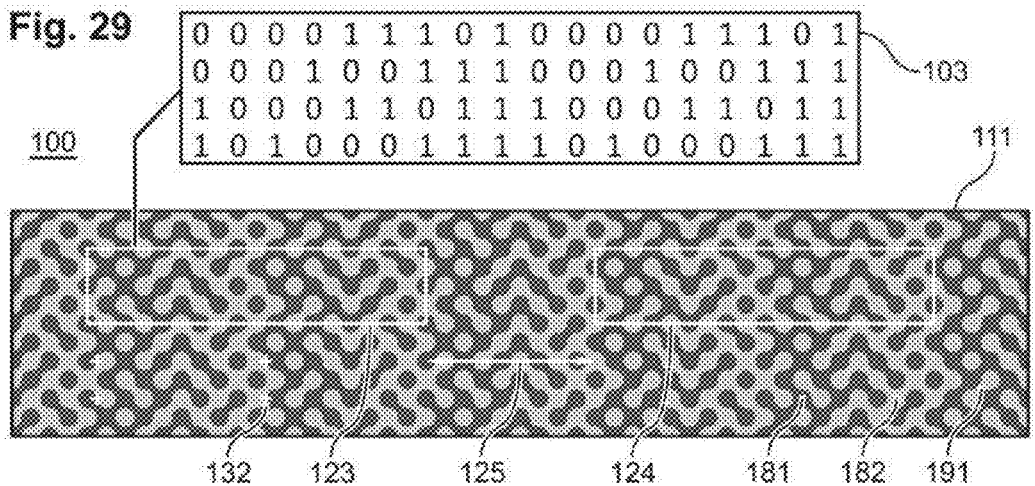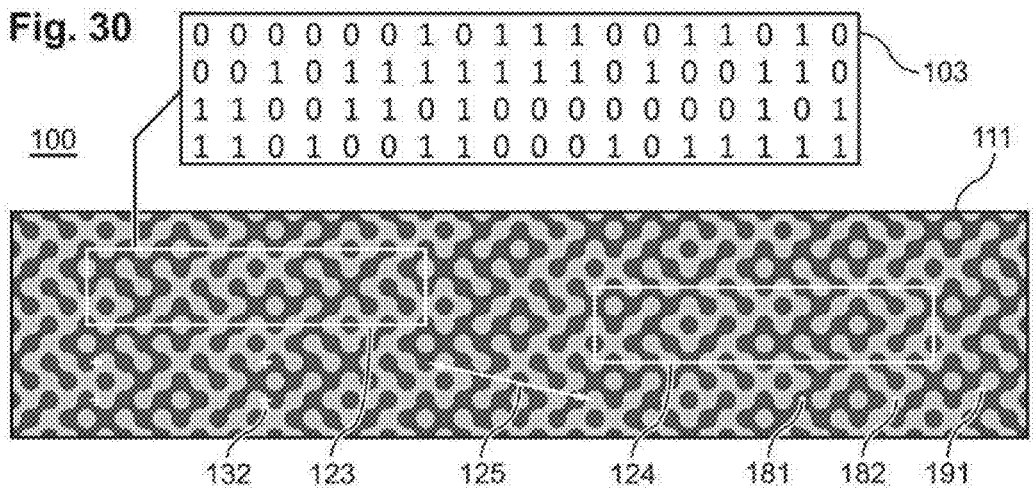

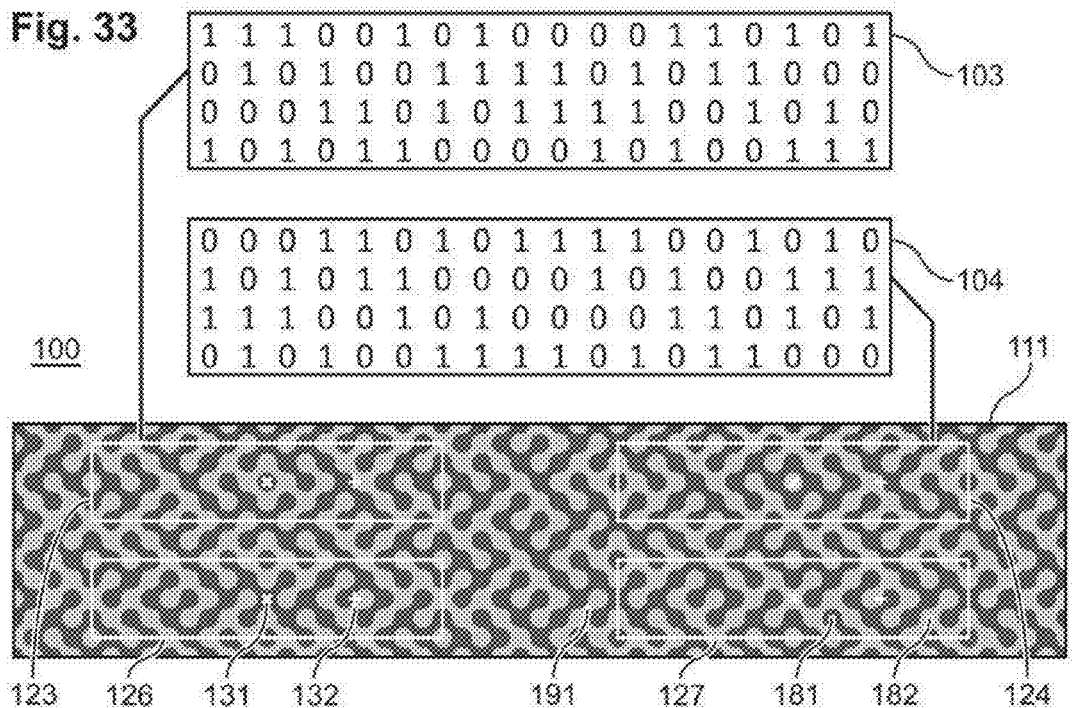
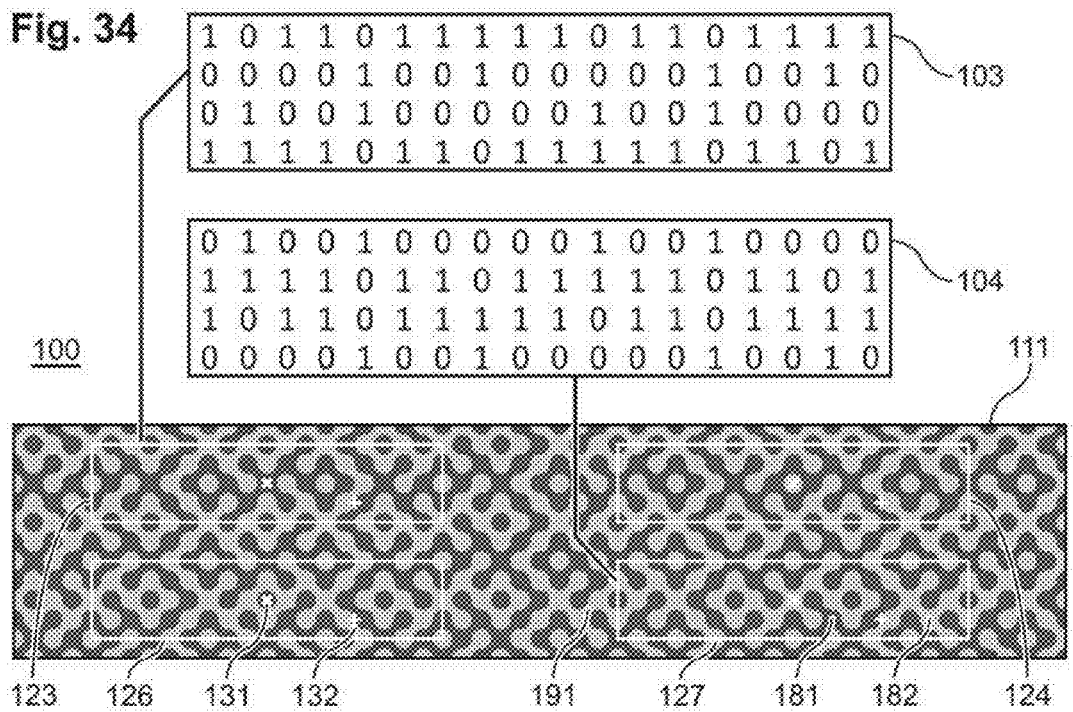

Fig. 39
Reference
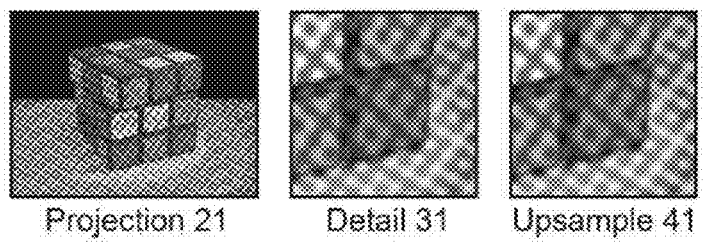
Projection 21    Detail 31    Upsample 41
Inverse
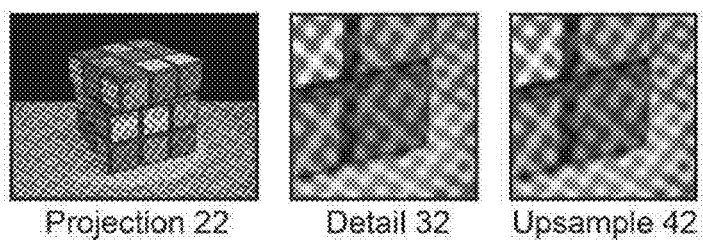
Projection 22    Detail 32    Upsample 42
Inverse-carrier
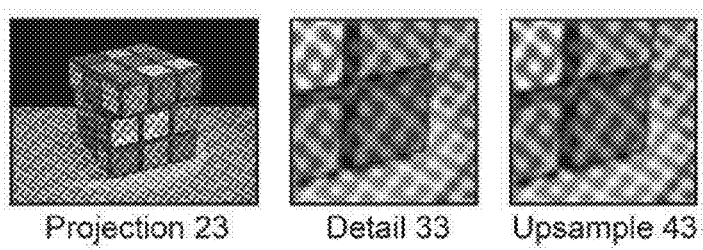
Projection 23    Detail 33    Upsample 43
Inverse-code
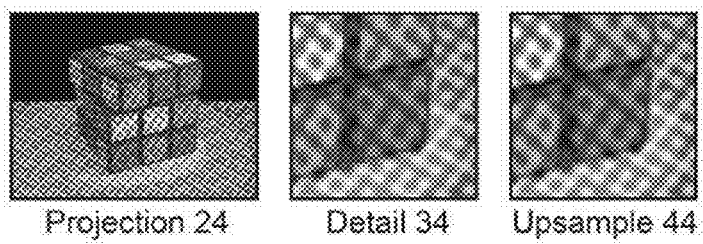
Projection 24    Detail 34    Upsample 44
Ambient illumination
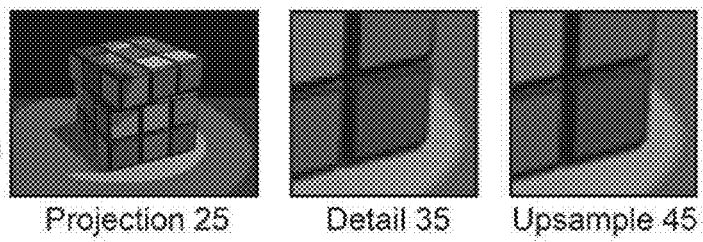
Projection 25    Detail 35    Upsample 45
Uniform illumination
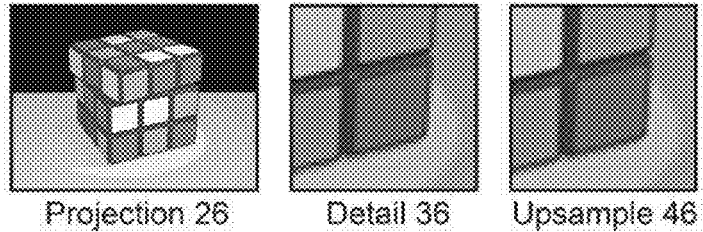
Projection 26    Detail 36    Upsample 46

Fig. 40A  Fig. 40B  Fig. 40C
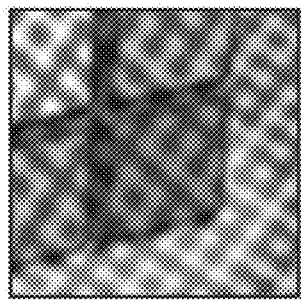
Upsample 41
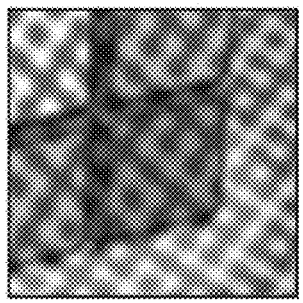
Upsample 41
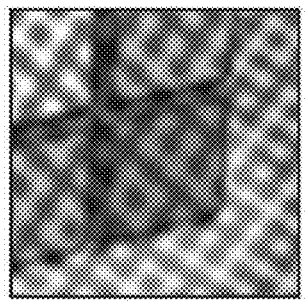
Upsample 41
+   −   +
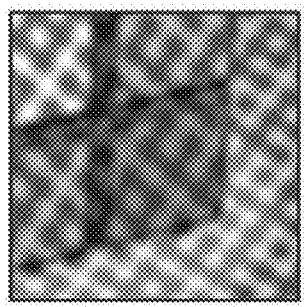
Upsample 42
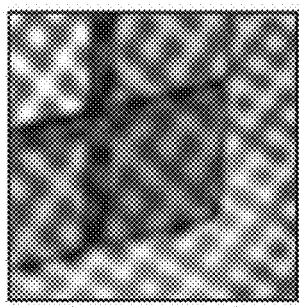
Upsample 42
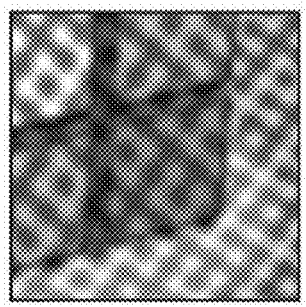
Upsample 44
=   =   =
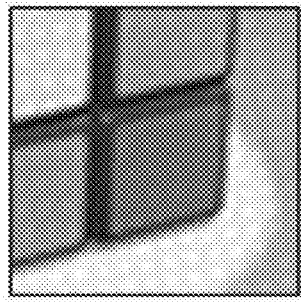
Procedure result 51
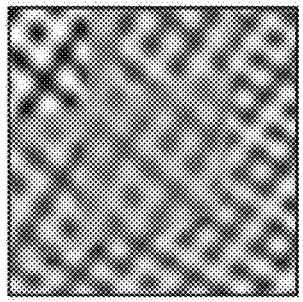
Procedure result 52
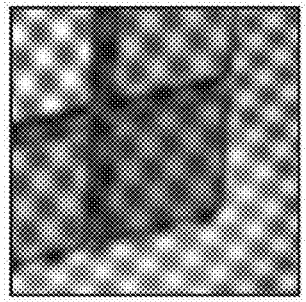
Procedure result 53

Fig. 40D      Fig. 40E      Fig. 40F
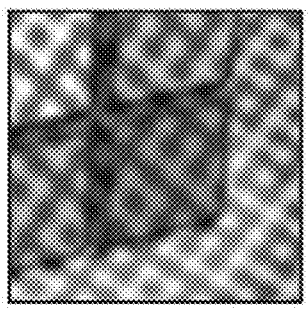 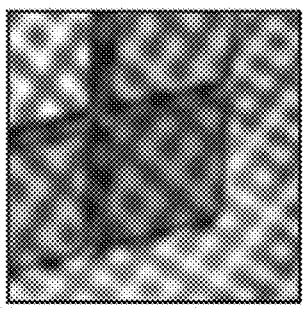 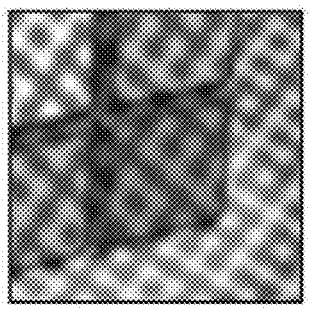
Upsample 41      Upsample 41      Upsample 41
−      +      −
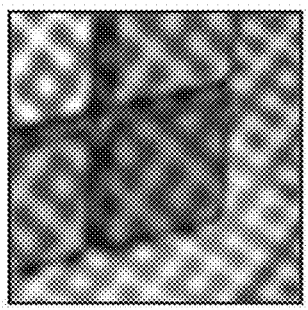 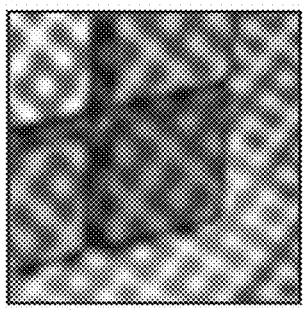 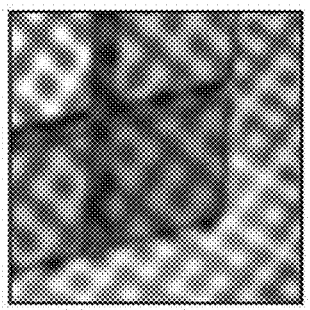
Upsample 43      Upsample 43      Upsample 44
=      =      =
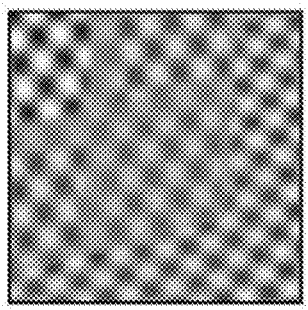 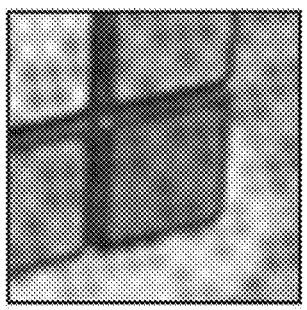 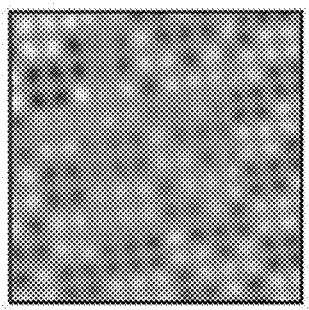
Procedure result 54      Procedure result 55      Procedure result 56

Fig. 40G    Fig. 40H    Fig. 41A
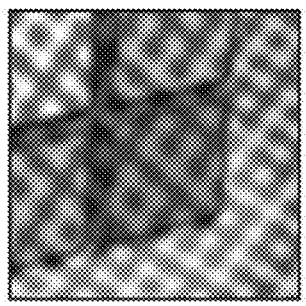 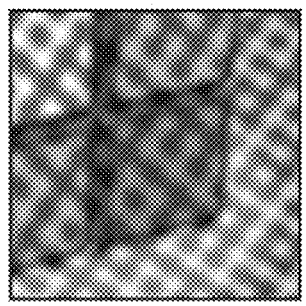 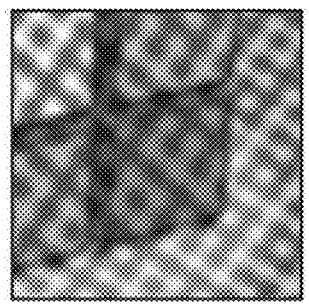
Upsample 41    Upsample 41    Upsample 41
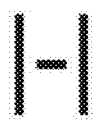 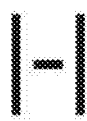 
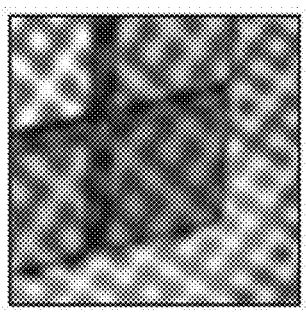 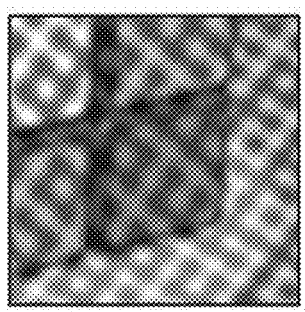 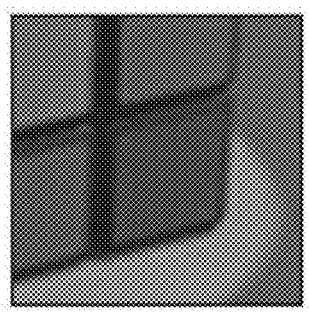
Upsample 42    Upsample 43    Upsample 45
  
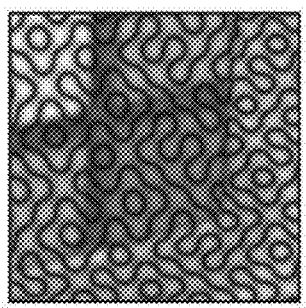 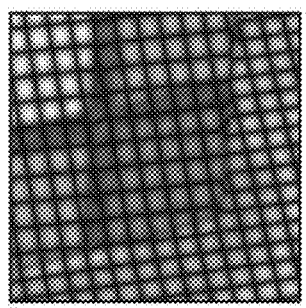 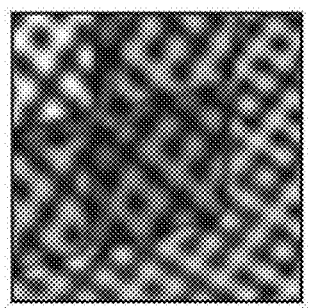
Procedure result 57    Procedure result 58    Procedure result 61

Fig. 41B          Fig. 41C          Fig. 41D
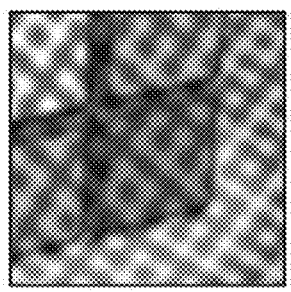 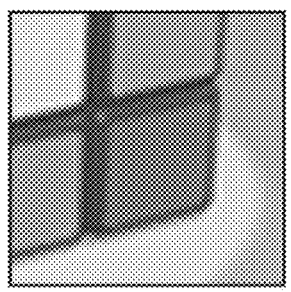 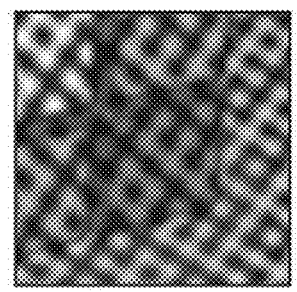
Upsample 41        Upsample 46        Procedure result 61
/              −              /
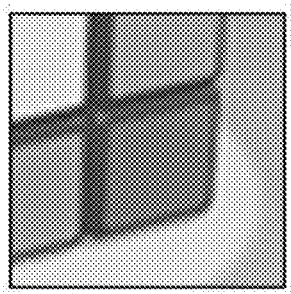 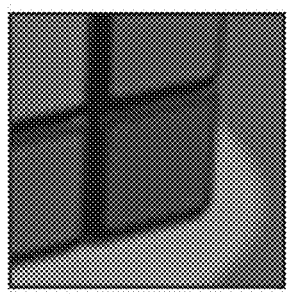 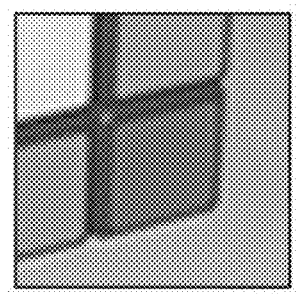
Upsample 46        Upsample 45        Procedure result 63
=              =              =
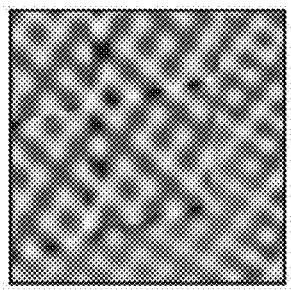 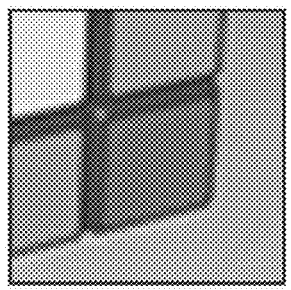 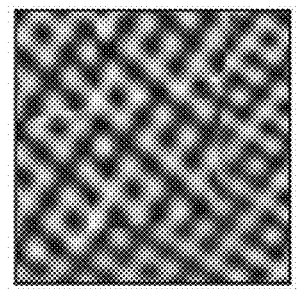
Procedure result 62     Procedure result 63     Procedure result 71

510
Projecting onto an object a first projection of a coded light pattern and a second projection of the coded light pattern, wherein the first projection and the second projection are rigidly shifted with respect to one another > 511  Projecting the first projection of the coded light pattern onto the object > 512  Projecting the second projection of the coded light pattern, which is rigidly shifted with respect to the first projection, onto the object

FIG. 45

510
Projecting onto an object a first projection of a coded light pattern and a second projection of the coded light pattern, wherein the first projection and the second projection are rigidly shifted with respect to one another > 511  Projecting the first projection of the coded light pattern onto the object > 513  Changing a state of a projector of the coded light pattern
>> 514  shifting an optical mask of the projector from one position to another
>> 515  alternating activation of different subgroups of individual emitters > 512  Projecting the second projection of the coded light pattern, which is rigidly shifted with respect to the first projection, onto the object

FIG. 46

520 Collecting light reflected from the object to provide: first image in which the object is imaged with the first projection of the coded light pattern projected thereon, and second image in which the object is imaged with the second projection of the coded light pattern projected thereon 521 Collecting light reflected from the object to provide the first image in which the object is imaged with the first projection of the coded light pattern projected thereon 522 Collecting light reflected from the object to provide the second image in which the object is imaged with the second projection of the coded light pattern projected thereon

FIG. 47

530 Processing the first image data and the second image data to determine range parameters for the object 541 Obtaining from the first image and from the second image a plurality of intensity value sets, each intensity value set including an intensity value from the first image and a spatially corresponding intensity value from the second image 542 Applying a predefined mathematical operation on the values of each of the intensity value sets, to provide an outcome value for each of the sets 543 Determining the range parameters for the object based on a plurality of the outcome values

FIG. 48

530 Processing the first image and the second image to determine range parameters for the object 551 Processing the first image for computing preliminary information for a set of locations in the first image 552 Processing the first image and the second image for computing information for a set of locations in the first image 553 Acquiring coding information from a set of coding locations of the first image 554 Processing the coding information for determining the range parameters for the object

FIG. 49

530 Processing the first image data and the second image data to determine range parameters for the object 561 Analyzing image data which includes (i) at least a part of the data of the first image and/or (ii) at least a part of the data of the second image for: (a) detecting a plurality of carrier locations, (b) estimating the locations of the detected carrier locations, and (c) determining the code-bit of each carrier location 562 Searching for the closest neighbors of every detected carrier location, and recovering the local grid context in the image 563 Identifying grid points by their local signature, using dynamic windows of some specified minimal size, and checking for signature consistency. Identified points are next spatially located by triangulation

FIG. 50

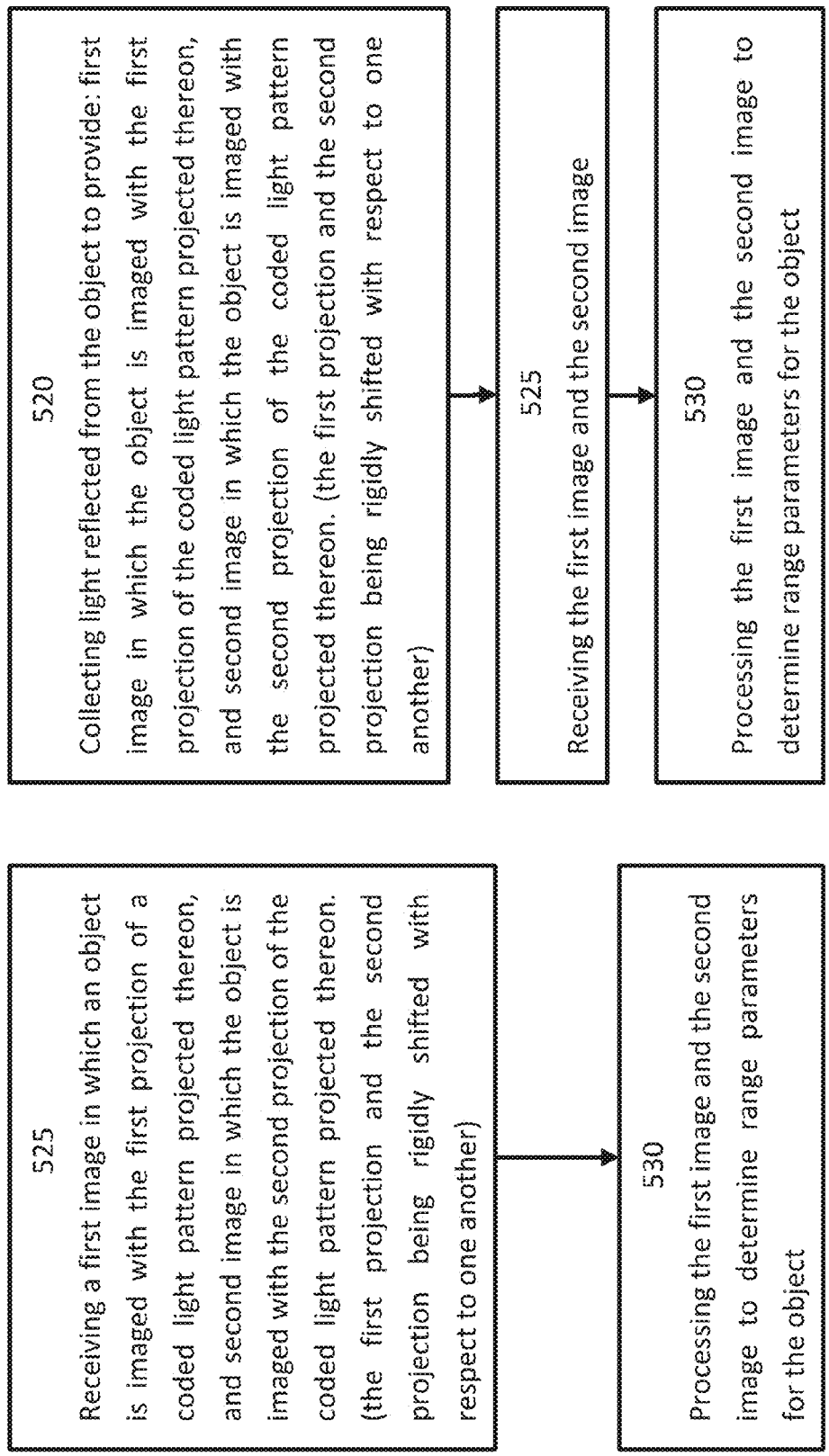

SYSTEM, METHOD AND COMPUTER PROGRAM PRODUCT TO PROJECT LIGHT PATTERN

RELATED APPLICATIONS

The present application claims priority from U.S. Provisional Patent Application No. 62/036,158, which is hereby incorporated by reference in its entirety.

FIELD

The present disclosure is related to systems, methods, and computer program products to project light patterns.

BACKGROUND

U.S. Pat. No. 8,090,194 entitled "3D geometric modeling and motion capture using both single and dual imaging" discloses a method and apparatus for obtaining an image to determine a three dimensional shape of a stationary or moving object using a bi dimensional coded light pattern having a plurality of distinct identifiable feature types. The coded light pattern is projected on the object such that each of the identifiable feature types appears at most once on predefined sections of distinguishable epipolar lines. An image of the object is captured and the reflected feature types are extracted along with their location on known epipolar lines in the captured image. Displacements of the reflected feature types along their epipolar lines from reference coordinates thereupon determine corresponding three dimensional coordinates in space and thus a 3D mapping or model of the shape of the object can be obtained.

U.S. Pat. No. 8,208,719 entitled "3D geometric modeling and motion capture using both single and dual imaging" discloses a method and apparatus for obtaining an image to determine a three dimensional shape of a stationary or moving object using a bi dimensional coded light pattern having a plurality of distinct identifiable feature types. The coded light pattern is projected on the object such that each of the identifiable feature types appears at most once on predefined sections of distinguishable epipolar lines. An image of the object is captured and the reflected feature types are extracted along with their location on known epipolar lines in the captured image. Displacements of the reflected feature types along their epipolar lines from reference coordinates thereupon determine corresponding three dimensional coordinates in space and thus a 3D mapping or model of the shape of the object can be obtained.

U.S. Pat. No. 8,538,166 entitled "3D geometric modeling and 3D video content creation" discloses a system, apparatus and method of obtaining data from a 2D image in order to determine the 3D shape of objects appearing in the 2D image, the 2D image having distinguishable epipolar lines, the method comprising: (a) providing a predefined set of types of features, giving rise to feature types, each feature type being distinguishable according to a unique bi-dimensionally formation; (b) providing a coded light pattern comprising multiple appearances of the feature types; (c) projecting the coded light pattern on the objects such that the distance between epipolar lines associated with substantially identical features is less than the distance between corresponding locations of two neighboring features; (d) capturing a 2D image of the objects having the projected coded light pattern projected thereupon, the 2D image comprising reflected the feature types; and (e) extracting: (i) the reflected feature types according to the unique bi-dimensionally formations; and (ii) locations of the reflected feature types on respective the epipolar lines in the 2D image.

In the article "Range image acquisition with a single binary-encoded light pattern" by P. Vuylsteke and A. Oosterlinck (IEEE Transactions on Pattern Analysis and Machine Intelligence (PAMI), Volume 12, Issue 2, Pages 148-164, February 1990), the problem of strike identification in range image acquisition systems based on triangulation with periodically structured illumination is discussed. A coding scheme is presented based on a single fixed binary encoded illumination pattern, which contains all the information required to identify the individual strikes visible in the camera image. Every sample point indicated by the light pattern is made identifiable by means of a binary signature, which is locally shared among its closest neighbors. The applied code is derived from pseudonoise sequences, and it is optimized so that it can make the identification fault-tolerant to the largest extent. A prototype measurement system based on this coding principle is presented. Experimental results obtained with the measurement system are also presented.

In the article "Recent progress in coded structured light as a technique to solve the correspondence problem: a survey" by J. Battle, E. Mouaddib and J. Salvi (Pattern Recognition, Volume 31, Issue 7, Pages 963-982, 31 Jul. 1998), the authors present a survey of significant techniques, used in the few years prior to the publication of the article, concerning the coded structured light methods employed to get 3D information.

In the article "Pattern codification strategies in structured light systems" by J. Salvi, J. Pagès and J. Bade (Pattern Recognition, Volume 37, Issue 4, Pages 827-849, April 2004) there is a discussion of the use of coded structured light for recovering the surface of objects. This technique is based on projecting a light pattern and viewing the illuminated scene from one or more points of view. Since the pattern is coded, correspondences between image points and points of the projected pattern can be easily found. The decoded points can be triangulated and 3D information is obtained. The authors present an overview of the existing techniques, as well as a new and definitive classification of patterns for structured light sensors. The authors have implemented a set of representative techniques in this field and present some comparative results. The advantages and constraints of the different patterns are also discussed.

In the article "A state of the art in structured light patterns for surface profilometry" by J. Salvi, S. Fernandez, T. Pribanic and X. Llado (Pattern Recognition, Volume 43, Issue 8, Pages 2666-2680, August 2010), shape reconstruction using coded structured light is discussed. Having a calibrated projector-camera pair, a light pattern is projected onto the scene and imaged by the camera. Correspondences between projected and recovered patterns are found and used to extract 3D surface information. This paper presents a review and a classification of the existing techniques. Some of these techniques have been implemented and compared, obtaining both qualitative and quantitative results. The advantages and drawbacks of the different patterns and their potentials are discussed.

International patent application serial number WO2008/062407 entitled "3d geometric modeling and 3d video content creation" discloses a method and apparatus for obtaining an image to determine a three dimensional shape of a stationary or moving object using a bi dimensional coded light pattern having a plurality of distinct identifiable feature types. The coded light pattern is projected on the object such that each of the identifiable feature types appears at most once on predefined sections of distinguishable epipolar lines. An image of the object is captured and the reflected feature types are extracted along with their location on known epipolar lines in the captured image. The locations of identified feature types in the 2D image are corresponded to 3D coordinates in space in accordance to triangulation mappings. Thus a 3D mapping or model of imaged objects is obtained.

SUMMARY

According to an aspect of the invention, there is disclosed a system, including a projector operable to project a bi-dimensionally coded pattern to provide a first projection of the bi-dimensionally coded pattern and a second projection of the bi-dimensionally coded pattern, wherein the first projection and the second projection are rigidly shifted, or otherwise offset, with respect to one another, such that a first reflection off an object which is associated with the first projection and a second reflection off the object which is associated with the second projection are provided, and wherein a signal corresponding to the first reflection and a signal corresponding to the second reflection can be co-processed. It should be understood that the terms rigid shift or the like refer to an offset, and thus these terms may be considered equivalent throughout this application.

Further optional aspects of the invention disclosed below pertain to further optional features of the system.

According to a further aspect of the invention, each of the first projection and the second projections may include a plurality of feature types, where each feature type is formed by a different formation of feature elements, wherein the projector is operable to project the first projection and the second projection such that pairs of overlapping feature types are received, wherein one feature type of each pair is a feature type from said first projection and another feature type of the pair is a feature types from said second projection.

According to a further aspect of the invention, in a pair of overlapping feature types a feature element of a feature type from said first projection may have a predefined relationship with a corresponding feature element of a feature type from said second projection.

According to a further aspect of the invention, the feature element of the feature type from said first projection may have a coding state that is different than coding state of the corresponding feature element of the feature type from said second projection.

According to a further aspect of the invention, the feature element of the feature type from said first projection and the corresponding feature element of the feature type from said second projection may have inverse coding states.

According to a further aspect of the invention, the projector may include a transparency mask to provide the bi-dimensionally coded light pattern.

According to a further aspect of the invention, the system may further include a transparency mask shifting module which is operable to shift the transparency mask between a plurality of positions including at least a first position and a second position, wherein the projector is configured to project the first projection of the bi-dimensionally coded light pattern onto the object when the transparency mask is in the first position, and to project the second projection of the bi-dimensionally coded light pattern onto the object when the transparency mask is in the second position.

According to a further aspect of the invention, the projector may include a diffractive optical element which is operable to diffract incident light to form the bi-dimensionally coded light pattern.

According to a further aspect of the invention, the bi-dimensionally coded light pattern may be coded using discrete coding.

According to a further aspect of the invention, the projector may include: a light source which includes a laser array including a plurality of individual emitters, each of the individual emitters capable of generating a laser beam; wherein the system includes a projector control unit which is configured to control activation of different subgroups of emitters of the laser array, thereby resulting in projecting of the first projection when a first subgroup of emitters is activated, and in projecting of the second projection when a second subgroup of emitters is activated.

According to a further aspect of the invention, the projector may include: (a) a diffractive optical element, operable to diffract one or more incident laser beams to provide structured light; and (b) an optical assembly, disposed between the light source and the diffractive optical element, the optical assembly is operable to transform the laser beams to provide a plurality of transformed light beams and to direct the plurality of transformed light beams onto the diffractive optical element.

According to a further aspect of the invention, the bi-dimensionally coded light pattern may be an intensity coded light pattern which includes a set of carrier locations in which bright and dim intensities give rise to a carrier signal, and a set of payload locations, in which bright and dim intensities give rise to a spatial coding signal; wherein the first projection and the second projection are rigidly shifted with respect to one another so that carrier locations of the first projection at least partly overlap carrier locations of the second projection, and so that payload locations of the first projection at least partly overlap payload locations of the second projection; wherein bright and dim intensities are inverted in overlapping locations of the first projection and of the second projection in at least one of the carrier locations and the payload locations.

According to a further aspect of the invention, the system may further include an imaging sensing unit adapted to capture the first image and the second image; and a processing unit configured to process the first image and the second image to determine range parameters.

According to a further aspect of the invention, the processing unit may be configured to: obtain from the first image and from the second image a plurality of intensity value sets, each intensity value set including an intensity value from the first image and a spatially corresponding intensity value from the second image; apply a predefined mathematical operation on the values of each of the intensity value sets, to provide an outcome value for each of the sets; and determine the range parameters based on a plurality of the outcome values.

According to a further aspect of the invention, the predefined mathematical operation is selected from a group of mathematical operations consisting of: addition, subtraction, absolute value of subtraction and division.

According to a further aspect of the invention, the processing unit may be configured to: (i) compute, based on the plurality of the outcome values, information for at least one of: (a) a set of carrier elements of the first projection, and (b) a set of payload elements of the first projection, wherein the computed information having a data type selected from a group of data types consisting of: location information and color information; and (ii) determine the range parameters for the object based on the computed information.

According to a further aspect of the invention, the rigid shift between the first projection and the second projection is not parallel to any coding direction of the bi-dimensionally coded light pattern.

According to a further aspect of the invention, each of the first projection and the second projections includes a plurality of feature types, where each feature type is formed by a unique formation of feature elements from a first set of feature elements and from a second set of feature elements; and wherein in each pair out of a plurality of pairs of spatially overlapping feature types in the first and second projections, the feature elements of the second set of feature elements from the feature type in the first projection have a coding state that is different than a coding state of the feature elements of the second set of feature elements from a respective feature type of the second projection.

According to a further aspect of the invention, each feature type is formed by a unique formation of feature elements from the first set of feature elements, from the second set of feature elements, and from at least one additional set of feature elements, other than the first set and the second set.

According to a further aspect of the invention, in each pair out of the plurality of pairs of spatially overlapping feature types in the first and second projections, the feature elements of the second set of feature elements from the feature type in the first projection are an inverse of the corresponding feature elements of the second set of feature elements from a respective feature type of the second projection.

According to a further aspect of the invention, in each pair out of the plurality of pairs, for each feature element from the first set of feature elements that is included in the feature type of the first projection, an inverse of the feature element is included in the feature type of the second projection.

According to a further aspect of the invention, the rigid shift between the first projection and the second projection may provide a desired relation among the feature elements in the feature types in each of the plurality of pairs.

According to a further aspect of the invention, the rigid shift between the first projection and the second projection causes feature elements from the first set of feature elements to appear as inverse feature elements in the second projection.

According to an aspect of the invention, there is disclosed a method for computing range information for an object, the method including: (a) providing a bi-dimensionally coded light pattern; (b) projecting onto the object a first projection of the bi-dimensionally coded light pattern and a second projection of the bi-dimensionally coded light pattern, wherein the first projection and the second projection are rigidly shifted with respect to one another; (c) collecting light reflected from the object to provide: a first image in which the object is imaged with the first projection of the bi-dimensionally coded light pattern projected thereon, and second image in which the object is imaged with the second projection of the bi-dimensionally coded light pattern projected thereon; and (d) processing the first image and the second image to determine range parameters for the object.

Further optional aspects of the invention pertaining to the method are disclosed below.

According to a further aspect of the invention, the bi-dimensionally coded light pattern may be coded using discrete coding.

According to a further aspect of the invention, the processing may include: obtaining from the first image and from the second image a plurality of intensity value sets, each intensity value set including an intensity value from the first image and a spatially corresponding intensity value from the second image; applying a predefined mathematical operation on the values of each of the intensity value sets, to provide an outcome value for each of the sets; and determining the range parameters for the object based on a plurality of the outcome values.

According to a further aspect of the invention, the predefined mathematical operation is selected from a group of mathematical operations consisting of: addition, subtraction, absolute value of subtraction and division.

According to a further aspect of the invention, the processing may include: computing, based on the plurality of the outcome values, high-accuracy information for at least one of: (a) a set of carrier elements of the first projection, and (b) a set of payload elements of the first projection, wherein the high-accuracy information having a data type selected from a group of data types consisting of: high accuracy location information and high accuracy color information; and determining the range parameters for the object based on the high accuracy information.

According to a further aspect of the invention, the rigid shift between the first projection and the second projection is not parallel to any coding direction of the bi-dimensionally coded light pattern.

According to a further aspect of the invention, each of the first projection and the second projections includes a plurality of feature types, where each feature type is formed by a different formation of feature elements from a first set of feature elements and from a second set of feature elements; and wherein in each pair out of a plurality of pairs of spatially overlapping feature types in the first and second projections, the feature elements of the second set of feature elements from the feature type in the first projection have a coding state that is different than a coding state of the feature elements of the second set of feature elements from a respective feature type of the second projection.

According to a further aspect of the invention, each feature type is formed by a different formation of feature elements from the first set of feature elements, from the second set of feature elements, and from at least one additional set of feature elements, other than the first set and the second set.

According to a further aspect of the invention, in each pair out of the plurality of pairs of spatially overlapping feature types in the first and second projections, the feature elements of the second set of feature elements from the feature type in the first projection are an inverse of the corresponding feature elements of the second set of feature elements from a respective feature type of the second projection.

According to a further aspect of the invention, in each pair out of the plurality of pairs, for each feature element from the first set of feature elements that is included in the feature type of the first projection, an inverse of the feature element is included in the feature type of the second projection.

According to a further aspect of the invention, the rigid shift between the first projection and the second projection provides a desired relation among the feature elements in the feature types in each of the plurality of pairs.

According to a further aspect of the invention, the rigid shift between the first projection and the second projection causes feature elements from the first set of feature elements to appear as inverse feature elements in the second projection.

According to an aspect of the invention, there is disclosed an apparatus configured to obtain distance data of a scene including at least one object, said apparatus including: a communication interface operable to receive a first image in which the object is imaged with a first projection of a bi-dimensionally coded pattern is projected on the object, and a second image in which a second projection of the bi-dimensionally coded pattern is projected on the object, wherein the first projection and the second projection are rigidly shifted with respect to one another; and a processing unit configured to process the first image and the second image to determine range parameters for the object.

Further optional aspects of the invention pertaining to the apparatus are disclosed below.

According to a further aspect of the invention, the apparatus may further include an imaging sensing unit which may be configured to capture the first image and the second image.

According to a further aspect of the invention, the bi-dimensionally coded light pattern is coded using discrete coding.

According to a further aspect of the invention, the bi-dimensionally coded light pattern may be an intensity coded light pattern which includes a set of carrier locations in which bright and dim intensities give rise to a carrier signal, and a set of payload locations, in which bright and dim intensities give rise to a spatial coding signal; wherein the first projection and the second projection are rigidly shifted with respect to one another so that carrier locations of the first projection at least partly overlap carrier locations of the second projection, and so that payload locations of the first projection at least partly overlap payload locations of the second projection; wherein bright and dim intensities are inverted in overlapping locations of the first projection and of the second projection in at least one of the carrier locations and the payload locations.

According to a further aspect of the invention, the processing unit may be configured to: obtain from the first image and from the second image a plurality of intensity value sets, each intensity value set including an intensity value from the first image and a spatially corresponding intensity value from the second image; apply a predefined mathematical operation on the values of each of the intensity value sets, to provide an outcome value for each of the sets; and determine the range parameters for the object based on a plurality of the outcome values.

According to a further aspect of the invention, the predefined mathematical operation is selected from a group of mathematical operations consisting of: addition, subtraction, absolute value of subtraction and division.

According to a further aspect of the invention, the processing unit may be configured to: compute, based on the plurality of the outcome values, high-accuracy information for at least one of: (a) a set of carrier elements of the first projection, and (b) a set of payload elements of the first projection, wherein the high-accuracy information having a data type selected from a group of data types consisting of: high accuracy location information and high accuracy color information; and determine the range parameters for the object based on the high accuracy information.

According to a further aspect of the invention, the rigid shift between the first projection and the second projection is not parallel to any coding direction of the bi-dimensionally coded light pattern.

According to a further aspect of the invention, each of the first projection and the second projections includes a plurality of feature types, where each feature type is formed by a different formation of feature elements from a first set of feature elements and from a second set of feature elements; and wherein in each pair out of a plurality of pairs of spatially overlapping feature types in the first and second projections, the feature elements of the second set of feature elements from the feature type in the first projection have a coding state that is different than a coding state of the feature elements of the second set of feature elements from a respective feature type of the second projection.

According to a further aspect of the invention, each feature type is formed by a different formation of feature elements from the first set of feature elements, from the second set of feature elements, and from at least one additional set of feature elements, other than the first set and the second set.

According to a further aspect of the invention, in each pair out of the plurality of pairs of spatially overlapping feature types in the first and second projections, the feature elements of the second set of feature elements from the feature type in the first projection are an inverse of the corresponding feature elements of the second set of feature elements from a respective feature type of the second projection.

According to a further aspect of the invention, in each pair out of the plurality of pairs, for each feature element from the first set of feature elements that is included in the feature type of the first projection, an inverse of the feature element is included in the feature type of the second projection.

According to a further aspect of the invention, the rigid shift between the first projection and the second projection provides a desired relation among the feature elements in the feature types in each of the plurality of pairs.

According to a further aspect of the invention, the rigid shift between the first projection and the second projection causes feature elements from the first set of feature elements to appear as inverse feature elements in the second projection.

According to an aspect of the invention, there is disclosed a method for computing range information for an object, the method including: collecting light reflected from the object to provide: a first image in which the object is imaged with a first projection of a bi-dimensionally coded light pattern projected thereon, and second image in which the object is imaged with the second projection of the bi-dimensionally coded light pattern projected thereon; wherein the first projection and the second projection are rigidly shifted with respect to one another; and processing the first image and the second image to determine range parameters for the object.

Further optional aspects of the invention pertaining to the method are disclosed below.

According to a further aspect of the invention, the bi-dimensionally coded light pattern is coded using discrete coding.

According to a further aspect of the invention, the processing may include: obtaining from the first image and from the second image a plurality of intensity value sets, each intensity value set including an intensity value from the first image and a spatially corresponding intensity value from the second image; applying a predefined mathematical operation on the values of each of the intensity value sets, to provide an outcome value for each of the sets; and determining the range parameters for the object based on a plurality of the outcome values.

According to a further aspect of the invention, the predefined mathematical operation is selected from a group of mathematical operations consisting of: addition, subtraction, absolute value of subtraction and division.

According to a further aspect of the invention, the processing may include: (i) computing, based on the plurality of the outcome values, high-accuracy information for at least one of: (a) a set of carrier elements of the first projection, and (b) a set of payload elements of the first projection, wherein the high-accuracy information having a data type selected from a group of data types consisting of: high accuracy location information and high accuracy color information; and (ii) determining the range parameters for the object based on the high accuracy information.

According to a further aspect of the invention, the rigid shift between the first projection and the second projection is not parallel to any coding direction of the bi-dimensionally coded light pattern.

According to a further aspect of the invention, each of the first projection and the second projections includes a plurality of feature types, where each feature type is formed by a different formation of feature elements from a first set of feature elements and from a second set of feature elements; and wherein in each pair out of a plurality of pairs of spatially overlapping feature types in the first and second projections, the feature elements of the second set of feature elements from the feature type in the first projection have a coding state that is different than a coding state of the feature elements of the second set of feature elements from a respective feature type of the second projection.

According to a further aspect of the invention, each feature type is formed by a different formation of feature elements from the first set of feature elements, from the second set of feature elements, and from at least one additional set of feature elements, other than the first set and the second set.

According to a further aspect of the invention, in each pair out of the plurality of pairs of spatially overlapping feature types in the first and second projections, the feature elements of the second set of feature elements from the feature type in the first projection are an inverse of the corresponding feature elements of the second set of feature elements from a respective feature type of the second projection.

According to a further aspect of the invention, in each pair out of the plurality of pairs, for each feature element from the first set of feature elements that is included in the feature type of the first projection, an inverse of the feature element is included in the feature type of the second projection.

According to a further aspect of the invention, the rigid shift between the first projection and the second projection provides a desired relation among the feature elements in the feature types in each of the plurality of pairs.

According to a further aspect of the invention, the rigid shift between the first projection and the second projection causes feature elements from the first set of feature elements to appear as inverse feature elements in the second projection.

According to an aspect of the invention, there is disclosed a program storage device readable by machine, tangibly embodying a program of instructions executable by the machine to perform method for computing range information for an object, including the steps of: (a) collecting light reflected from the object to provide: a first image in which the object is imaged with a first projection of a bi-dimensionally coded light pattern projected thereon, and second image in which the object is imaged with the second projection of the bi-dimensionally coded light pattern projected thereon; wherein the first projection and the second projection are rigidly shifted with respect to one another; and (b) processing the first image and the second image to determine range parameters for the object.

Further optional aspects of the invention pertaining to the program storage device are disclosed below.

According to a further aspect of the invention, the bi-dimensionally coded light pattern is coded using discrete coding.

According to a further aspect of the invention, the processing includes: obtaining from the first image and from the second image a plurality of intensity value sets, each intensity value set including an intensity value from the first image and a spatially corresponding intensity value from the second image; applying a predefined mathematical operation on the values of each of the intensity value sets, to provide an outcome value for each of the sets; and determining the range parameters for the object based on a plurality of the outcome values.

According to a further aspect of the invention, the predefined mathematical operation is selected from a group of mathematical operations consisting of: addition, subtraction, absolute value of subtraction and division.

According to a further aspect of the invention, the processing includes: (i) computing, based on the plurality of the outcome values, high-accuracy information for at least one of: (a) a set of carrier elements of the first projection, and (b) a set of payload elements of the first projection, wherein the high-accuracy information having a data type selected from a group of data types consisting of: high accuracy location information and high accuracy color information; and (ii) determining the range parameters for the object based on the high accuracy information.

According to a further aspect of the invention, the rigid shift between the first projection and the second projection is not parallel to any coding direction of the bi-dimensionally coded light pattern.

According to a further aspect of the invention, each of the first projection and the second projections includes a plurality of feature types, where each feature type is formed by a different formation of feature elements from a first set of feature elements and from a second set of feature elements; and wherein in each pair out of a plurality of pairs of spatially overlapping feature types in the first and second projections, the feature elements of the second set of feature elements from the feature type in the first projection have a coding state that is different than a coding state of the feature elements of the second set of feature elements from a respective feature type of the second projection.

According to a further aspect of the invention, each feature type is formed by a different formation of feature elements from the first set of feature elements, from the second set of feature elements, and from at least one additional set of feature elements, other than the first set and the second set.

According to a further aspect of the invention, in each pair out of the plurality of pairs of spatially overlapping feature types in the first and second projections, the feature elements of the second set of feature elements from the feature type in the first projection are an inverse of the corresponding feature elements of the second set of feature elements from a respective feature type of the second projection.

According to a further aspect of the invention, in each pair out of the plurality of pairs, for each feature element from the first set of feature elements that is included in the feature type of the first projection, an inverse of the feature element is included in the feature type of the second projection.

According to a further aspect of the invention, the rigid shift between the first projection and the second projection provides a desired relation among the feature elements in the feature types in each of the plurality of pairs.

According to a further aspect of the invention, the rigid shift between the first projection and the second projection causes feature elements from the first set of feature elements to appear as inverse feature elements in the second projection.

According to a further aspect of the invention, the program of instructions further includes instructions executable by the machine to perform: controlling a projection onto the object of the first projection of the bi-dimensionally coded light pattern and of the second projection of the bi-dimensionally coded light pattern.

According to a further aspect of the invention, the program of instructions further includes instructions executable by the machine to perform: controlling collection of light reflected from the object to provide the first image the second image.

Various techniques, assemblies and technologies may be used to achieve a rigid shift or offset according to embodiments of the present invention. U.S. Provisional Patent Application No. 62/036,158, from which this application claims priority, teaches such offsetting methods and technologies, and is hereby incorporated by reference in its entirety.

BRIEF DESCRIPTION OF THE DRAWINGS

In order to understand the invention and to see how it may be carried out in practice, embodiments will now be described, by way of non-limiting example only, with reference to the accompanying drawings, in which:

FIGS. 1A, 1B, and 1C are functional block diagrams illustrating examples of systems, in accordance with examples of the presently disclosed subject matter;

FIG. 2 is a functional block diagram illustrating an example of a system, in accordance with examples of the presently disclosed subject matter;

FIGS. 5-38 are examples of bi-dimensionally coded light patterns which may be used for rigidly shifted projections in the systems and methods disclosed and claimed herein.

FIG. 39 illustrates several projections of the bi-dimensionally coded light pattern of FIG. 32 projected onto an object (in this instance a Rubik's cube, not denoted), in accordance with examples of the presently disclosed subject matter FIGS. 40A through 40H exemplify some of the procedures which may be used with two projections of the same pattern, based on the details and upsamples taken from FIG. 39, in accordance with examples of the presently disclosed subject matter;

FIGS. 41A through 41D exemplify some of the procedures which may be used with one of the projections of the pattern in addition to another non-patterned lighting based on the details and upsamples taken from FIG. 39, in accordance with examples of the presently disclosed subject matter;

FIG. 45 illustrates substages of a stage of projecting the first projection and the second projection of the bi-dimensionally coded light pattern onto the object, in accordance with examples of the presently disclosed subject matter;

FIG. 46 illustrates substages of a stage of projecting the first projection and the second projection of the bi-dimensionally coded light pattern onto the object, in accordance with examples of the presently disclosed subject matter;

FIG. 47 illustrates substages of a stage of collecting light reflected from the object to provide the first image and the second image, in accordance with examples of the presently disclosed subject matter;

FIG. 48 illustrates optional substages of a stage of processing the first image and the second image to determine range parameters for the object, in accordance with examples of the presently disclosed subject matter;

FIG. 49 illustrates optional substages of a stage of processing the first image and the second image to determine range parameters for the object, in accordance with examples of the presently disclosed subject matter;

FIG. 50 is a flow chart illustrating an example of optional substages of a stage of processing the first image and the second image to determine range parameters for the object, in accordance with examples of the presently disclosed subject matter;

FIGS. 57A and 57B are flow charts illustrating examples of a method for computing range information for an object, in accordance with examples of the presently disclosed subject matter;

Figure 4:
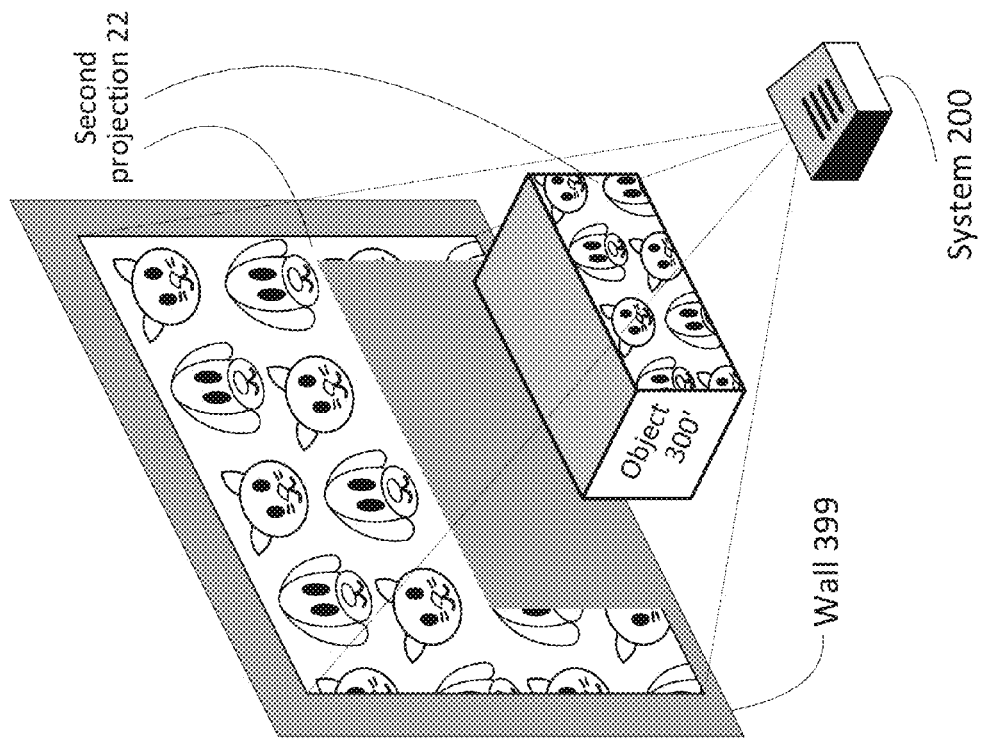
FIGS. 3 and 4 illustrate an example of a system within an environment which includes system and an object, in accordance with examples of the presently disclosed subject matter.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

In the drawings and descriptions set forth, identical reference numerals indicate those components that are common to different embodiments or configurations.

Unless otherwise defined, all technical and scientific terms used herein have the same meaning as commonly understood by one of ordinary skill in the art to which this invention belongs. The materials, methods, and examples provided herein are illustrative only and not intended to be limiting. Except to the extent necessary or inherent in the processes themselves, no particular order to steps or stages of methods and processes described in this disclosure, including the figures, is intended or implied. In many cases the order of process steps may vary without changing the purpose or effect of the methods described.

Unless specifically stated otherwise, as apparent from the following discussions, it is appreciated that throughout the specification discussions utilizing terms such as "processing", "calculating", "computing", "determining", "selecting", "defining", or the like, include action and/or processes of a computer that manipulate and/or transform data into other data, said data represented as physical quantities, e.g. such as electronic quantities, and/or said data representing the physical objects. The terms "computer", "processor", and "controller" should be expansively construed to cover any kind of electronic device, component or unit with data processing capabilities, including, by way of non-limiting example, a personal computer, a server, a computing system, a communication device, a processor (e.g. digital signal processor (DSP), and possibly with embedded memory), a microcontroller, a field programmable gate array (FPGA), an application specific integrated circuit (ASIC), etc.), any other electronic computing device, and or any combination thereof.

The operations in accordance with the teachings herein may be performed by a computer specially constructed for the desired purposes or by a general purpose computer specially configured for the desired purpose by a computer program stored in a computer readable storage medium.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus the appearance of the phrase "one case", "some cases", "other cases" or variants thereof does not necessarily refer to the same embodiment(s).

It is appreciated that certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable subcombination.

In embodiments of the presently disclosed subject matter one or more stages illustrated in the figures may be executed in a different order and/or one or more groups of stages may be executed simultaneously and vice versa. The figures illustrate a general schematic of the system architecture in accordance with an embodiment of the presently disclosed subject matter. Each module in the figures can be made up of any combination of software, hardware and/or firmware that performs the functions as defined and explained herein. The modules in the figures may be centralized in one location or dispersed over more than one location.

It should be noted that some examples of the presently disclosed subject matter are not limited in application to the details of construction and the arrangement of the components set forth in the following description or illustrated in the drawings. The invention can be capable of other embodiments or of being practiced or carried out in various ways. Also, it is to be understood that the phraseology and terminology employed herein is for the purpose of description and should not be regarded as limiting.

In this document, an element of a drawing that is not described within the scope of the drawing and is labeled with a numeral that has been described in a previous drawing has the same use and description as in the previous drawings. Similarly, an element that is identified in the text by a numeral that does not appear in the drawing described by the text, has the same use and description as in the previous drawings where it was described.

The drawings in this document may not be to any scale. Different Figs. may use different scales and different scales can be used even within the same drawing, for example different scales for different views of the same object or different scales for the two adjacent objects.

FIGS. 1A, 1B and 1C are functional block diagrams illustrating examples of system 200, in accordance with examples of the presently disclosed subject matter. System 200 may be an electro-optical, but this is not necessarily so. System 200 may be utilized for determining range parameters for at least one object 300 which is imaged by system 200. A description of key components and operation modes of system 200 are discussed below.

Generally, by way of introduction, system 200 includes projector 210 which is operable to project a coded pattern to provide a first projection of the coded pattern and a second projection of the coded pattern, wherein the first projection and the second projection are rigidly shifted with respect to one another.

Projector 210 is operable to project the first projection and the second projection such that a first reflection off an object which is associated with the first projection and a second reflection off the object which is associated with the second projection are provided, and wherein a signal corresponding to the first reflection and a signal corresponding to the second reflection can be co-processed.

The first reflection is a reflection of light of the first projection off the object (e.g. object 300). The first reflection may include only some of the light of the first projection, e.g. because some of the light of the first projection may not reach the object at all, and some of the light hitting the object may be absorbed by the object or transmitted through the object, and therefore not reflected back. It is noted that not all of the light of first reflection will necessarily reach system 200 (and especially imaging sensing unit 230). Therefore, when utilization of the first reflection is discussed, it is possible that system 200 will only utilize parts of the light of the first reflection. The term "second reflection" is used in a similar way to the term "first reflection", but refers to reflection of the second projection.

The signal corresponding to the first reflection is a signal captured by imaging sensing unit 230 of system 200 which is a result of light of the first reflection. The signal corresponding to the second reflection is a signal captured by imaging sensing unit 230 which is a result of light of the second reflection. It is noted that the overall signal captured by imaging sensing unit 230 at any time may be a combination of one or more of these signals, and possibly with other signals as well (e.g. ambient light).

Co-processing of the signal corresponding to the first reflection and of the signal corresponding to the second reflection pertains to processing of signal collected by imaging sensing unit, which includes both of these signals (concurrently or at different times), to provide useful information. It is noted that the co-processing may include processing each of the signals individually (e.g. for reducing noise) and only afterwards processing the results together, but may also include processing the two signals concurrently (whether the signals were collected at the same time or not).

For example, the signal corresponding to the first reflection and the signal corresponding to the second reflection may be co-processed to determine range parameters (e.g. range parameters for object 300), as discussed below in greater detail. Other parameters may also be determined in the co-processing.

Projector 210 may therefore optionally enable an imaging sensing unit (either an external unit 1230 and/or an internal component of system 200, unit 230, e.g. a camera) to capture a first image in which an object 300 is imaged with the first projection of the coded light pattern projected thereon, and second image in which the object is imaged with the second projection of the coded light pattern projected thereon; to enable a processing unit (either an external unit 1240 and/or an internal component of system 200, unit 240) to process the first image and the second image to determine range parameters (e.g. range parameters for object 300). The range parameters determined for the object may be, for example, depth values (e.g. distance from the camera) for different parts of the imaged object.

As discussed below in greater detail, a bi-dimensionally coded light pattern may be used as the coded light pattern.

The determining of the range parameter for object 300 is therefore enabled by projector 210 which projects onto one or more objects 300 two or more non-coinciding projections of a single coded light pattern. Optionally, projector 210 may be controlled by projector control unit 220 to project such two or more non-coinciding projections of a single coded light pattern onto the one or more objects 300.

It is noted that systems which project a light pattern onto an object, capture an image of the illuminated object and process the captured image to determine range information are known in the art, such as the systems discussed in previous patents and patent applications assigned to the assignee of the present application.

Furthermore, U.S. Pat. No. 8,538,166 entitled "3D geometric modeling and 3D video content creation", assigned to the assignee of the present application, discloses utilization of a first light pattern and a second light pattern, each projected onto one or more objects, capturing image data when each of the first and second light patterns are projected onto these one or more objects, and utilizing the image data acquired from the projection of these two different light patterns for determining range parameters of the objects.

The systems and methods disclosed and claimed in the present disclosure use two or more projections of a single coded light pattern onto one or more objects. The two or more projections are rigidly shifted with respect to each other. The object (or more generally, the scene) is illuminated differently when the single light pattern is projected onto it in different projections which are shifted with respect to each other. In some examples, where the light coding is a result of projecting different tones of light (for example, a bi-tonal projection), a reflected portion of the different projections on an object, resulting from the different illumination of the object (or of the scene) by the rigidly shifted projections of the pattern, can include areas which appear darker in the reflection of one of the projections as compared to the appearance of the same areas in the reflection of the other projection, and some points/areas may be brighter in this one projection than in the other one.

As will be discussed below in greater detail, utilizing a single light pattern in rigidly shifted projections has some advantages or benefits, under certain circumstances or conditions relative to utilizing a single projection of a single light pattern, or utilizing several projections of different light patterns.

The term "coded light pattern" (also occasionally referred to as "structured light pattern" and "coded structured light pattern") is well accepted in the art, and should be construed in a non-limiting way to include patterns which are designed so that codewords are assigned to a set of locations (e.g. pixel neighborhoods) of the pattern. Every coded location (e.g. every coded pixel neighborhood) has its own codeword, so there is a direct mapping from the codewords to the corresponding coordinates of the locations (e.g. pixel neighborhoods) in the pattern. The codewords are embedded in the coded pattern, using any combination of one or more of the following: grey levels, colors, color levels, polarization and geometrical shapes.

As aforementioned, in some examples discussed below, a bi-dimensionally coded light pattern is used. It is nevertheless noted that in various variations to these examples, other coded light patterns may be used instead, wherever applicable. While such variations are not always discussed in full, for reasons of readability and brevity, such variations are within the scope of the presently disclosed subject matter. For example, multi-dimensionally coded light patterns may be used, where addition coding dimension may be achieved by using multiple colors, different polarizations, etc.

Optionally, each of the first projection and the second projections (both projected by projector 210) includes a plurality of feature types, where each feature type is formed by a different formation of feature elements. Few nonlimiting examples of feature types are provided in FIG. 59.

Optionally, projector 210 may be operable to project the first projection and the second projection such that pairs of overlapping feature types are received—so that one feature type of each pair is a feature type from said first projection and another feature type of the pair is a feature types from said second projection. This can be demonstrated in overlap image 33 of FIG. 58, if projections 11 and 22 are projections of full feature types, e.g. of feature types 95 and 96 exemplified in FIG. 59.

Optionally, in a pair of overlapping feature types, a feature element of a feature type from the first projection has a predefined relationship with a corresponding feature element of a feature type from the second projection. For example, the feature element of the feature type from the first projection may have a coding state that is different than coding state of the corresponding feature element of the feature type from said second projection. For example, the feature element of the feature type from said first projection and the corresponding feature element of the feature type from said second projection have inverse coding states. Examples of coding states are provided herein below.

Projector 210 may be implemented in many different ways, using a wide range of technologies, examples of some of which are offered below. By way of example, projector 210 as illustrated in FIG. 2, includes: (a) light source 212 which is capable of generating at least one light beam propagating to patterning optics 214, and (b) patterning optics 214, capable of patterning the at least one light beam to provide a coded light pattern (e.g. a bi-dimensionally coded light pattern). For example, light source 212 may be a laser array (an array including a plurality of individual laser emitters) capable of generating a plurality of laser beams propagating to patterning optics 214. Examples of different types of patterning optics (e.g. a transparency mask, a diffractive optical element, etc.), are discussed below in greater detail.

System 200 may further include (e.g. as part of projector 210) a pattern source for the bi-dimensionally coded light pattern. The pattern source may be, for example, part of patterning optics 214. For example, the pattern source may be included in system 200 as a pattern inscribed on a transparency mask (also referred to as "optical mask"), or as a pattern integrated into a diffractive optical element (DOE) which diffracts incident light to provide the bi-dimensionally coded light pattern. Optionally, projector 210 may include a transparency mask to provide the bi-dimensionally coded light pattern. Optionally, projector 210 may include a diffractive optical element which is operable to diffract incident light to form the bi-dimensionally coded light pattern.

For example, the pattern source may be implemented on a transparency mask (e.g. as an inscribed transparency pattern which transforms incident light to provide the bi-dimensionally coded light pattern). For example, system 200 may include a diffractive optical element which is operable to diffract incident light to form the bi-dimensionally coded light pattern.

As exemplified in FIG. 1C system 200 may further include optional projector control unit 220 which is configured to control projector 210 for projecting onto an object 300 a first projection of the bi-dimensionally coded light pattern and a second projection of the bi-dimensionally coded light pattern, wherein the first projection and the second projection are rigidly shifted with respect to one another.

It is noted that projector control unit 220 may be implemented in different ways, including hardware only implementation, or any combination of one or more of: hardware, software and firmware. Optional projector control unit 220 may be integrated into projector 210 (e.g. as a chip within a casing of projector 210), or external to it. The connection between projector control unit 220 and projector 210 may be a wired connection, a wireless connection, or any other connection which is used in the art.

Figure 3:
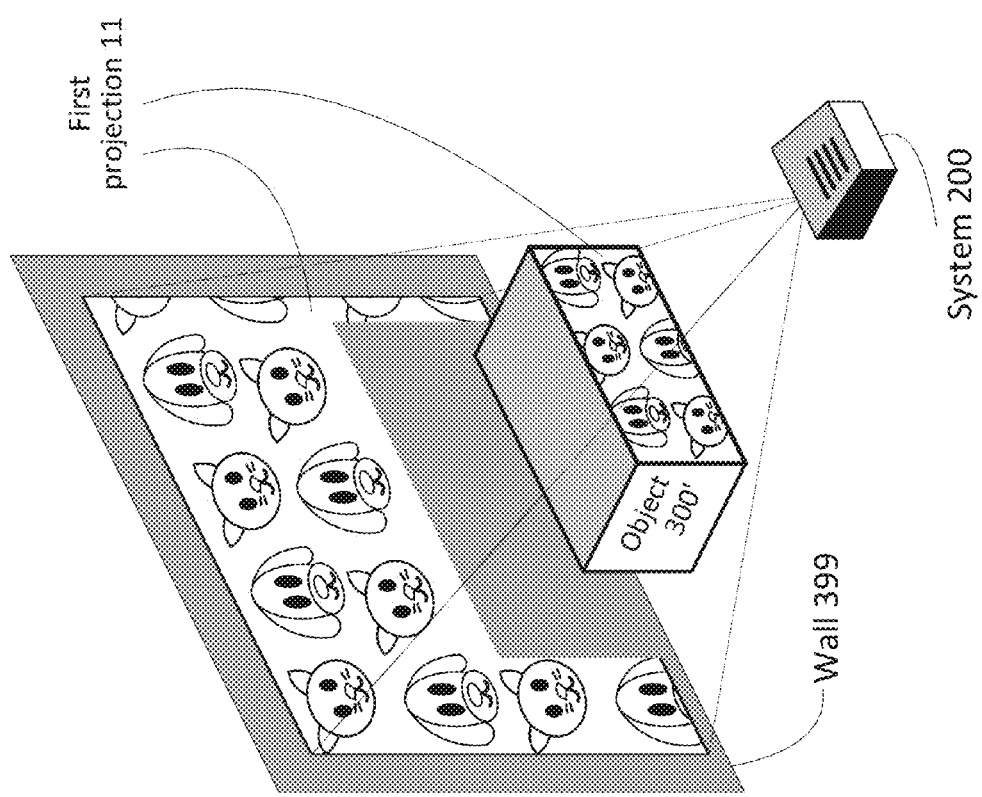

FIGS. 3 and 4 illustrate an example of system 200 within an environment which includes system 200 and an object 300" (for which range parameters are to be determined by system 200), in accordance with examples of the presently disclosed subject matter. In the illustrated example, projector 210 projects onto an object 300" (and onto a background scene which includes in this example a wall denoted 399) a first projection of the bi-dimensionally coded light pattern (denoted "First projection 11" in FIG. 3) and a second projection of the bi-dimensionally coded light pattern (denoted "Second projection 22" in FIG. 4).

First projection 11 and second projection 22 may be projected onto the scene at different times (for example, FIG. 3 illustrates the environment at time T1, and FIG. 4 illustrates the environment at time T2 which is later than T1). As can be seen, the first projection and the second projection of the bi-dimensionally coded light pattern (which in this case is a bi-dimensionally coded light pattern which includes alternating zoomorphic graphemes) are rigidly shifted with respect to one another. As is also demonstrated in FIGS. 3 and 4, different parts of the projected coded light pattern are scaled by a different scale factor, depending on the distance of an illuminated object on which the different parts of the pattern fall from system 200. In addition, one object (or a certain area of an object) may cast a shadow on another object (or on another area of the same object), thereby hiding a part (or the entirety) of another object from system 200.

The term "rigidly shifted" refers to various rigid geometrical transformations which include: rotations, translations, reflections, and their combination.

The second projection of the bi-dimensionally coded light pattern is rigidly shifted with respect to the first projection of the bi-dimensionally coded light pattern. Accordingly, when these projections are projected onto a perpendicular projection plane, which is a plane that is perpendicular to a projection direction of the first projection, a distance between any two features of the bi-dimensionally coded light pattern in the second projection on the perpendicular projection plane is practically equal to a distance between these two features in the first projection on the perpendicular projection plane.

While theoretically the distances between any two features of the bi-dimensionally coded light pattern would remain identical between the two projections, a person who is of ordinary skill in the art would appreciate that within the scope of the present discussion some variations within certain practical limits may be tolerated without significantly affecting functioning of the systems and methods disclosed.

For example, the bi-dimensionally coded light pattern may have a minimal interpretation distance $D_{MI}$ between distinct features which constitute a codeword. For example, such minimal interpretation distance may be the distance between any adjacent carrier locations of the bi-dimensionally coded light pattern and/or the distance between any adjacent payload locations of the bi-dimensionally coded light pattern (terms which are discussed below). It is noted that the carrier locations may be periodically distributed, but this is not necessarily so. Likewise, the payload locations may be periodically distributed, but this is not necessarily so.

For example, such minimal interpretation distance may be the distance between any adjacent first feature elements of the bi-dimensionally coded light pattern and/or the distance between any adjacent second feature elements of the bi-dimensionally coded light pattern (terms which are discussed below).

The difference between the distances between the locations of any two features $F_1$ and $F_2$ in the two different projections of the bi-dimensionally coded light pattern on the aforementioned perpendicular projection plane may therefore be written as $D_{F_1F_2}(P_1)$ for the first projection, and $D_{F_1F_2}(P_2)$ for the second projection. An acceptable tolerance of the rigid shift between the two projections may be, for example, if for all (or most) pairs of any two features F1 and F2 of the bi-dimensionally coded light pattern, the difference between the distances of these features in this two projections, $\Delta D_{F_1F_2}(P_1,P_2)=|D_{F_1F_2}(P_1)-D_{F_1F_2}(P_2)|$ would fulfill the condition that $\Delta D_{F_1F_2}(P_1,P_2) \ll D_{MI}$. Therefore, two projection of the bi-dimensionally coded light pattern may be considered rigidly shifted with respect for one another if for all (or most) feature pairs in the pattern $\Delta D_{F_1F_2}(P_1,P_2) \ll D_{MI}$ for example, if for all (or most) features of the pattern $\Delta D_{F_1F_2}(P_1,P_2) < m \cdot D_{MI}$ for m<0.1

As aforementioned, the term "rigidly shifted" may pertain to various rigid geometrical transformations including rotations, translations, reflections, and their combination. A private case which is relevant for rigid shifts which consist only of translations is discussed below.

The second projection of the bi-dimensionally coded light pattern can be translationally shifted with respect to the first projection of the bi-dimensionally coded light pattern so that when these projections are projected onto a perpendicular projection plane, each feature of the bi-dimensionally coded light pattern in the second projection is located on the perpendicular projection plane at a location which is distanced by a shifting distance (and at a shifting direction) with respect to the location on the projection plane of the same feature in the first projection of the bi-dimensionally coded light pattern.

While theoretically, the shifting distances of all of the features in the bi-dimensionally coded light pattern would be identical, as would the shifting directions of the different features, a person who is of ordinary skill in the art would appreciate that within the scope of the present discussion, both the shifting distances and the shifting directions of the different features of the bi-dimensionally coded light pattern may vary within certain practical limits without significantly affecting functioning of the systems and methods disclosed.

For example, an average shifting vector in the aforementioned perpendicular projection plane, $\overline{V_{AVG}}$, may be defined between the first projection and the second projection. The distance between the locations in the two different projections of any given feature F of the bi-dimensionally coded light pattern on the aforementioned perpendicular projection plane may therefore be written as $\overline{V_{AVG}} + \overline{\Delta V_F}$ where $\overline{\Delta V_F}$ is the deviation from the average of the distance between the two projections of feature F. Therefore, the shifting of two projections of the bi-dimensionally coded light pattern can be designed so that for all (or most, or n % of all features, etc.) features in the pattern $\overline{\Delta V_F} \ll D_{MT}$, for example. Further by way of example, the shifting of the pattern can be designed so that for all (or most, or n % of all features, etc.) features of the pattern, $\overline{\Delta V_F} < m \cdot D_{MT}$ for m<0.1.

It is noted that while locations of payload elements may be used (as discussed above, pertaining to "payload locations"), more generally a "payload element" or a "payload feature element" may be used. In the following discussion, whenever a "payload location" is referred to, it is noted that the same discussion also pertains to an extended variation in which a "payload element" or a "payload feature element" is referred to instead.

It is noted that while locations of carrier elements may be used (as discussed above, pertaining to "carrier locations"), more generally a "carrier element" or a "carrier feature element" may be used. In the following discussion, whenever a "carrier location" is referred to, it is noted that the same discussion also pertains to an extended variation in which a "carrier element" or a "carrier feature element" is referred to instead.

Reverting to system 200 itself, as aforementioned, projector 210 is configured to project onto object 300 at least two projections of the bi-dimensionally coded light pattern—the first projection and the second projection, which are shifted with respect to one another. It is noted that in some possible implementations of system 200 the two projections may be projected concurrently (e.g. using different wavelength illumination by projector 210, where light of the first projection is projected in a wavelength—or wavelengths—which are different than the wavelength—or wavelengths—in which light of the second projection is projected), but this is not necessarily so. In some possible implementations of system 200 the two projections do not coincide temporally, but are rather projected at different times.

The time difference between the projections can be minimal. In one example, the second projection is emitted at the pulse which immediately follows the pulse which was used to project the first projection. In further examples, each of the pulses occurs at a different frame. The shifting operating can be carried out between the time of the pulse that was used to provide the first projection and the time of the pulse that was used to provide the second projection. In still further examples, the pulse that is used to provide the first projection is timed to the end of a first frame, and the pulse that is used to provide the second projection is timed to the start of a second frame which is immediately subsequent to the first frame. A certain time-gap can be kept between the first and the second pulses to enable the shifting operation to take place. It would be appreciated that in the latter scenario the limiting factor for the (first and second) projections of the pattern can be, for example, the read-out or processing of the images of the projected pattern. In other example, the limiting factor can be the duration of the shifting operation. Other factors can also influence the timing of the two (or more) projections. More complex projection schemes are also contemplated in certain examples of the presently disclosed subject matter, for example, the second projection can be provided every n-th first projections. Thus, for example, the second projection is provided every five times the first projection is provided. Similar and various other projection schemes can be devised for more than two projections.

The projection by projector 210 may include, for example, controlling light source 212 and/or controlling patterning optics 214 for projecting the two different projections of the bi-dimensionally coded light pattern. Different examples of these two options are discussed below in greater detail. If projector control unit is implemented, the controlling of the projection by projector control unit 220 may include, for example, controlling light source 212 and/or controlling patterning optics 214.

System 200 may also include imaging sensing unit 230, which is adapted to provide a first image in which object 300 is imaged with the first projection of the bi-dimensionally coded light pattern projected thereon, and a second image in which object 300 is imaged with the second projection of the bi-dimensionally coded light pattern projected thereon. The first image and the second image include features reflected off of the object(s) upon which the bi-dimensionally coded light pattern was projected. It is noted that if an external imaging sensing unit 1230 is used (in addition to, or instead of, internal imaging sensing unit 230), all the optional features, capabilities, structures and variations of imaging sensing unit 230 are applicable also for imaging sensing unit 1230, mutatis mutandis. It is further noted that the term first and second image are used herein with reference to the first and second projections respectively by way of illustration, and that any number of images of each projection can be used and the sequence of images of the first projection and of the second projection can have any order.

It is noted that if imaging sensing unit 230 generates more than one image in which object 300 is imaged with the first projection of the bi-dimensionally coded light pattern projected thereon (e.g. taking a video of the object under the illumination of the first projection), than this group of images may be treated as the first image. Likewise, if imaging sensing unit 230 generates more than one image in which object 300 is imaged with the second projection of the bi-dimensionally coed light pattern projected thereon (e.g. taking a video of the object under the illumination of the second projection), than this group of images may be treated as the second image. Furthermore—the data of each image out of the first image and the second image does not necessarily have to be saved as an image file, and may be generated, transmitted or processed in any other form (e.g. a real time transmission of intensity information in a pixel-by-pixel order).

Imaging sensing unit 230 may include one or more image sensors such as charged-couple device (CCD) image detector, a Complementary metal-oxide-semiconductor (CMOS) image detector and so on. More than one image sensor may be utilized, for example, if the two projections are projected in different wavelengths.

The first image and the second image may pertain to the same image (or images) but may also pertain to different images. For example, the first image and the second image may be the same image (or images), if the two projections are projected concurrently, and are captured together. For example, the first image and the second image may be different images if the first projection and the second projection are projected one after the other, or if the first image and the second image are acquired at different wavelengths using different imaging sensors. Generally, imaging sensing unit 230 is operable and configured to capture one or more images of the object with the multiple projections of the bi-dimensionally coded light pattern projected thereon.

System 200 may further include processing unit 240, which is configured to process the first image and the second image to determine range parameters (e.g. range parameters for the object). The processing unit can implement a decoder which is used to decode the code which is embodied in the pattern and can be used to extract depth information from images of the reflected portion of the projected pattern. In some cases, the decoder can be implemented as a dedicated hardware unit (e.g., a VLSI), rather than computer software running on a general purpose processing unit (e.g., a CPU or a GPU).

Different ways of processing the first image and the second image—which result from projections of the same bi-dimensionally coded light pattern in projections which are shifted with respect to one another—are discussed below. It is noted that if an external processing unit 1240 is used (in addition to, or instead of, internal processing unit 240), all the optional features, capabilities, structures and variations of processing unit 240 are applicable also for processing unit 1240, mutatis mutandis.

It is noted that processing unit 240 may be implemented in different ways, including hardware only implementation, or any combination of one or more of: hardware, software and firmware. Processing unit 240 may be integrated with imaging sensing unit 230 (e.g. as a chip in a casing of imaging sensing unit 230), or external to it. The connection between processing unit 240 and imaging sensing unit 230 may be a wired connection, a wireless connection, or any other connection which is used in the art.

Optional processing unit 240 and optional projector control unit 220 may be integrated as a single processing unit, or as different units. It is also noted that optionally, processing unit 240 may send commands or information to projector control unit 220 (as illustrated as an option in FIG. 2), which are further used by projector control unit 220 to determine working parameters for projector 210. Few examples are discussed below with respect to method 500.

Processing unit 240 may either use the range parameters itself (e.g. for further computations, e.g. enable it to take an action such as magnetically lock a door connected to system 200 if any object is closer to system 200 than a predefined minimal range). Optionally, processing unit 240 may be configured to provide to an external system information which is based on the range parameters determined by it (including the range parameters themselves and/or information which is selected and/or generated based on the range parameters). This may be facilitated by a hardware and/or software interface 250 which is illustrated in FIG. 2.

Various examples of bi-dimensionally coded light pattern and some of their possible uses within the framework of the presently disclosed systems and methods will be provided below, together with a discussion of possible ways of processing the image data by processing unit 240 (or 1240). However, in order to provide the reader with some context for the data processing which may be used, few examples will be provided before exemplifying some bi-dimensionally coded light pattern variations.

The processing enabled by the projecting of the first projection and the second projection by projector 210 is exemplified below. It is noted that all of the processing, procedures and computations which are discussed with respect to optional processing unit 240 are processing, procedures and computations which are enabled by projector 210 in one or more of its possible implementations.

For example, processing unit 240 may be configured to execute the following sequence of operations over the first image and the second image:
  a. Obtain from the first image and from the second image a plurality of intensity value sets, each intensity value set including an intensity value from the first image and a spatially corresponding intensity value from the second image (e.g. sampling intensity values of light arriving from the same spot on object 300, in the different illuminations);
  b. Apply a predefined mathematical operation on the values of each of the intensity value sets, to provide an outcome value for each of the sets (e.g. applying addition, subtraction, division, or finding the absolute value of subtraction between the intensity value of each of the sets); and
  c. Determine the range parameters for the object (or areas of the object) based on a plurality of the outcome values.

It is noted, and will be clear to a person who is of ordinary skill in the art, that the intensity values taken from the first and the second images are not necessarily intensity values of specific pixels, but may be calculated from the intensity values of several or a group of pixels. For example, an intensity value which corresponds to a given pixel in a given image may be calculated by weighting the intensity value of the respective pixel, with the intensity values of adjacent (or otherwise neighboring pixels). In another example, an intensity value which corresponds to a given pixel in a given image may be calculated based on intensity values of one or more neighboring pixels of the respective pixel (but not of the respective pixel itself), such as the minimal and/or maximal intensity value in a 3×3 neighborhood of pixels around the respective pixel.

The intensity values may be determined based on the first image (or second image) directly, but may also be determined based on an intermediate image—which is generated by applying local filters (e.g. Finite impulse response filter, FIR) to the respective first or second image.

Furthermore, the outcome of the mathematical operation may be further processed (e.g. by applying another operation to the result), before the outcome value is used for further processing (e.g. for determining range parameters). For example, a correction operation which is based on a local gain of the respective first or second image may be applied to the outcome value.

Such complex mathematical operations (which are based on more information than the intensity values of a single pixel in each of the first and the second images) may be used for various reasons. For example, it may be used in order to reduce influences of noise, of high frequencies in any one of the images, of different illumination levels with respect to a dynamic range of the sensor, of non uniformities in the illumination sources, and so on.

While not necessarily so, the predefined mathematical operation may be selected from a group of mathematical operations consisting of: addition, subtraction, division, and absolute value of subtraction. It is noted that the mathematical operation used may be other than the ones mentioned above, may include more than one operation, and possibly be dependent on other parameters as well (e.g. mean intensity of the image). Examples of mathematical operations which may be executed between two projections of the bi-dimensionally coded light pattern are provided below, e.g. with respect to FIGS. 40A through 40H, after presenting several examples for bi-dimensionally coded light patterns which may be used, in accordance with examples of the presently disclosed subject matter, in FIGS. 5-38.

Referring to system 200 as a whole, optionally the bi-dimensionally coded light pattern may include first feature elements and second feature elements. The first feature elements are feature elements which belong to a first set of feature elements, and the second feature elements are feature elements which belong to a second set of feature elements.

A spatial relation among the first feature elements and the second feature elements may be such that under a predetermined rigid shifting of the bi-dimensionally coded light pattern (e.g. between the two projections), in each pair out of a plurality of pairs of spatially overlapping feature types in the first and second projections, the feature elements of the second set of feature elements from the feature type in the first projection have a coding state that is different than a coding state of the feature elements of the second set of feature elements from a respective feature type of the second projection.

Optionally, for each group of first feature elements out of a plurality of groups of adjacent first feature elements in the bi-dimensionally coded light pattern, the group of first feature elements is decodable to provide information indicative of location of the subgroup of first feature elements in the bi-dimensionally coded light pattern. Such decodable groups of feature elements may belong to a single "feature types".

A "feature type" is one out of one or more visual representations of a "codeword" in the bi-dimensionally coded light pattern. For example, a codeword may consist of an array of symbols or characters (e.g. a binary array) or feature elements, while the feature type may be a rectangle of varying color intensities (e.g. rectangle 123 in FIGS. 7-34), which corresponds to the array of characters.

A feature type is identifiable in the bi-dimensionally coded light pattern, and may be identified in projections of the bi-dimensionally coded light pattern and in reflections thereof. Each feature type of the bi-dimensionally coded light pattern is formed by a different formation of first feature elements (feature elements from the first set of feature elements) and of second feature elements (feature elements from the second set of feature elements). For example, each feature type may be formed by a different formation of carrier elements and payload elements.

It is noted that feature types may be formed by feature elements of more than two sets. That is, optionally some or all of the feature types of the bi-dimensionally coded light pattern may be formed by different formations of feature elements from the first set of feature elements, from the second set of feature elements, and from at least one additional set of feature elements, other than the first set and the second set.

Optionally, a plurality of subgroups of the first feature elements may be processed to detect one or more of the second feature elements. For example, each subgroup of first feature elements which are easily identifiable (e.g. black and white circles) may include four first feature element arranged on the vertexes of a square (or of a rectangle, a parallelogram, etc., e.g. as illustrated in FIGS. 5-34), and the second feature element may be found by computing the center of the respective quadrilateral.

Figure 58:
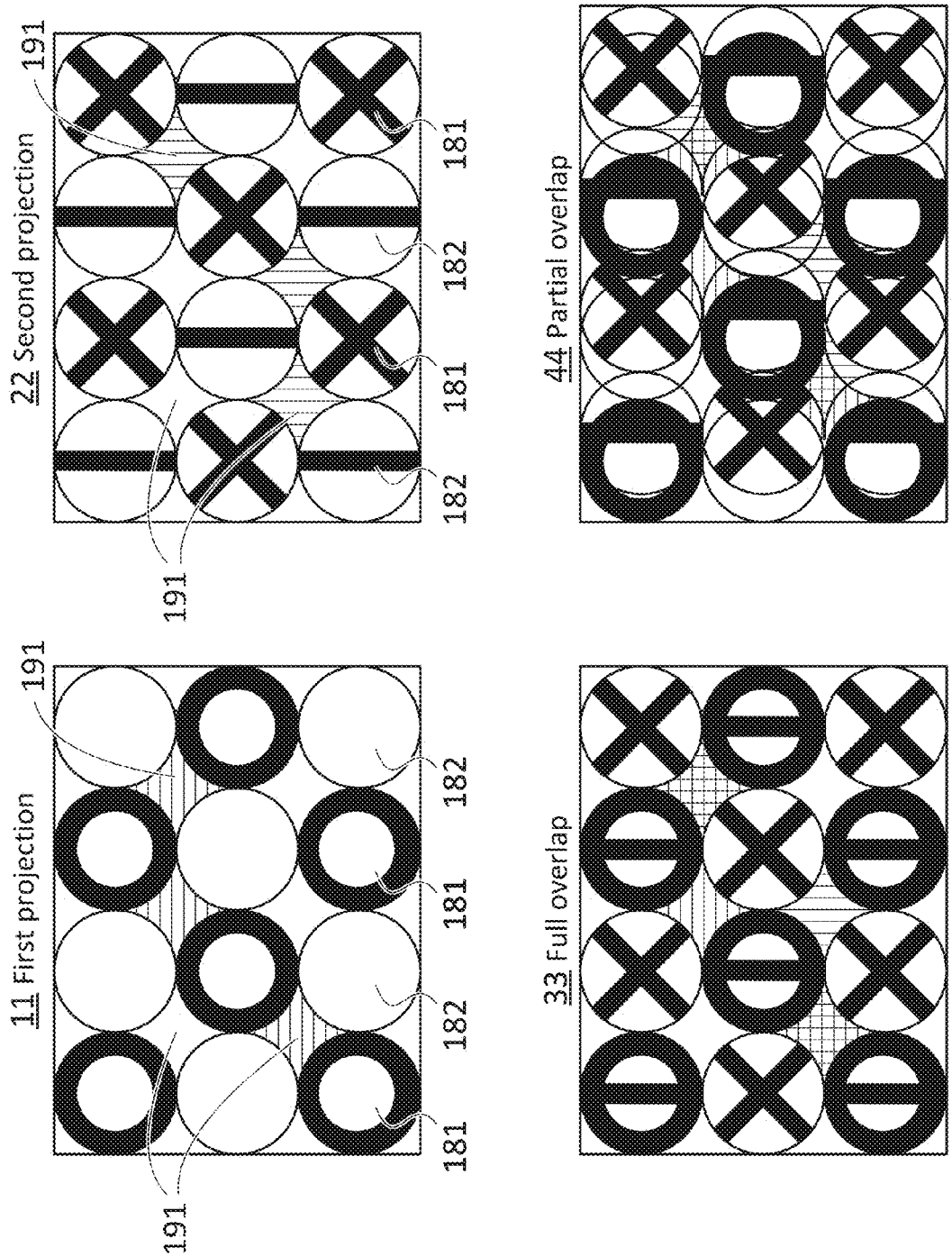
FIG. 58 illustrates an overlap of a first projection and a second projection, in accordance with examples of the presently disclosed subject matter.

Optionally, each first feature element in the second projection at least partly overlaps the corresponding first feature element in the first projection. FIG. 58 illustrates an overlap of first projection 11 and of second projection 22, in accordance with examples of the presently disclosed subject matter. In the example of FIG. 58, in order to make the illustration of the overlap clearer, the types of first feature elements 181 and 182 are different between first projection 11 and second projection 22. For the same reason, second feature elements 191 are illustrated using different types of patterning. However, clearly in an actual projection, there is no such differentiation, as both step from a single pattern. As can be seen, in full overlap 33, first feature elements 181 of the first projection 11 fully overlap first feature elements 182 of the second projection 22, and vice versa. Likewise, second feature elements 191 of the two projections also fully overlap each other. In partial overlap 44, in comparison, first feature elements 181 and 182 of first projection 11 only partly overlap first feature elements 181 and 182 of second projection 22, and second feature elements 191 of the two projections 11 and 22 also partly overlap each other. However, also in partial overlap 44 there is sufficient overlap between the two projections of the pattern in order to identify overlapping feature elements, and to co-process the two projections.

It is noted that partial overlap between features of the first projection and features of the second projection may or may not be intentional. For example, the partial overlap may result from inaccuracies in the manufacturing of the optical mask. In another example, the two images may be acquired in different times, and movement of object 300 between the two acquisition times may result in drift between the feature types, and therefore to partial overlap.

Optionally, processing unit 240 may be configured to:
a. obtain coding states from the first image and from the second image;
b. generate a plurality of coding states sets, each coding state set including a coding state of a first feature element from the first image and a coding state of a spatially corresponding (i.e. overlapping or partly overlapping) first feature element from the second image (it is noted that referring to the examples in the drawings, the term "first feature element" can pertain to feature elements 181 and 182, or to feature elements 191, depending on the implementations);

c. process the coding states of each of the coding states sets, to provide an outcome value for each of the coding state sets; and d. determine the range parameters for the object based on a plurality of the outcome values. Further details are provided with respect to the process described in reference to FIG. 50, which may be implemented by the processing unit.

It would be appreciated that the operation described herein can be performed on image pixels or on certain regions of an image or images, where the images are based on a reflected portion of a projected structured light pattern. In this regard, the first image which is generated from a reflection of the first projection and the second image which is generated from a reflection of the second projection, can be subject to the operation described herein (e.g., addition, subtraction, etc.), and the outcome values can be used to improve the decoding of the first and/or the second image (or any other image of a reflected portion of the first or second projection).

Optionally, processing unit 240 may be configured to apply a predefined mathematical operation which is selected from a group of mathematical operations consisting of: addition, subtraction, division, and absolute value of subtraction.

Optionally, processing unit 240 may be configured to generate an outcome image in which the color of each pixel is based on the outcome value of a corresponding coding states set; and to determine the range parameters for the object based on the outcome image; wherein the outcome image is characterized in at least one of the following qualities:

a. Locations of the first feature elements are resolvable in sub-pixel accuracy;

b. Locations of the second feature elements are resolvable in sub-pixel accuracy;

c. Edges in the bi-dimensionally coded light pattern are resolvable in sub-pixel accuracy (edges being the border lines between differently colored parts of the pattern);

d. Borders between feature elements are resolvable in sub-pixel accuracy;

e. A plurality of pixels are associated with positive outcome values and a plurality of pixels are associated with negative outcome values. This may be implemented as a bitonal coloring carrying a binary value.

It would be appreciated that according to examples of the presently disclosed subject matter, a decoder may be provided, which is configured to decode images of reflected portion of each of the first projection and the second projection, and can be adapted to apply various mathematical operations as described below, to the decoded images. Optionally, the decoder may be synchronized with the projector, or may otherwise be informed of which of the projections is depicted in a given image.

FIGS. 5-38 are examples of bi-dimensionally coded light patterns which may be used for rigidly shifted projections, and further provide examples of various rigid shifts in the systems and methods disclosed and claimed herein. While the invention is by no way limited to such examples (as exemplified, for example, in FIG. 3), the bi-dimensionally coded light pattern used for projection may be a periodic bi-dimensionally coded pattern, such as the ones exemplified in FIGS. 5-38. Furthermore, the bi-dimensionally coded light patterns used may be codified by cyclic pseudo-random binary arrays, characterized by 2×3 local-uniqueness binary codewords, such as the ones exemplified in FIGS. 5-38.

It is noted that different feature types of coded light patterns are presented in FIGS. 5-38, as well as different combinations of feature types (e.g. different kinds of symmetry of a single pattern). It is clear that any one of these pattern feature types—and combinations of pattern feature types—which are exemplified in any one of these patterns—may also be utilized in completely different patterns, which may use different kinds of coding.

Optionally, the bi-dimensionally coded light pattern used by system 200 (and also in method 500 discussed below) may be an intensity coded light pattern which includes at least one set of first feature elements (optionally periodically distributed over the pattern, but not necessarily so), and at least one set of second feature elements (optionally periodically distributed over the pattern, but not necessarily so). For example, the bi-dimensionally coded light pattern used by system 200 (and also in method 500 discussed below) may be an intensity coded light pattern which includes at least one set of carrier locations and at least one set of payload locations.

For example, in the examples of FIGS. 5-38, the first feature elements (i.e. the feature elements of the first set) are carrier locations (periodically distributed in these illustrated examples), which are dark or bright circles (denoted 181 and 182 respectively), wherein each dark circle 181 is adjacent to four bright circles 182 located along the two primary axis (a vertical y-axis and a horizontal x-axis in the illustrated examples), and vice versa. In area 112 the locations corresponding to carrier locations 181 and 182 are denoted 181A and 182A, respectively. In area 113 the locations corresponding to carrier locations 181 and 182 are denoted 181B and 182B, respectively.

The second feature elements in the examples of FIGS. 5-38 (i.e. the feature elements of the second set) are payload locations which are the diamond-shaped areas 191 between each four adjacent circles 181 and 182 (periodically distributed in these illustrated examples). In other variations, the first feature elements in the examples of FIGS. 5-38 may be the payload locations 191, while the second feature elements in these examples may be the carrier locations (denoted 181 and 182). In area 112 the locations corresponding to payload locations 191 are denoted 191A. In area 113 the locations corresponding to payload locations 191 are denoted 191B.

It is noted that the bi-dimensionally coded light pattern may include one type of feature elements, two types of feature elements (named first feature elements and second feature elements), or more than two types of feature elements. The differences between the types of feature elements depend on the specific implementation of the coded light pattern, and may include (for example) any one or more of the following list (among other possible differences): feature elements of different shapes, intensities, colors, polarizations, relative distances between one another, and so on (spatial relationships).

The first feature elements may give rise to the carrier data or to the payload data, or to another kind of distinct feature type (e.g. one out of several types coding symbols). Likewise, the second feature elements may be give rise to the carrier data or to the payload data, or to another kind of distinct feature type (e.g. one out of several types coding symbols). It is noted that the bi-dimensionally coded light pattern does not necessarily have a carrier/payload separation, and that this is just an optional implementation. An example of a bi-dimensionally coded light pattern which is not characterized by carrier/payload behavior is provided in H. Hoshino, K. Yano, S. Kiyasu and S. Fujimura, "Measurement of the 3-D shape of specular polyhedrons using an M-array coded light source", Proceedings of the IEEE Instrumentation and Measurement Technology Conference (IMTC), pp. 1329-1332, Hamamatsu, Japan, 10-12 May 1994, which is incorporated herein in its entirety by reference.

Distinction between carrier signal and payload signal is known in the art, and may be implemented in various ways. For example, the carrier signal may be a simpler signal, a periodic signal, a signal characterized by larger feature shapes (which are easier to detect in an image), and so on. For example, carrier locations 181 and 182 in the examples of FIGS. 5-34) are large with respect to the payload signals in these examples (payload locations 191), are periodic repetitively arranged (a dark-bright chessboardlike alternating arrangement) and are shaped differently than the payload locations (concave vs. convex, e.g. circular vs. diamond-like). In these examples the carrier feature elements are easier to detect, and thereby the locations of the payload feature elements may be detected more easily or with greater certainty. As exemplified in the coded light patterns of FIGS. 5-38, while most of the coding information is carried by the payload feature elements, some coding information may still be available through the carrier feature elements, e.g. as discussed below with respect to the 2×3 bits codeword.

Figure 59:
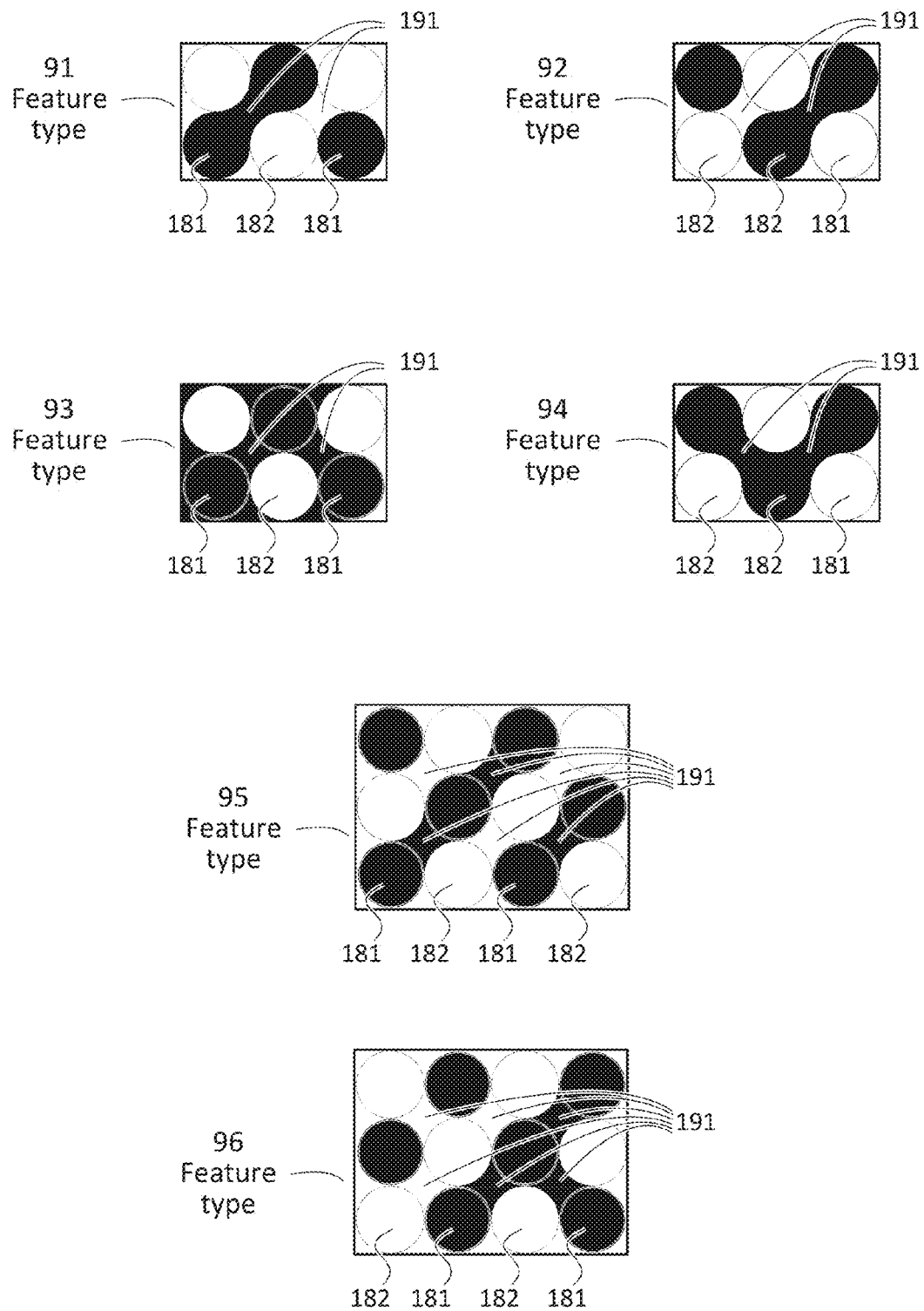
FIG. 59 illustrates examples of feature types, in accordance with the presently disclosed subject matter.

FIG. 59 illustrates examples of feature types 91 through 96, in accordance with the presently disclosed subject matter. Feature types 91 through 94 include six carrier feature elements (three dark ones 181 and three bright ones 182) and two full payload feature elements 191. In addition, each of feature types 91 through 94 includes six halves of payload feature elements 191 and four quarters of payload feature elements 191. The partial payload feature elements may or may not be used in the decoding of the respective feature types. Feature types 95 and 96 include twelve carrier feature elements (six dark ones 181 and six bright ones 182) and six full payload feature elements 191. In addition, each of feature types 95 and 96 includes ten halves of payload feature elements 191 and four quarters of payload feature elements 191. The partial payload feature elements may or may not be used in the decoding of the respective feature types. As can be seen, in addition to the information stored in the payload elements 191, each feature type also have a "polarity", dictated by the arrangement of bright and dark carrier elements.

In other examples, depth information is obtained through identifying feature elements, where each feature element is associated with a unique combination of payload and carrier feature elements. Identifying as many feature elements (of both kinds) increases the certainty of classifying a corresponding area in an image as being associated with a particular feature type (and the respective codeword). The classification of a given area in an image as being associated with a particular feature type can also be associated with the classification of feature elements surrounding the feature type, and the feature element of a classified feature type can also be used in the classification of adjacent feature types.

In some examples the depth information is obtained at the feature type level. In further examples, at least for some areas of an image of a projected pattern (either the first projection, the n-th projection (n=1, 2, 3, . . . ) or for some or all of the projections), depth information is obtained at the feature element level. In yet other examples, at the feature element level, depth information is obtained for only one kind of feature elements (e.g., payload) or for some kinds (but not necessarily to all kinds).

For example, one set of feature elements (e.g. the first set of the first feature elements, or the second set of the second feature elements) may be carrier elements. For example, optionally, a plurality of subgroups of the first feature elements (e.g. the carrier feature elements) may be processed to detect one or more of the second feature elements (e.g. the carrier feature elements).

For example, one group of feature elements (e.g. the first set of the first feature elements, or the second set of the second feature elements) may be payload elements. For example, optionally, for each group of first feature elements (e.g. the payload feature elements) out of a plurality of groups of adjacent first feature elements in the bi-dimensionally coded light pattern (e.g. groups of 2×3 payload feature elements, as discussed below), the group of first feature elements is decodable to provide depth information. For example, for each group of first feature elements (e.g. the payload feature elements) out of a plurality of groups of adjacent first feature elements in the bi-dimensionally coded light pattern, the group of first feature elements is decodable to provide information indicative of location of that subgroup of first feature elements in the bi-dimensionally coded light pattern. It is noted that additional information may be needed for the decoding of the information of the group of first feature elements—e.g. information arriving from another group of feature type (e.g. the binary value indicative of the arrangement of carrier feature elements around the group of first feature elements, as discussed below), or information regarding an epipolar line on which the group of first feature elements is located when the bi-dimensionally coded light pattern is imaged (e.g. as discussed with respect to utilization of epipolar separation information below, and in the background documents which are incorporated herein in their entirety by reference).

The color of each such diamond shape area 191 (also referred to as "saddle points" or "grid points", even though they refer to an area and not to a point) indicates a single bit of a 2×3 local-uniqueness binary codewords, which is a 6-bit codeword. For example, a dark saddle point 191 may stand for binary "0" value and a bright saddle point 191 may stand for binary "1" value. It is to be noted that a given set of 2×3 bits may appear in two different formations, depending on the order of the carrier circles 181 and 182, e.g. the top-left carrier circle may be either a dark circle or a black one, doubling the number of possible codewords. It is also noted that more than two different intensity levels may be used (other than the binary distinction of bright/dark used in the above examples).

Another way to describe the patterns of the examples shown in FIGS. 5-38 can be the following: each grid point 191 is either bright or dark, one of which represents a binary "1" and the other represents a binary "0", and the additional chess-board-like carrier pattern further provides two possible appearances for each grid point 191, wherein the two dark carrier locations 181 adjacent to such a grid point may be positioned on the NE-SW diagonal (using a compass principal winds notation) which is arbitrarily denoted herein as the "+" direction, or on the NW-SE diagonal which is similarly denoted as the "−" direction. Therefore, each payload location 191 may be identified as one out of four primitives—"0+", "0−", "1+", and "1−". Each codeword according to this notation is built out of an array of a predetermined size (e.g. 2×3) of these four primitives.

It is noted that optionally (as is the case in the examples illustrated in FIGS. 5 through 38), the periodic bi-dimensionally coded pattern may include a code grid in which identifiable subpatterns (i.e. codewords) overlap. That is, any window of some minimal size in an arbitrary position of the coded light pattern will return a uniquely identifiable codeword. For example, referring to the 2×3 binary codewords used in the examples of FIGS. 5-38, each group of 2×3 areas 191 represents a codeword. In other words, any area 191 in the examples of FIGS. 5-38 (with the exception of these located in the very edges of the pattern) is a part of multiple codewords, and is located in a different location within the 2×3 codewords in any one of these different codewords. This means that an identification window size of 2×3 provides sufficient unique identification, if all the bits of the codeword are recognized correctly in the inspection image.

Optionally, in each pair out of the plurality of pairs of spatially overlapping feature types in the first and second projections, the feature elements of the second set of feature elements from the feature type in the first projection are an inverse of the corresponding feature elements of the second set of feature elements from a respective feature type of the second projection. Optionally, in each pair out of the plurality of pairs of spatially overlapping feature types in the first and second projections, the carrier elements of the feature type in the first projection are an inverse of the corresponding carrier elements of a respective feature type of the second projection.

Optionally, in each pair out of the plurality of pairs, for each feature element from the first set of feature elements that is included in the feature type of the first projection, an inverse of the feature element is included in the feature type of the second projection.

Optionally, a pattern in accordance with examples of the presently disclosed subject matter can be provided, where the layout of feature elements is such that the rigid shift between the first projection and the second projection provides a desired relation among the feature elements in the feature types in each of the plurality of pairs. Such relation may be, for example, spatial overlapping (or partial overlapping) between first feature elements of the two projections, spatial overlapping (or partial overlapping) between second feature elements of the two projections, spatial overlapping (or partial overlapping) between first feature element of the first projection to second feature elements of the second projection, and so on.

Optionally, a pattern in accordance with examples of the presently disclosed subject matter can be provided, where the layout of feature elements is such that the rigid shift between the first projection and the second projection provides feature elements from the first set of feature elements which appear as inverse feature elements in the second projection (e.g. the patterns of FIGS. 5-34, e.g. in an full overlap as exemplified in FIG. 58).

Optionally, for each group of feature elements of the first set out of a plurality of groups of adjacent feature elements of the first set in the bi-dimensionally coded light pattern, the group of feature elements is decodable to provide information indicative of location of the group of feature elements in the bi-dimensionally coded light pattern. For example, it may be determined that the group of feature elements is located in coordinates $(X_{group(i)}, Y_{group(i)})$ with respect to the entire pattern. Each such group of feature element may consist, for example, of all of the first feature elements which are included in a single feature type. The feature elements included in such groups may be, for example, payload elements, and the codeword itself may be indicative (possibly together with other data, as explained with respect to epipolarity below) of the location of the feature type with respect to the bi-dimensionally coded light pattern. Knowing the location of the feature type with respect to the bi-dimensionally coded light pattern may be used, for example, to determine depth parameters of a three dimensional object. This may be achieved by knowing the location of light origin of the specific feature type (by decoding its location as explained above), and by matching it to the reflected location on the 3D object, to assess the three dimensional shape of the object in the place of reflection.

Optionally, a plurality of subgroups of feature elements of the first set may be processed to detect one or more feature elements of the second set. For example, such feature elements may be carrier feature elements, whose processing may yield the locations of payload feature elements.

As aforementioned, a variety of other patterns may be used as the coded light pattern, for example, depending on the specific utilization for which system 200 is used for. Utilization of a modulation which superimposes a bright or a dark spot at every saddle point 191 has some advantages which may be useful in at least some of the possible uses system 200 may be designed for. Non-limiting and non-binding examples of such advantages are now described in brief.

First, deciding whether a spot is bright or dark in the camera image is facilitated by the fact that both a bright and dark reference is locally supplied at any grid point 191, by the adjacent carrier locations 181 and 182 around it. Evaluating the brightness of a grid point location 191 (and hence its respective code-bit value) based on these reference intensities (e.g., by comparison to their mean value) reduces the effects of reflectance variation and ambient light, as long as these parameters vary smoothly within the reference neighborhood.

Second, the actual image positions where the codebit primitives (i.e., the grid points 191) have to be evaluated are clearly indicated since the latter coincide with the chessboard-like grid vertices.

A third argument concerns the interference between the basic modulation component of carrier locations 181 and 182 used for locating the grid points and the additional component of the grid points 191, used for marking them with a codebit. It is clear that the observed gray-level distribution in the immediate neighborhood of a grid point 191 will depend on the actual value of the corresponding codebit. However, the intensity level of the grid point 191 itself (being bright or dark) will not bias the estimation of the grid point location, since the gray-level function is locally point-symmetric with respect to the grid point in either case (assuming a reasonably smooth area on which the codebit and its surrounding carrier locations are projected).

Referring to all of FIGS. 5 through 38, each of the bi-dimensionally coded light patterns illustrated in FIGS. 5 through 38 are spatially repetitive in two dimensions, so that in each of these coded light patterns, each rectangle of predetermined size (selected for each of these patterns) repeats itself over and over, each copy being immediately adjacent to the neighboring copies. Repeating a pattern portion means that duplications of the pattern portion (e.g. the aforementioned rectangle) appear in different locations in the pattern, optionally immediately adjacent to one another. It is noted that any rectangle of the specified size will be repeated. In each of FIGS. 5 through 34, for illustration, one such rectangle is denoted 123. It is noted that the basic shape is not necessarily rectangular, and that other shapes may be used for the basic repeated unit, such as a parallelogram, a hexagon and irregular shapes such as shapes 3501 and 3701 in FIGS. 35 and 37 respectively. For the sake of simplicity only, and without any intention to rule out repeating basic units of other shapes, the repeating unit is referred to as rectangle 123 in the following discussion.

In each of these drawings the coded light pattern is represented by a fragment of the pattern denoted 111, which includes several copies of the basic rectangle 123. For example, referring to FIG. 5, the pattern fragment denoted 111 represents the actual intensities of the different locations in this fragment of the bi-dimensionally coded light pattern 100. The two other rectangles whose size equals that of pattern fragment 111—i.e. rectangles 112 and 113—illustrates the pattern of fragment 111 divided between the actual code of the payload locations (in rectangle 112) and the carrier locations (in rectangle 113).

Bi-dimensionally coded light patterns 100 in the examples of FIG. 5-34 are coded by binary payload code, in which bright saddle points (in areas 191,) represent binary "1" values, and dark saddle points 191 represent binary "0" values. This is illustrated in the relations between rectangle 123 and the corresponding binary 2 dimensional (2D) code denoted 100, and in the relations between rectangle 124 and the corresponding binary 2D code denoted 101.

As exemplified by the coded light patterns of FIGS. 3, 4, 5-38, 40A-40H, and 41A-41D, the coded light pattern used by system 200 may be a bi-dimensionally coded light pattern. The term "bi-dimensionally coded light pattern" is well accepted in the art, and should be construed in a non-limiting way to include patterns which are coded in two dimensions or having their intensity or color varied along more than one dimension. While possibly so, the bi-dimensionally coding is not necessarily a coding along orthogonal—or even fixed—directions or axes, as can be seen for example in the coded light patterns of FIGS. 35 and 37.

While not necessarily so, the coded light pattern used by system 200 may be coded using discrete coding (as exemplified in FIGS. 3, 4, 5-38, 40A-40H, and 41A-41D), in which a finite set of intensities is used in the pattern. The number of distinguished intensities may be two (black and white, transparent and opaque, etc.) or larger (e.g. 3, 4, 8, or more distinguished intensities may be used).

FIGS. 5-10 are examples of bi-dimensionally coded light patterns 100 which are codified by 18×4 arrays (as exemplified by the respective rectangles 123), in accordance with examples of the presently disclosed subject matter. All of the bi-dimensionally coded light patterns 100 illustrated in FIGS. 5 through 10 are inverse images of themselves under predefined rigid translational shifts which are represented by an arrow 125. The rigid translational shifts may be vectorial shifts, which are represented by the corresponding arrows 125 (especially by the length and direction of the arrows), in each one of these figures.

That is, for each 18×4 area 123 (whose size is expressed using the units of the pattern itself, of the distance between each two adjacent payload locations) there is another 18×4 shifted area 124. Shifted area 124 is shifted with respect to area 123 by the predetermined rigid shift for the respective pattern (represented by arrow 125).

It is noted that for each of the illustrated patterns, the shifting may be defined using more than one predefined rigid shift, because the arrow 125 for any area 123 may point to any one of the shifted areas 124. In practice, the shifting between the first projection and the second projection of the bi-dimensionally coded light pattern may be shifted in any of the possible rigid shifts which would provide a similar result. For the purposes of the illustration, only a single arrow 125 is illustrated.

By projecting two projections of a bi-dimensionally coded light pattern, for example of any one of the bi-dimensionally coded light patterns of FIGS. 5 through 38 (as well as a great variety of other patterns) which are rigidly shifted with respect to one another, can enable preforming various procedures between the first image and the second image as described throughout the present disclosure, while using only a single pattern mask instead of two. For example, the procedures which are discussed in U.S. Pat. No. 8,538,166 (which is incorporated herein in its entirety by reference) with respect to utilizing the pattern denoted as "I'-p1" (especially with respect to FIGS. 15, 16, 19 of that patent) can be carried out in accordance with examples of the presently disclosed subject matter.

The pattern illustrated in FIG. 5 is an inverse image of itself under a rigid horizontal shift. The pattern illustrated in FIG. 6 is an inverse image of itself under a rigid diagonal shift. The numbering used for the different elements in FIG. 6 (and in the following FIGS. 7-38) is the same as used for FIG. 5. Few of the notable differences between the patterns of FIGS. 5-38 are discussed below.

Generally, the rigid shift between the projections may be a rigid translation which is not parallel to any coding direction (or coding axis, such as the x-axis and y-axis directions in FIGS. 5-34) of the coded light pattern.

The patterns illustrated in FIGS. 7-10 are inverse images of themselves under predefined rigid shifts, as demonstrated. In addition, these bi-dimensionally coded light patterns also exhibit point-reflection symmetries around certain points, such as those denoted by "X" marks (denoted 131). It is noted that since the projection of the bi-dimensionally coded light pattern is necessarily a projection of a spatially finite pattern, the point-reflection symmetry is manifested only in finite areas of a projection surface. It will be clear to a person who is of ordinary skill in the art that other coded light patterns which demonstrate point-reflection symmetry may also be used.

It is noted that using coded light patterns which have rotational symmetry (as do the example patterns of FIGS. 7-10) can provide several advantages. For example, if the coded light pattern is generated by transmitting light through a diffractive optical element (DOE), designing and/or manufacturing such a DOE may be simpler, cheaper, or otherwise easier than designing and/or manufacturing a DOE for generating a coded light pattern which is not characterized by a rotationally symmetrical pattern.

Reverting to the examples of FIGS. 7 through 10, it can be seen that in addition to the point reflection symmetry discussed above, these bi-dimensionally coded light patterns also exhibit "Ying-Yang symmetries" around certain points, such as those denoted by "+" marks (denoted 132).

The term "Ying-Yang symmetry" is defined similarly to the known point-reflection symmetry in the sense that it consists of a 180° rotational transformation around a certain point. However, unlike point-reflection symmetry, where this transformation yields an identical image, in "Ying-Yang symmetry", this 180° rotational transformation yields an inverted image with respect to the intensity levels (that is, location which are brightly illuminated under one projection, are dimly lit under a 180° rotated projection of the same pattern, and vice versa).

In these examples, the existence of "Ying-Yang symmetries" is a result of having self-inversion, periodicity and point-reflection symmetry together. It is noted that the coded light pattern projected by system 200 may be any other pattern which demonstrate such "Ying-Yang symmetry". The "Ying-Yang symmetry" is considered for finite areas, as discussed with respect to the point-reflection symmetry.

It is noted that the coded light pattern used by system 200 may be an inverse-image of itself under a predefined rigid shift even if it does not include carrier data.

FIGS. 11-22 are examples of bi-dimensionally coded light patterns 100 which are codified by 20×4 arrays (as exemplified by the respective rectangles 123), in accordance with examples of the presently disclosed subject matter. As demonstrated by the examples of FIGS. 11 through 22, the bi-dimensionally coded light pattern projected by system 200 (or as part of method 500) may be an "inverse-code image" of itself under a predefined rigid shift. In the examples of FIGS. 11-22 the predefined rigid shift is a predefined translation denoted by a respective arrow 125 in each one of these figures. Different translations may be used in each one of these patterns to achieve the inverse-code effect, as discussed above with respect to FIGS. 5-10.

As aforementioned, some of the coded light patterns which may be used in accordance with the presently disclosed systems and methods are intensity coded light pattern which include at least one set of carrier locations (whether periodically distributed or not) and at least one set of payload locations (whether periodically distributed or not). The term "inverse-code image" of a given image within the scope of the present discussion pertains to such an image (including both carrier locations and payload locations) in which the carrier data (e.g., the intensity values in the carrier locations) remains the same as in the given image, but the coding data (e.g., the intensity values in the payload locations) is inverted.

It is noted that inversion of intensity values is one option of providing two (or more) different modulations in the different images. The term "modulation" is widely used in the art, and should be construed to include varying one or more properties of a signal (e.g. an image, a pattern) which includes a carrier signal (e.g. a carrier image, or image having locations used as carrier locations) so that the signal would carry information in a coded way. As mentioned above, the modulation may use a binary coding (e.g. bright and dim intensities in the payload locations), but other types of modulations may also be used.

In such example, one coding state of at least one feature element of each feature type of the pattern (e.g. dark, "0" binary value) is inverted into another coding state (e.g. bright, "1" binary value). It will be clear to a person who is skilled in the art that other forms of enabling the switching between coding states in various possible modulations may be used. For example, the different modulation can be obtained by switching between respective (different) polarization states of the light (e.g. from horizontal polarization to vertical polarization, and vice versa).

It is therefore noted, that whenever the terms "code-inverted", "payload-inverted", "carrier-inverted" and similar terms are used in the description with reference to intensity, the disclosure extends to include other variations in which other forms of inversion are used, mutatis mutandis (e.g. a code-inverted image in which the polarity of payload elements is inverted with respect to another image).

Furthermore, more than two coding states may be used (i.e. non-binary modulations), and in such cases the inversion between the images may be extended to include switching between modulation states instead of a simple inversion. For example, the carrier inverted image may pertain to an image in which the coding states of the carrier elements are changed with respect to the coding states of these feature elements in a reference image (e.g. carrier elements having a first coding state are replaced with carrier elements having a third coding state, and carrier elements having the third coding state are replaced with carrier elements having a second coding state). It is therefore noted, that whenever the term "code-inverted", "payload-inverted", "carrier-inverted" and similar terms are used in the description, the disclosure extends to include other variations in which other form of switching of coding states in any coding modulation are used, mutatis mutandis.

Figure 36:
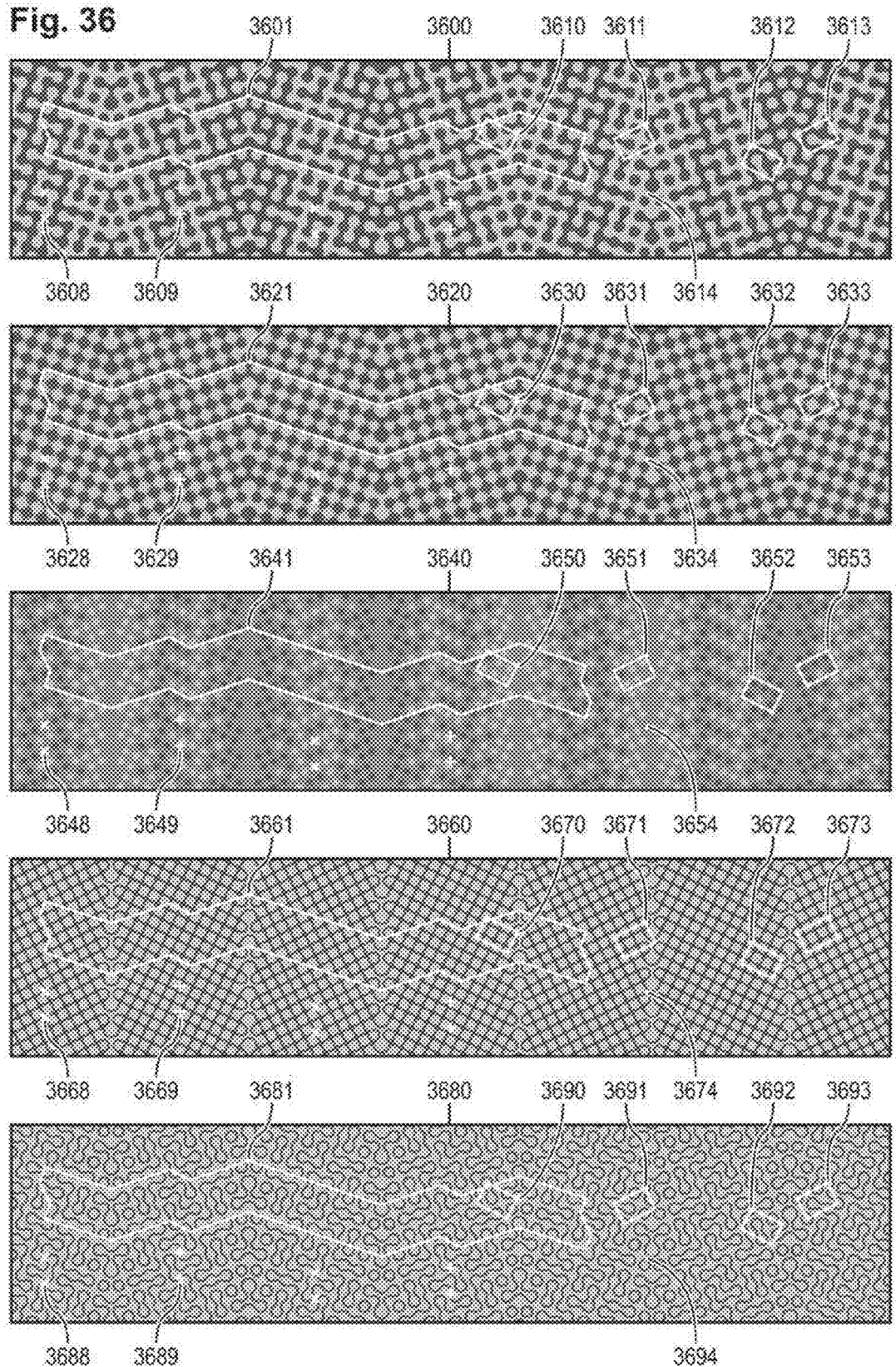
Figure 38:
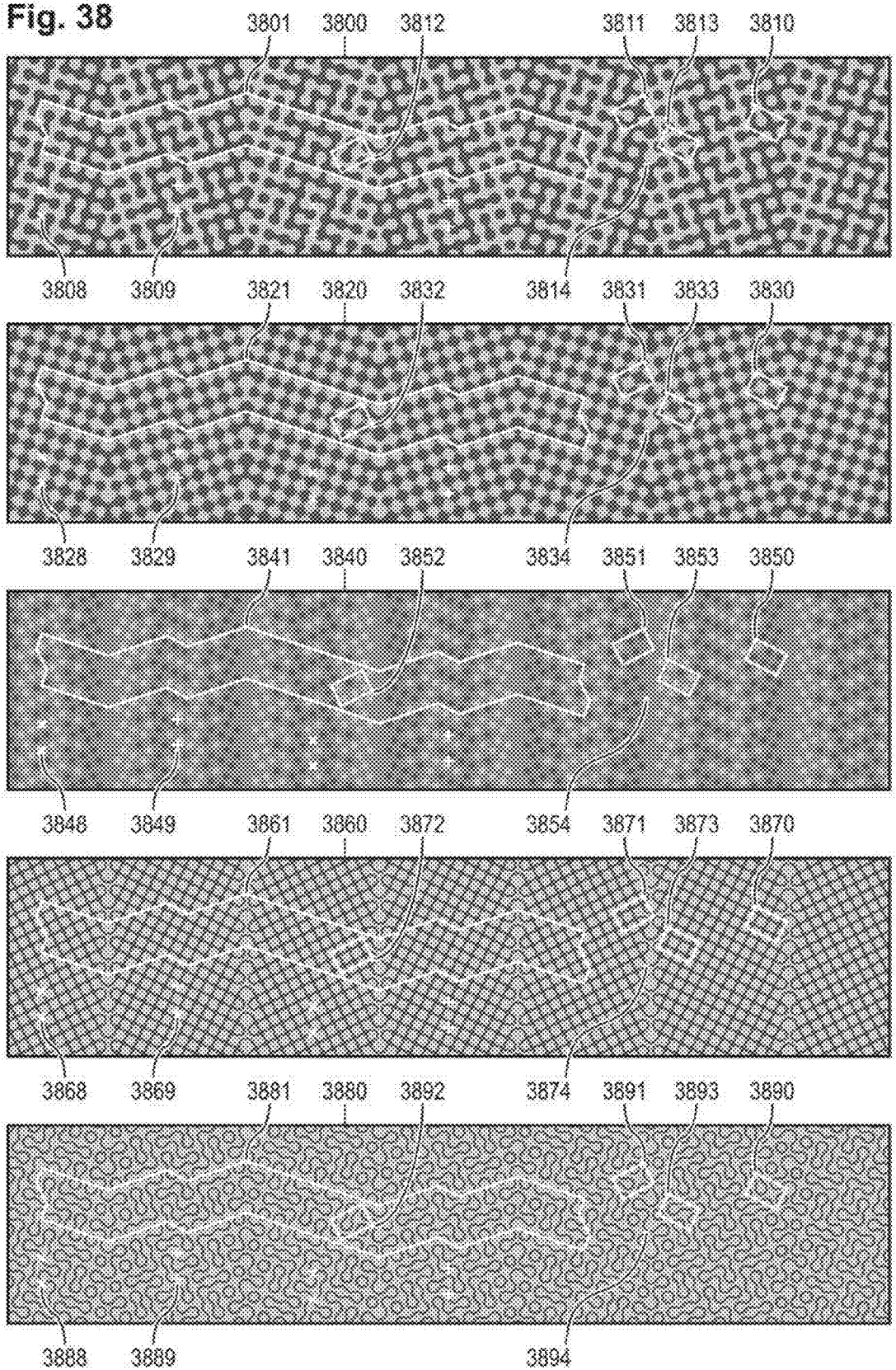

A pattern P2 is considered as inverse-code of a pattern P1, if it is codified by a tiling unit (e.g. array) which is the inverse of the tiling unit (e.g. array) which codifies P1, while keeping the same carrier of P1. It is noted that optionally, a small portion of the inverse-code pattern (e.g. less than 10% of its area, less than 5% of its area, etc.) may not conform to this rule, e.g. if the recurring unit is of a complex shape (e.g. as illustrated in FIGS. 36 and 38).

In binary coded light patterns (in which every payload location includes information which is decoded as exactly one out of two possible states), the coding data in the inverse-code image alters the binary state in each payload location (e.g. from "0" to "1" and from "1" to "0", depending on the original value in the given image). For example, if the a dark grid point at a payload location stands for binary "0" and a bright grid point at a payload location stands for binary "1" value, than in payload locations of the given image which include bright grid points, dark grid points will appear at the corresponding location in the inverse-code image, and vice versa.

For example, in FIG. 11, the denoted dark saddle point 192 in area 123 corresponds to the denoted bright saddle point 194 in shifted area 124, and denoted bright saddle point 193 in area 123 corresponds to the denoted dark saddle point 195 in shifted area 124, (while the color of the carrier locations 183 and 184 remains the same in both areas, denoted 185 and 186 correspondingly). As can be seen, this modification rule applies to each payload location 191 in the respective areas 123 and 124 in this figure, as well as in the examples illustrated in FIGS. 12 through 22.

FIG. 11 are illustrations of a bi-dimensionally coded light pattern which is an inverse-code image of itself under a horizontal rigid shift, in accordance with examples of the presently disclosed subject matter. FIG. 12 is a bi-dimensionally coded light pattern which is an inverse-code image of itself under a diagonal rigid shift, in accordance with examples of the presently disclosed subject matter. FIG. 13 is a bi-dimensionally coded light pattern which is an inverse-code image of itself under a vertical rigid shift, in accordance with examples of the presently disclosed subject matter.

FIGS. 14-16 are illustrations of bi-dimensionally coded light patterns which are inverse-code images of themselves under predefined rigid shifts, in accordance with examples of the presently disclosed subject matter, which in addition also exhibit point-reflection symmetries around certain points, such as those denoted by "X" marks (denoted 131). Some of the benefits and advantages of providing of point-reflection symmetry where discussed above, e.g. with respect to certain DOE design and manufacturing procedures.

FIGS. 17-22 are illustrations of bi-dimensionally coded light patterns, which in addition to being inverse-code images of themselves under predefined rigid shifts, in accordance with examples of the presently disclosed subject matter, also exhibit "Ying-Yang symmetries" (a term presented above) around certain points, such as those denoted by "+" marks (denoted 132).

In addition, the pattern of FIG. 17 also exhibits line-reflection symmetries along certain axes, such as those denoted by dash lines (denoted 133).

It is also worth noting, that FIG. 19 also exhibits glide-reflection symmetries along certain axes, such as those denoted by dash lines (denoted 134).

It is also worth noting, that FIG. 22 also exhibits "inverse-glide-reflection symmetries" along certain axes, such as those denoted by dash lines 135. The term "inverse-glide-reflection symmetry" is used within the scope of the present disclosure having a similar definition to the known glide-reflection symmetry, in the sense that it consists of a transformation combining both a reflection and a translation along a certain axis, but unlike glide-reflection symmetry, where this transformation yields an identical image, in "inverse-glide-reflection symmetry" this transformation yields an inverted image.

FIGS. 23-30 are illustration of examples of bi-dimensionally coded light patterns 100 which are codified by 18×4 arrays (as exemplified by the respective rectangles 123), in accordance with examples of the presently disclosed subject matter. As demonstrated by the examples of FIGS. 23 through 30, the bi-dimensionally coded light pattern projected may be an "inverse-carrier" of itself under a predefined rigid shift. In the examples of FIGS. 23-30 the predefined rigid shift is a predefined translation denoted by a respective arrow 125 in each one of these figures. Clearly, different translations may be used in each one of these patterns to achieve the inverse-carrier effect, as discussed above with respect to FIGS. 5-10.

As aforementioned, some of the bi-dimensionally coded light patterns which may be used in accordance with the presently disclosed systems and methods are intensity coded light patterns which include at least one set of carrier locations and at least one set of payload locations. The term "inverse-carrier image" of a given image within the scope of the present discussion pertains to such an image (including both carrier locations and payload locations) in which the coding data (i.e. the intensity values in the payload locations) remains the same as in the given image, but the carrier data (i.e. the intensity values in the carrier locations) is modified (e.g. from dark to bright and vice versa).

A pattern P2 is considered as inverse-carrier of pattern P1, if it is codified by the same array which codifies P1, but over the inverted carrier of P1 (so P1 and P2 have identical or nearly identical payload elements and inverse carrier elements).

It would be appreciated that in coded light patterns where every carrier location includes information which is decoded as exactly one out of two possible states (e.g. dark or bright), inversing the carrier data in the inverse-carrier image involves altering the binary state at each carrier location compared to the original image (e.g. from dark to bright and from bright to dark, depending on the value in the original image). The term "original image" is used here to refer to an image of the reflected portion of the first projection, and the inverse carrier image refers to the image of the reflection portion of the second projection.

For example, in FIG. 23, the denoted dark carrier point 183 in area 123 corresponds to the denoted bright carrier point 185 in shifted area 124, and denoted bright carrier point 184 in area 123 corresponds to the denoted dark carrier point 186 in shifted area 124 (while the color of the payload location 192 remains the same between the areas, denoted 194). As can be seen, this is true for each carrier location in the respective areas 123 and 124 in this figure, and in the rest of FIGS. 24 through 30.

FIG. 23 is an illustration of a bi-dimensionally coded light pattern which is an inverse-carrier image of itself under a horizontal rigid shift, in accordance with examples of the presently disclosed subject matter. FIG. 24 is an illustration of a bi-dimensionally coded light pattern which is an inverse-carrier image of itself under a diagonal shift, in accordance with examples of the presently disclosed subject matter.

FIGS. 25-28 are illustrations of bi-dimensionally coded light patterns which are inverse-carrier images of themselves under predefined rigid shifts, in accordance with examples of the presently disclosed subject matter, and in addition also exhibit point-reflection symmetries around certain points, such as those denoted by "X" marks (denoted 131). Some of the advantaged of providing patterns which exhibit point-reflection symmetry were discussed above.

FIGS. 29-30 are illustrations of bi-dimensionally coded light patterns which are inverse-carrier images of themselves under predefined rigid shifts, in accordance with examples of the presently disclosed subject matter, which further exhibit "Ying-Yang symmetries" around certain points, such as those denoted by "+" marks (denoted 132).

FIGS. 31-34 are illustrations of examples of bi-dimensionally coded light patterns 100 which are codified by 18×4 arrays (as exemplified by the respective rectangles 123), in accordance with examples of the presently disclosed subject matter. As demonstrated by the examples of FIGS. 31-34, the coded light pattern projected may be "inverse", "inverse-code" and "inverse-carrier" images of themselves under predefined rigid shifts.

In the examples of FIGS. 31-34, a single rectangle 123 corresponds to three different shifted areas: areas 124, 126 and 127. In order to keep the drawings simple, the arrows corresponding to the predefined translation are not drawn in these figures. Clearly, different translations may be used in each one of these patterns to achieve the "inverse", "inverse-code" and "inverse-carrier" effects, as discussed above with respect to FIGS. 5-30.

By performing those shifts over each projected pattern, it is possible to perform the various "dual-pattern" procedures, described above, while using only a single pattern mask instead of four (in these examples) separate masks.

Figure 31:
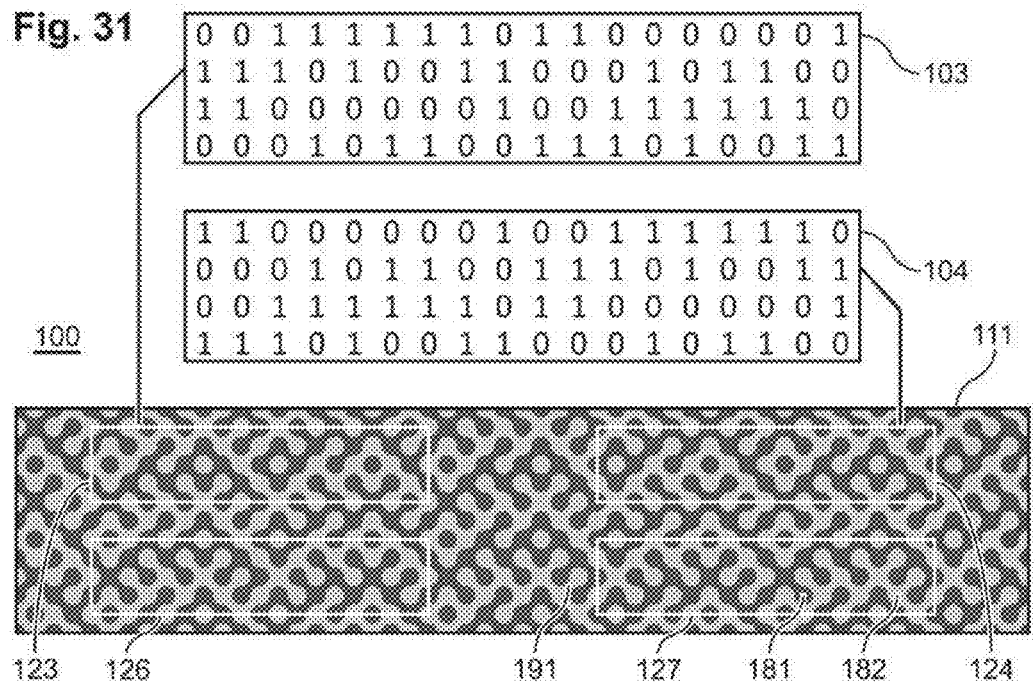

FIG. 31 is an illustration of a bi-dimensionally coded light pattern, in accordance with examples of the presently disclosed subject matter. The pattern of FIG. 31 exhibits the following:

a. It is an inverse image of itself under a horizontal rigid shift.

b. It is also an inverse-code image of itself under a vertical rigid shift.

c. It is also an inverse-carrier image of itself under a diagonal rigid shift.

Figure 32:
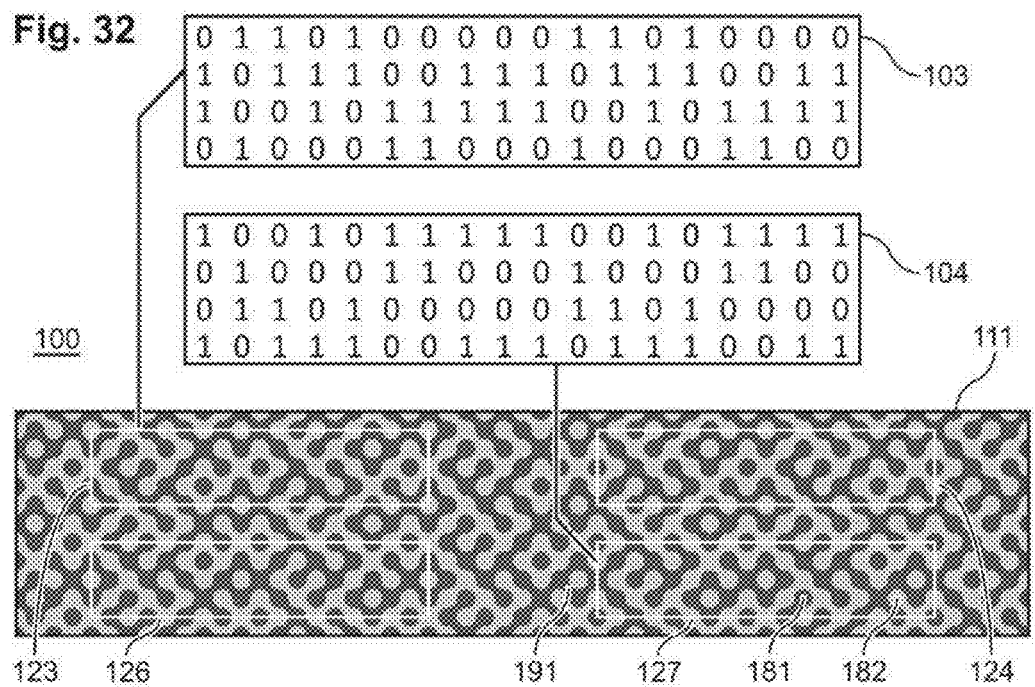

FIG. 32 is an illustration of a bi-dimensionally coded light pattern, in accordance with examples of the presently disclosed subject matter. The pattern of FIG. 32 exhibits the following:

a. It is an inverse image of itself under a diagonal rigid shift.

b. It is also an inverse-code image of itself under a vertical rigid shift.

c. It is also an inverse-carrier image of itself under a horizontal rigid shift.

FIG. 33 is an illustration of a bi-dimensionally coded light pattern, in accordance with examples of the presently disclosed subject matter. The pattern of FIG. 33 exhibits the following:

a. It is an inverse image of itself under a horizontal rigid shift.

b. It is also an inverse-code image of itself under a vertical rigid shift.

c. It is also an inverse-carrier image of itself under a diagonal rigid shift.

d. In addition, it also exhibits point-reflection symmetries around certain points, such as those denoted by "X" marks (denoted 131).

e. In addition, it also exhibits "Ying-Yang symmetries" around certain points, such as those denoted by "+" marks (denoted 132).

FIG. 34 is an illustration of a bi-dimensionally coded light pattern, in accordance with examples of the presently disclosed subject matter. The pattern of FIG. 34 exhibits the following:

a. It is an inverse image of itself under a diagonal shift.

b. It is also an inverse-code image of itself under a vertical shift.

c. It is also an inverse-carrier image of itself under a horizontal shift.

d. In addition, it also exhibits point-reflection symmetries around certain points, such as those denoted by "X" marks (denoted 131).

e. In addition, it also exhibits "Ying-Yang symmetries" around certain points, such as those denoted by "+" marks (denoted 132).

As exemplified in the patterns of FIGS. 31-34, the bi-dimensionally coded light patterns used by system 200 and/or in method 500 may be such which enable several combinations of two or more projections. It is noted that in addition to enabling utilization of two different projections of the coded light pattern, utilizing a pattern which manifests more than one of the behaviors discussed above (e.g. being the "inverse", "inverse-code" and/or "inverse-carrier" of itself under different rigid shifts such as rotations or translations) may enable utilizing three or more projections of the single bi-dimensionally coded light pattern by system 200 and/or in method 500.

That is, optionally, the components of system 200 may be implemented as follows:

a. Projector control unit 220 may be configured to control projector 210 for projecting onto an object at least three projections of the bi-dimensionally coded light pattern which are rigidly shifted with respect to one another (at the same time or in different times, in the same wavelength or in different wavelengths, etc.).

b. Imaging sensing unit 230 may be adapted to provide image data of at least one image in which the object is imaged with each one of the at least three projections of the bi-dimensionally coded light pattern projected thereon, wherein the image data may be processed so as to differentiate between information resulting from the different three or more projections.

c. Processing unit 240 may be configured to process the image data which corresponds to the at least three projections of the bi-dimensionally coded light pattern in order to determine range parameters (e.g. range parameters for the object).

Such three or more projections of the bi-dimensionally coded light pattern, each being rigidly shifted with respect to the other two, may be implemented in different ways. Various options of utilizing various combinations of two projections which are shifted with respect to one another are discussed throughout this disclosure (herein below also referred to as two-projections procedures), e.g. with respect to patterns which are the "inverse", "inverse-code" and/or "inverse-carrier" of themselves under different rigid shifts. Using three or more projections may include performing a series of computations on several such two-projections procedures (e.g. subtracting the intensity values of a first projection from those of a second projection, which due to the rigid shift is the negative of the first projection in order to obtain location information in sub-pixel resolution, and subtracting the intensity values of the first projections with these of a third projection, which due to the rigid shift is the "inverse-code" image of the first projection, in order to discard the carrier information and isolate the payload information as a signed code information).

However, system 200 may also be implemented to apply computational processes which are based on information from three or more projections (n projections, where n≥3). For example, processing unit 240 may be configured to execute the following sequence of operations to the first image and the second image:

a. Obtain from image data (e.g. of the first image and the second image, and so on, if more than two images are used) a plurality of intensity value sets, each intensity value set including an n-tuple (n≥3) of intensity values, where each of the intensity values of the n-tuple corresponds to image data obtained from one of the projections and where all of the intensity values of the n-tuple spatially correspond to one another (e.g. sampling intensity values of light arriving from the same spot on object 300, in the different lightings);

b. Apply a predefined mathematical operation on the n values of each of the n-tuples, to provide an outcome value for each of the n-tuples (e.g. applying summation, averaging, finding minimal or maximal value, and so on); and c. Determine the range parameters for object 300 based on a plurality of the outcome values.

FIGS. 35-38 are illustrations of examples of bi-dimensionally coded light patterns which are codified by non-Cartesian arrays, in accordance with examples of the presently disclosed subject matter. As demonstrated by the examples of the bi-dimensionally coded light patterns of FIGS. 35 through 38, the bi-dimensionally coded light pattern may be a non-Cartesian light pattern which is an inverse image of itself under a predefined rigid shift. The patterns of FIGS. 35-38 further exemplify patterns which in addition to being inverse images of themselves under corresponding rigid shifts, they are also "partially inverse-code" and "partially inverse-carrier" images of themselves under predefined rigid shifts (as discussed below in greater detail). It is noted that bi-dimensionally coded light pattern which manifest only some of these characteristics may also be implemented.

By performing those rigid shifts over each projected bi-dimensionally coded light pattern, it is possible to perform the various procedures, described above, while using only a single pattern mask instead of a plurality of pattern masks (two to four separate masks, depending on the application).

In addition, the patterns of FIGS. 35-38 also exhibit point-reflection symmetries around certain points, such as those denoted by "X" marks, and also exhibit "Ying-Yang symmetries" around certain points, such as those denoted by "+" marks.

Figure 35:
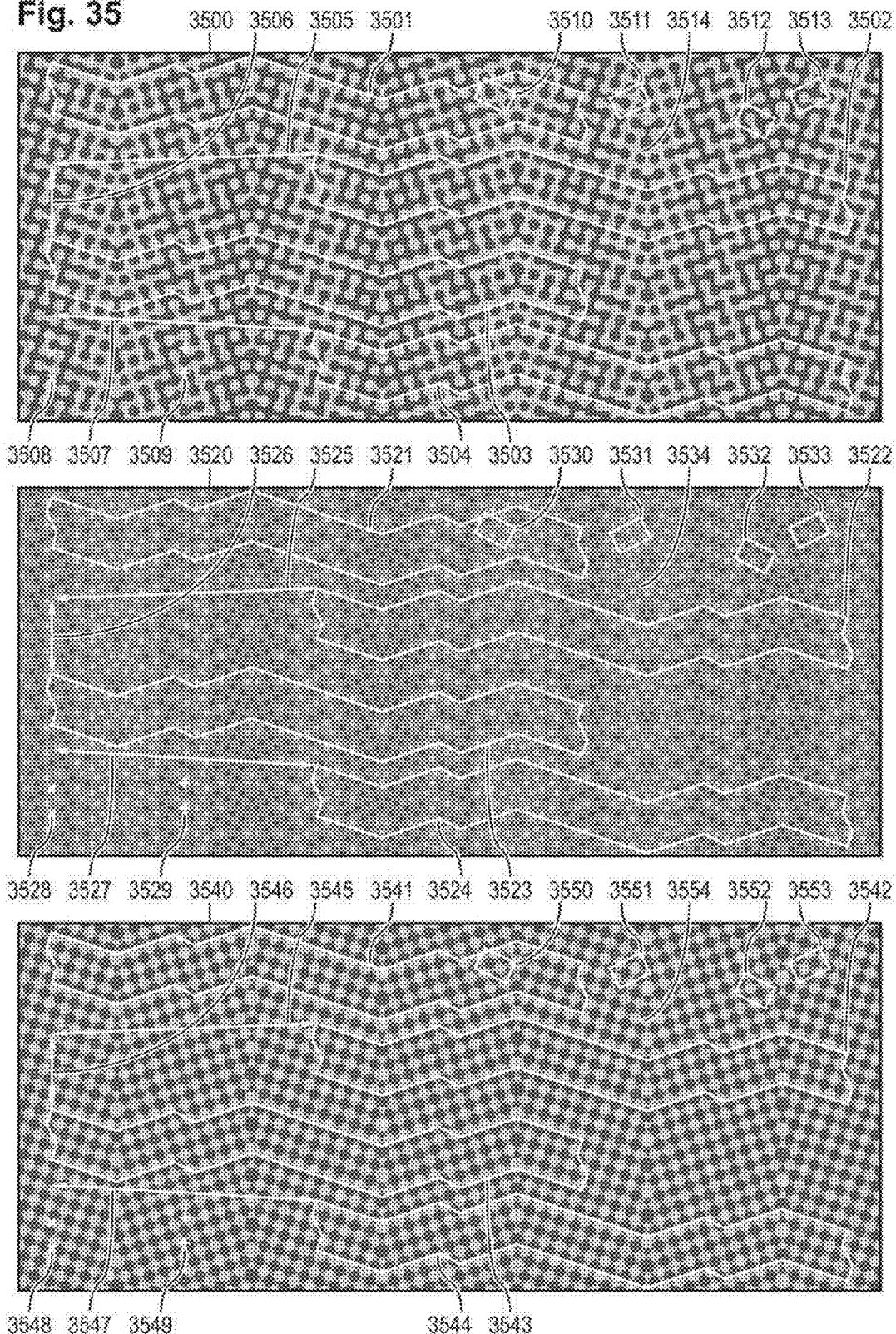

FIG. 35 shows an illustration of a bi-dimensionally coded light pattern 3500, in accordance with examples of the presently disclosed subject matter. The bi-dimensionally coded light pattern 3500 of FIG. 35 is composed by superimposing payload-image 3520 (also referred to as "coding-image" 3520) over carrier-image 3540.

Pattern 3500 is an inverse image of itself under various shifts, such as shift 3505. Accordingly, tiling-unit 3502 is an inverse image of tiling-unit 3501.

In addition, it is also a partially inverse-code image of itself under various shifts, such as shift 3507. Accordingly, tiling-unit 3504 is a partially inverse-code image of tiling-unit 3501. It is only a partially inverse-code image of itself since 24 out of the total of 212 saddle-points, contained in any tiling-unit, such as saddle-point 3534, disobey the characteristics of an inverse-code image, by not being inverted under shift 3507.

In addition, it is also a partially inverse-carrier image of itself under various shifts, such as shift 3506. Accordingly, tiling-unit 3503 is a partially inverse-carrier image of tiling-unit 3501. It is only a partially inverse-carrier image of itself since 24 out of the total of 212 saddle-points, contained in any tiling-unit, such as saddle-point 3534, are not coded according to the characteristics of an inverse-carrier image, by being inverted under shift 3506. Thus, according to examples of the presently disclosed subject matter, the second projection, which is rigidly shifted relative to the first projection, has at least one feature elements that is modified relative to a feature element at an identical location in the first projection. In one example, the modification is an inversion of the coding value of the feature element. The inverse-carrier, the inverse code cases and other cases mentioned above, are particular examples of this generic transformation case.

The feature-types or codewords in pattern 3500, such as feature-types 3510, 3511, 3512 and 3513, maintain local-uniqueness within any tiling-unit, allowing unambiguous identification, according to methods known for a single pattern. In particular, the local-uniqueness of each feature-type within any tiling-unit is characterized by the combination of its saddle-point's embedded codeword (i.e. payload data), its carrier value and its feature-element's epipolar vector. For example, feature-types 3510 and 3512 (or feature-types 3511 and 3513, respectively) differ by their saddle-point's embedded codewords and their carrier value, but share the same epipolar vector since they share the same orientation. On the other hand, for example, feature-types 3510 and 3511 (or feature-types 3512 and 3513, respectively) share the same saddle-point's embedded codeword and carrier value, but differ in their epipolar vector since they are oriented differently.

FIG. 36 shows and illustration of the results of several two-projections procedures (also referred to as "dual-pattern" procedures, although in this disclosure, the "dual pattern" procedure is obtained through two (or more) projections of a single pattern, where each of the two (or more) projections are rigidly shifted with respect to one another). For illustration, and by way of non-limiting example, the two-projections procedures are performed over coded light pattern 3500 of FIG. 35 (denoted pattern 3600 in FIG. 36), in accordance with examples of the presently disclosed subject matter.

Image 3620 is the result of adding to pattern 3600 a shifted instance of itself, under shift 3507. It can be seen that image 3620 resembles carrier-image 3540, as the bright and dark values of most of the saddle-points are neutralized (i.e. equalized) while their locations are accentuated. However, 24 out of the total of 212 saddle-points contained in any tiling-unit, such as saddle-point 3634, do not undergo this value neutralization and location accentuation.

Image 3620 is also a positive (i.e. unsigned) representation of the result of subtracting from pattern 3600 a shifted instance of itself, under shift 3506. In reality, the actual subtraction result is signed, containing both positive and negative values, so for visualization purposes it is normalized in image 3620.

Image 3640 is the result of adding to pattern 3600 a shifted instance of itself, under shift 3506. It can be seen that image 3640 resembles payload-image 3520, as the intensities of the maxima-points and the minima-points are equalized, leading to the suppression of the carrier and the emergence of bright and dark spots in place of most of the corresponding bright and dark saddle-points of pattern 3600. However, 24 out of the total of 212 saddle-points contained in any tiling-unit, such as saddle-point 3614, do not emerge as spots, but instead they are also grayed out like the carrier does, such as appear in position 3654. Accordingly, certain feature-types or codewords, such as feature-type 3611, which contain such saddle-points, emerge with missing spots over their corresponding resultant area, such as in area 3651. Therefore, decoding the values of such saddle-points cannot take advantage of this addition procedure and may rely, for example, on analyzing their local derivatives, as known for decoding a single pattern. Furthermore, it should be noted that pattern 3600 is designed so that feature-types, such as feature-type 3611, maintain their local-uniqueness within any tiling-unit, allowing unambiguous identification, according to methods known for a single pattern.

Image 3640 is also a positive (i.e. unsigned) representation of the result of subtracting pattern 3600 from a shifted instance of itself, under shift 3507. In reality, the actual subtraction result is signed, containing both positive and negative values, so for visualization purposes it is normalized in image 3640.

Image 3660 is the result of the absolute value of the subtraction of pattern 3600 and a shifted instance of itself, under shift 3506. It can be seen that image 3660 resembles a grid of dark borderlines, having their crossings emerge in place of most of the saddle-points of pattern 3600. However, 24 out of the total of 212 saddle-points, contained in any tiling-unit, such as saddle-point 3614, do not emerge as grid crossings, but instead they emerge as pattern outlines, such as appear in position 3674.

Image 3680 is the result of the absolute value of the subtraction of pattern 3600 and a shifted instance of itself, under shift 3505. It can be seen that image 3680 contains highly identifiable curves, which are the outlines of pattern 3600.

Image 3600 is also a positive (i.e. unsigned) representation of the result of subtracting from pattern 3600 a shifted instance of itself, under shift 3505. In reality, the actual subtraction result is signed, containing both positive and negative values, so for visualization purposes it is normalized in image 3600.

Figure 37:
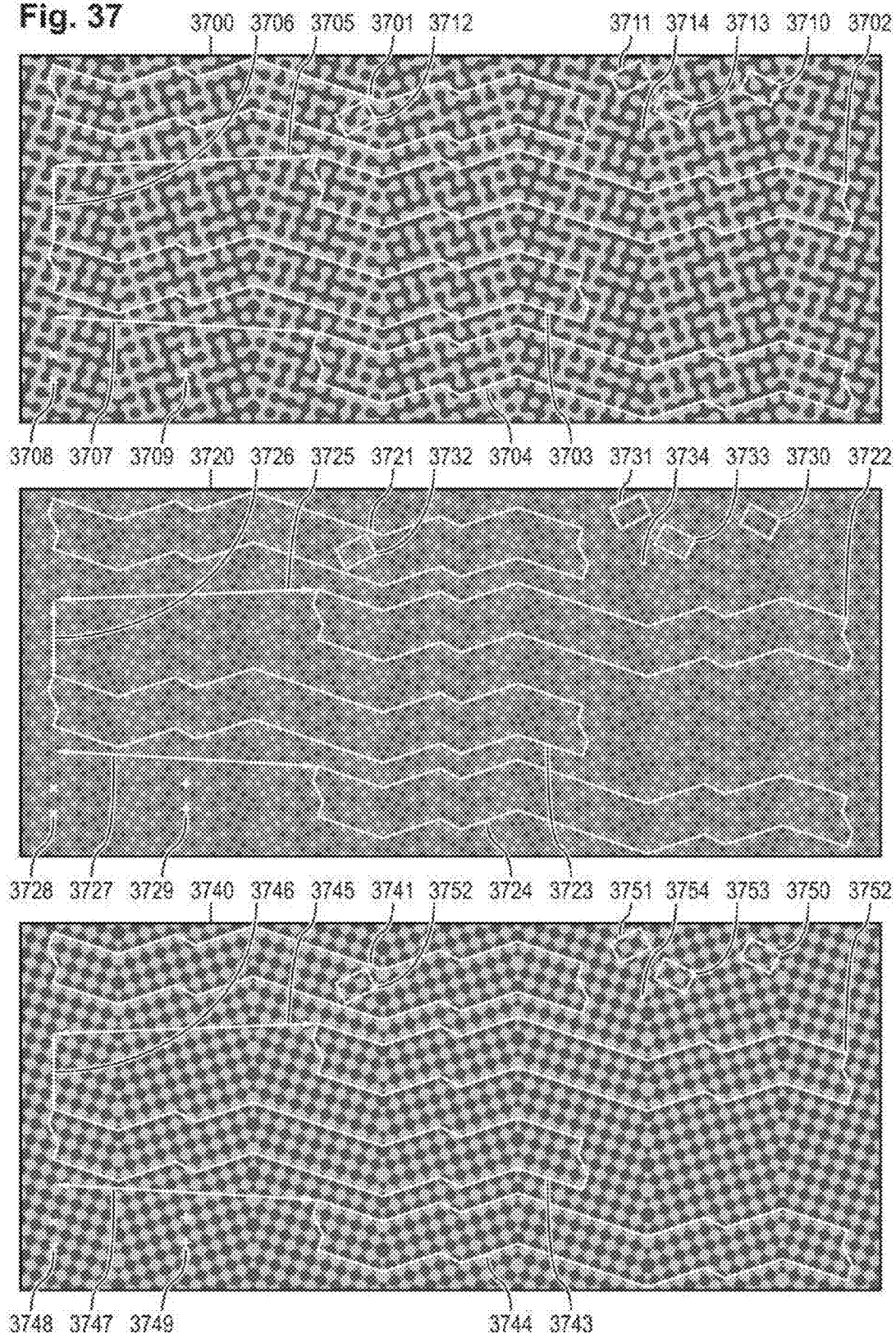

FIG. 37 shows an illustration of a coded light pattern 3700, in accordance with examples of the presently disclosed subject matter. The bi-dimensionally coded light pattern 3700 of FIG. 37 is obtained by superimposing payload-image 3720 over carrier-image 3740. It is noted that the discussion of coded light pattern 3500 of FIG. 35 is relevant also to coded light pattern 3700 of FIG. 37, mutatis mutandis. The reference numbers in FIG. 37 correspond to those of FIG. 35, where the two last digits indicates the correspondence (e.g. reference number 3713 corresponds to reference number 3513, and so on).

FIG. 38 shows an illustration of the results of several two-projections procedures (also referred to as "dual-pattern" procedures) performed over bi-dimensionally coded light pattern 3700 of FIG. 37 (denoted pattern 3800 in FIG. 38), in accordance with examples of the presently disclosed subject matter. It is noted that the discussion of coded light pattern 3600 of FIG. 36 is relevant also to coded light pattern 3800 of FIG. 38, mutatis mutandis. The reference numbers in FIG. 38 correspond to those of FIG. 36, where the two last digits indicates the correspondence (e.g. reference number 3813 corresponds to reference number 3613, and so on).

Figure 53:
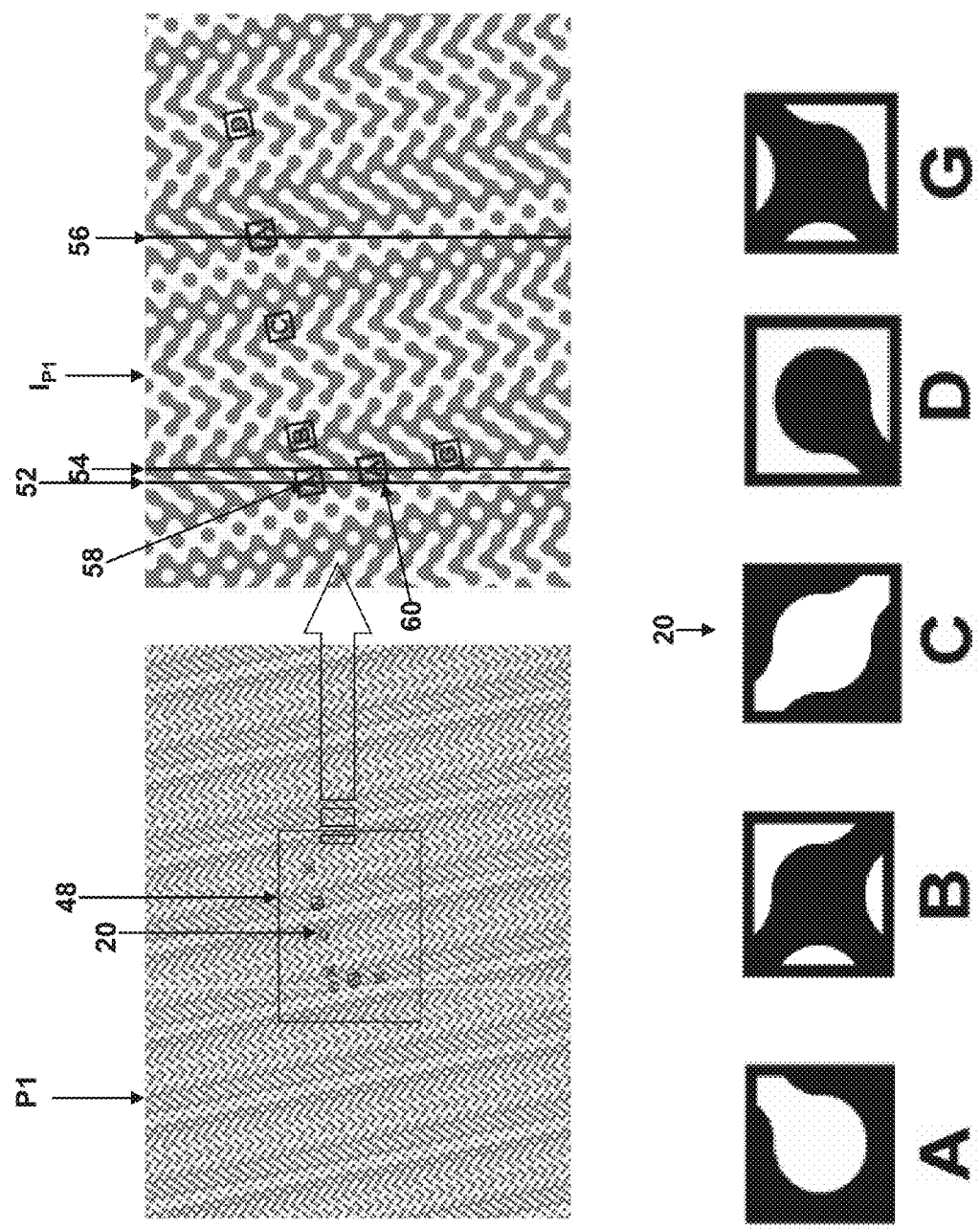
FIG. 53 provides an exemplary spatially-periodic 2D bi-dimensionally coded light pattern which may be projected onto an object, in accordance with examples of the presently disclosed subject matter.

Referring now to FIG. 53 which provides an exemplary bi-dimensionally coded light pattern P1 which may be projected onto object 300 by system 200, in accordance with examples of the presently disclosed subject matter. FIG. 53 will be used as an example of a pattern projection which uses epipolar separation or the epipolar constraint to provide a pattern having a relatively small footprint or a larger (non-ambiguous) pattern (compared to a projection which does not use the epipolar constraint as explained below). The principles of epipolar separation illustrated in FIG. 53 together with the principles of the first and second projections described herein can be used in the pattern of system 200 in accordance with examples of the presently disclosed subject matter.

The coded pattern P1 includes a plurality of distinct feature types 20, which appear in the pattern P1 at various locations. For clarity, in the present figure, each unique feature type is arbitrarily assigned an alphabetic character. As will be explained in further detail below with respect to FIG. 55, each feature type is characterized by a unique formation of feature elements, or put in another way, feature elements can be arranged in formations which give rise to a plurality of distinct feature types (each serving as a codeword). In one example, any such feature type can be arranged according to the epipolar separation principles which will now be discussed.

In the case of the patterns shown and described in this disclosure, feature elements are characterized by local light intensity distributions (the pattern is bi-tonal or is comprised of dark and bright areas). It would be appreciated that other optical variations (polarity, color, shape, etc.) can be used to create different feature elements and such feature elements. Different kinds of feature elements can have two or more states (for example, blue, yellow and red coding can be used to provide feature elements which have three different states).

The feature elements which form the feature types can be of a single set (set is used here to distinguish from the term feature element kind that was already used in this paragraph) or two or more (three, four, etc.) set of feature elements can be used in a pattern according to examples of the presently disclosed subject matter. For example, each feature element in the coded pattern P1 that is shown in FIG. 53 can be associated with one of two different sets, the first set being saddle elements (or saddle points) and the second set of elements includes points (or elements) which are either maxima or minima. U.S. Pat. Nos. 8,090,194, 8,208,719 and 8,538,166, and U.S. Patent Application Publication No. 2013/0329018 provide more details with respect to these sets of feature elements. In other examples, other kinds of feature element sets can be used in a pattern, such as the payload and carrier feature elements sets mentioned in this description. It would be noted that in some cases, a set of feature elements can have different characteristics and more than one definition or characteristic can be used to define the set. For example, the maxima or minima set of feature elements can, in some cases, be also defined as a carrier set, and the saddle points set can be defined as a payload set, as is the case with the pattern P1 in FIG. 53. In fact in some cases, the carrier vs. maxima/minima and payload vs. saddles distinction is simply a matter of reference to the coding feature elements (carrier and payload) or reference to the reflected portion of the projected pattern or the feature elements appearing in the image (saddles and maxima/minima). In some types of codes, only one set is of interest in the image (of the reflected portion of the pattern) and even only a certain kind of feature element. For example, a code where only bright areas or spots (and the areas/spots surrounding them) are observed (e.g., are identified and processed in the decoding process), can be regarded as a code where feature types are formed by a single set of feature elements or even by one feature element (bright spots/areas).

A pattern which is formed by 32 distinct feature types can be arranged in a 2×16 tiling unit (2 rows of feature types in a first direction and 16 columns of feature types in a second direction that is orthogonal to the first direction).

For illustration, IP1 is a representation of an image of a reflected portion of the projected pattern P1 which corresponds to area 48 of the projected pattern P1. Epipolar lines 52, 54, and 56 are shown. Thus image IP1 is a simplified illustration of the reflected portion of a projected pattern as captured by an imaging apparatus. For simplicity, only the reflected pattern is shown and not any reflected imaged objects appearing in IP1 as well. In this particular example, projector 210 and an imaging apparatus (e.g. imaging sensing unit 250) are positioned one above the other, thus the epipolar lines in the captured image are in a substantially vertical direction. In another possible embodiment, the projector and imaging apparatus may be positioned horizontally from each other, in which case the epipolar lines in the captured image would be substantially horizontal. Other spatial relationships between the projector and the imaging unit may also be selected, mutatis mutandis.

As seen, features of the same type are reflected onto separate epipolar lines in image IP1. For example, features 58 and 60, both of type (A), are reflected onto two adjacent but distinguishably separate epipolar lines 52 and 54. The separation of identical pattern feature types onto separate epipolar lines in the captured image, called epipolar separation herein, enables non-ambiguous identification of feature types. It would be noted that identical feature types can be allowed to repeat along a given epipolar line according to the epipolar separation principle, as long as the repetition does not create ambiguity within a given depth of field (of the depth sensing system).

Figure 54:
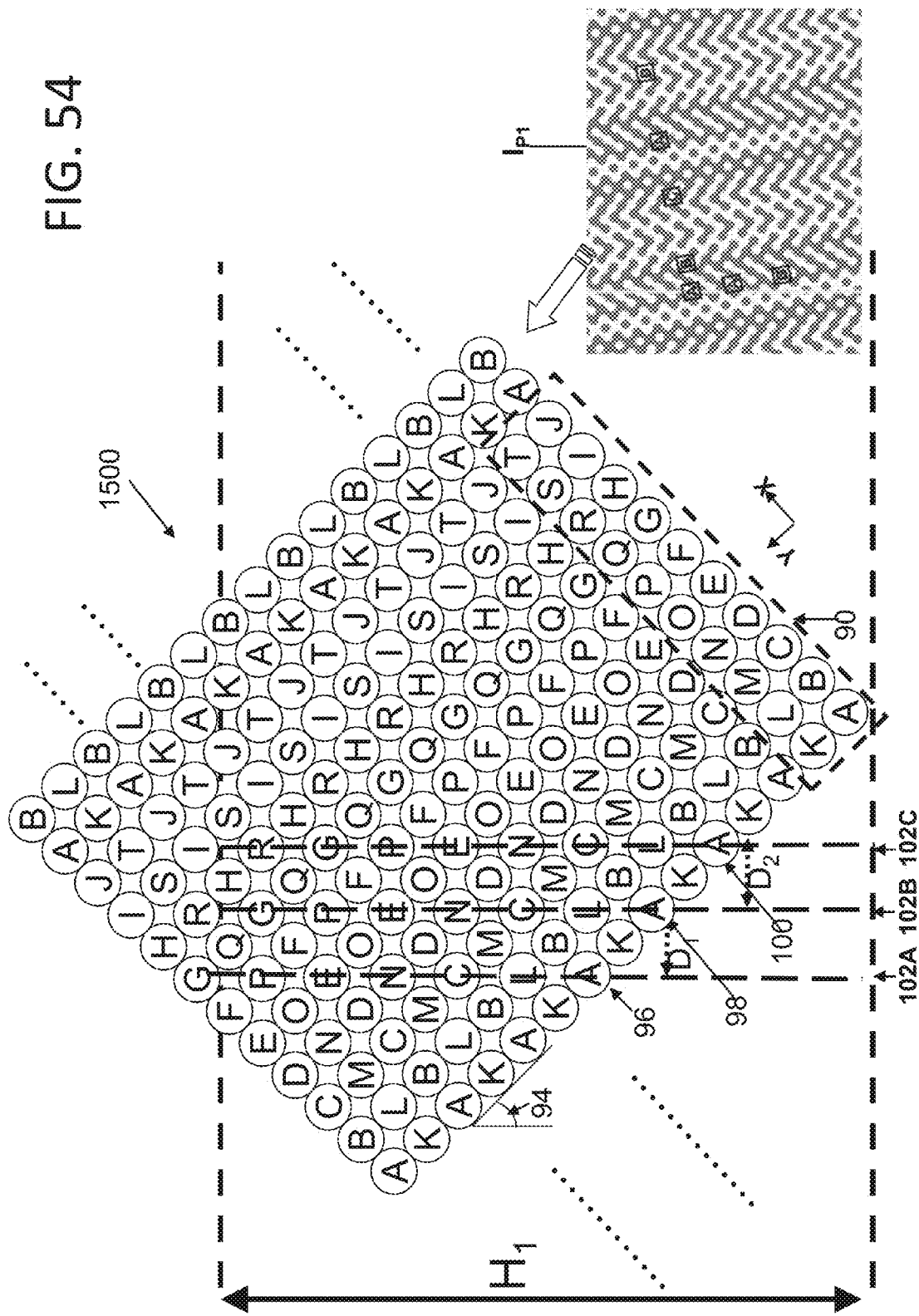
FIG. 54 includes a schematic representation of a reflected pattern after being projected in accordance with the epipolar separation principle, in accordance with examples of the presently disclosed subject matter.

Reference is made to FIG. 54. The bottom right of the figure shows image IP1 of FIG. 53, which is an image of the reflected portion of the projected pattern P1 as captured by an image sensor. FIG. 54 shows a schematic representation 1500 of the reflected portion of the projected pattern in image IP1 after being projected in accordance with the epipolar separation principle discussed above. That is, the bi-dimensionally coded light pattern P1 is constructed and projected in such a manner that any given feature type appears at most once on any given epipolar line in the captured image IP1.

It would be appreciated, that according to examples of the presently disclosed subject matter, the projected structured light pattern is comprised of a repeating structure of a plurality of unique feature types, and any feature type appears at most one along any of the plurality of distinguishable epipolar lines, where a distance between the distinguishable epipolar lines is less than a shortest dimension of the repeating structure in the image. Optionally, the repeating structure of the plurality of feature types can embody a coding matrix. Optionally, the repeating structure is a tile. Optionally, the repeating structure is a periodic repeating structure. Still further by way of example, each one of the plurality of feature types can be characterized by a unique combination of spatial formations.

Still further by way of example, there can be provided a projector that is configured to project a coded pattern, such that when the projector projects light, the structured light pattern is projected, and a sensor is configured to capture the digital image of the reflected portion of the projected structured light pattern, such that the locations of the distinguishable epipolar lines on the sensor's plane are associated with a spatial relation between the projector and the sensor, where the projector is oriented with respect to the sensor such that when the projector projects, the projected structured light pattern is at an angle relative to an epipolar field associated with the spatial relation between the projector and the sensor, and wherein the distance between the distinguishable epipolar lines is associated with an orientation of the projected structured light pattern relative to the epipolar field.

Optionally, the projector may be configured, such that when the projector projects the structured light pattern, an orientation of the structured light pattern with respect to the epipolar field is limited by a limiting epipolar separation factor.

Optionally, the device may have a predefined operating range, and in the image, two or more repetitions of a feature type appear on a distinguishable epipolar line, but within any given section of an epipolar line which corresponds to the operating range of the device, any feature appears at most ones.

Optionally, the processor may be configured to extract depth information based on a location in a given section of a distinguishable epipolar line of a given feature type on the distinguishable epipolar line.

The orientation angle of the pattern relative to the stereo baseline is such that the distance P between distinguishable epipolar lines is less than NC, where C is the size of a feature type in a shortest dimension of the repeating structure in the image, and N is the number of feature types in the shortest dimension of the repeating structure in the image. It is understood that other epipolar lines theoretically exist between epipolar lines 102A and 102B and between 102B and 102C, however they are not distinguishable epipolar lines. The known horizontal (in this case) distance between distinguishable epipolar lines is a function of various factors including the optical and any other relevant specifications of the imaging apparatus (e.g., the sensor) and/or of the projector and/or the operating conditions (actual or expected). The known horizontal distance between distinguishable epipolar lines aids in the identification and verification of reflected feature types in the image. For example, a reflected feature type (A) 98 is detected in the captured image at a certain γ coordinate along epipolar line 102B. Thus, the nearest feature type (A), if indeed captured in the obtained image, can only be found on the nearest distinguishable epipolar lines to the right and left of epipolar line 102B, namely 102A and 102C. Although all epipolar lines are precisely vertical in the figure for illustration purposes, in other examples other configurations are possible including configurations where the epipolar lines are curved, diagonal or non-parallel to each other.

The orientation angle of the pattern relative to the stereo baseline is limited by an epipolar line separation factor, which is the angle at which a minimum horizontal distance necessary to distinguish between separate epipolar lines in the captured image (of the reflected portion of the projected pattern) is achieved. By way of example, the factors which determine the ability to differentiate between features on separate epipolar lines can include: a feature type's shape and feature type detectability and reliability of coordinate location determination (e.g., likelihood of correct identification and location) after reflection from an imaged object. The object surface type also may have an effect, as features from metallic surfaces, glass, and other transparent or very dark surfaces, for example, are reflected with less exactitude, and thus make it more difficult to identify and locate feature types in the image of the reflected portion of the projected pattern. Projector's SNR and optical or electrical characteristics of the imaging device are further examples of factors which can have an effect over the (selected) distance between distinguishable epipolar lines.

According to examples of the presently disclosed subject matter, in a given system or system configuration and taking into account various other imaging or depth sensing factors which were mentioned above, or which would be apparent to those versed in the art, the horizontal (in this case) distance necessary to distinguish between separate epipolar lines can be determined. This distance necessary to distinguish between separate epipolar lines can be determined empirically, or it can be computed based on models which take into account various parameters related to the imaging apparatus and to the image processing device, and possibly also to various characteristics of the pattern, and the projection of the pattern, as mentioned or implied above. It would also be noted that the distance necessary to distinguish between separate epipolar lines can be used to determine the orientation angle of the pattern relative to the stereo baseline.

Figure 55:
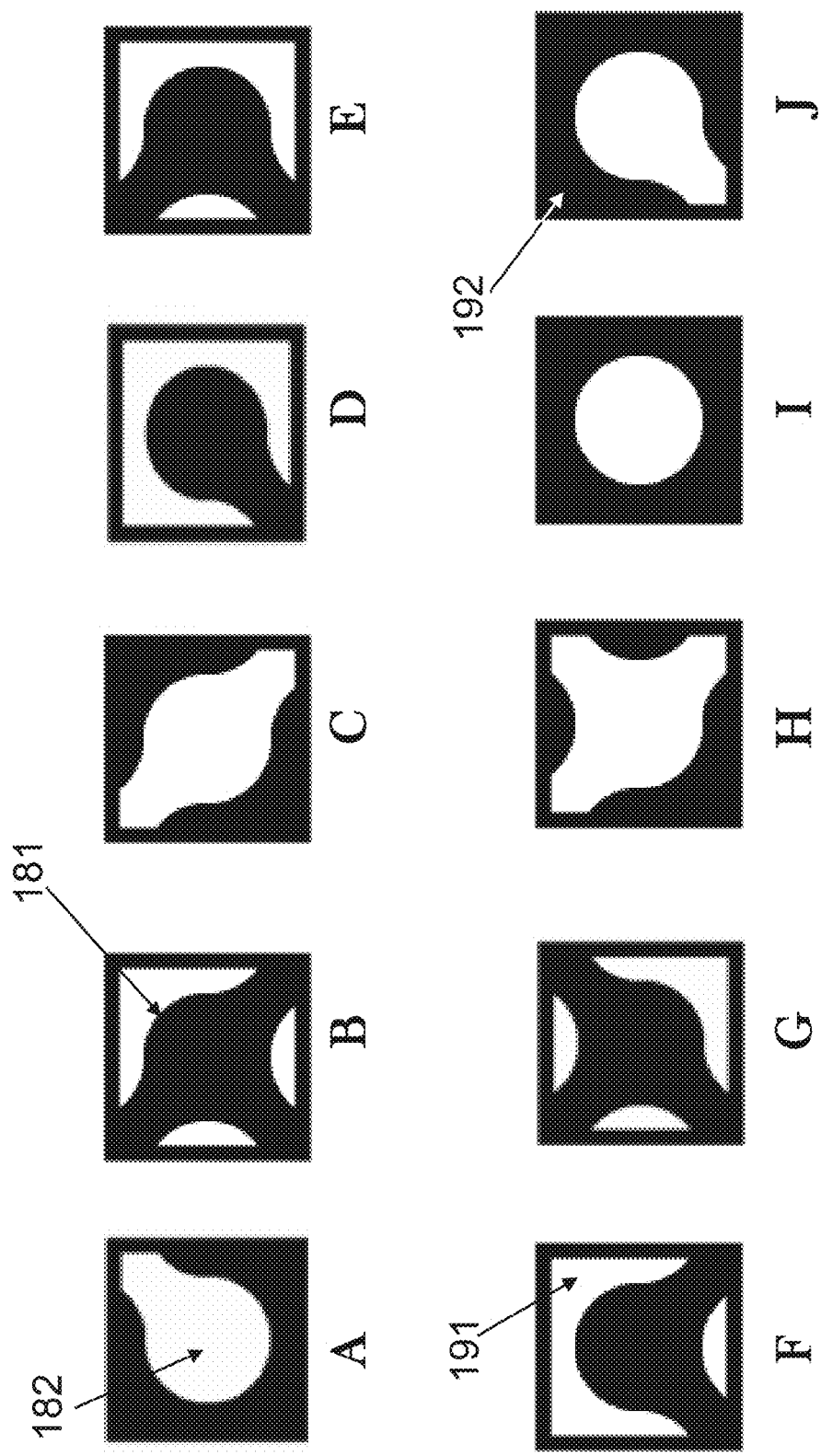
FIG. 55 includes illustrations of exemplary feature types that include preferred encoded pattern P1, in accordance with examples of the presently disclosed subject matter.

Reference is now made to FIG. 55, which includes illustrations of exemplary feature types that are used in encoded pattern P1, in accordance with examples of the presently disclosed subject matter. Features A-J are examples of binary spatially coded feature types. Each feature types is formed by a spatial combination of five black and white points, made up of a black (local minimum) or white (local maximum) center point 181 and 182, and four black or white saddle points 191. Combinations of the five black and white points lead to an alphabet of 32 unique characters or feature types. The feature types shown by way of example in FIG. 55 are arbitrarily named A-J, each corresponding to a different combination of a center point and four saddle points. A feature type having a white center point corresponds to a local maximum illumination intensity in the projected pattern, while a feature type having a black center point corresponds to a local minimum illumination intensity in the projected pattern. The peripheral points of each letter correspond to illumination intensities that are neither maximum nor minimum, where a white peripheral point is closer to maximum intensity than minimum intensity and a black peripheral point is closer to minimum than maximum intensity. It is noted that in other examples of the presently disclosed subject matter feature types having combinations of more or less saddle points can be used. For instance, if each feature type included six saddle points, an alphabet of 128 unique characters or feature types can be provided and thus a larger pattern period can be obtained. Such encoded feature types can be suitable, for example, for applications which benefit from a larger pattern with more sampling points.

FIGS. 39, 40A-40H and 41A-41D illustrate some of the ways two projections of coded light patterns may be used by system 200 and/or in method 500, in accordance with examples of the presently disclosed subject matter.

FIG. 39 illustrates several projections of the bi-dimensionally coded light pattern of FIG. 32(E28) projected onto an object (in this instance a Rubik's cube, not denoted), in accordance with examples of the presently disclosed subject matter, as well as additional light which is cast onto the object. Notably, while the bi-dimensionally coded light pattern in the example of FIG. 39 exhibits the following attributes: (a) It is an inverse image of itself under a diagonal shift; (b) It is also an inverse-code image of itself under a vertical shift; and (c) It is also an inverse-carrier image of itself under a horizontal shift, the processing of two projections of a coded light pattern which are discussed with respect to FIGS. 39, 40A-40H and 41A-41D may also be used for a coded light pattern which only exhibits one or two of this attributes.

In FIG. 39, projection 21 of the bi-dimensionally coded light pattern is arbitrarily selected as the basic projection, to which the other projections are compared.

Projection 22 of the same light pattern, which is rigidly shifted diagonally with respect to projection 21, results in patterning the object with a lighting which is the negative (i.e. inverse image) of the lighting of projection 21.

Projection 23 of the same light pattern, which is rigidly shifted horizontally with respect to projection 21, results in patterning the object with a lighting which is the inverse-carrier image of the lighting of projection 21.

Projection 24 of the same light pattern, which is rigidly shifted vertically with respect to projection 21, results in patterning the object with a lighting which is the inverse-code image of the lighting of projection 21.

In addition, lighting 25 exemplifies ambient light, which is nonuniform light not resulting from the projection of the coded light pattern (e.g. sunlight or ambient light) and lighting 26 exemplifies uniform light (which may be projected by system 200, or resulting from another light source).

Details 31 through 36 are details taken from the same position (lower right corner) of the respective lighting diagrams 21 through 26. Upsamples 41 through 46 are upsamples of the respective details 31-36, upsampled using bicubic interpolation. It is noted that bicubic interpolation was selected by way of example only, and that other interpolation methods known in the art (such as bilinear, B-spline, Lanczos, etc.) could be used as well.

In all of FIGS. 39, 40A though 40H and 41A through 41D, an imaged locally high intensity point (i.e. maximum point) is a result of a projection and thereafter reflection of a white spot of a coded light pattern on that surface location of the imaged object (the Rubik's cube, not denoted). Likewise, an imaged locally low intensity point (i.e. minimum point) is a result of a projection and thereafter reflection of a black spot of the coded light pattern on that surface location of the imaged object.

As can be seen, in the example illustrated in projection 22, the second projection of the bi-dimensionally coded light pattern results in an inverse illumination of the imaged object (and its background) with respect to projection 21. That is, if in projection 21 a reflected white spot is seen at a particular surface location on the imaged object, then in projection 22 of the same bi-dimensionally coded light pattern, a reflected black spot is observed at the same surface location of the imaged object, and vice versa. For instance, a bright maximum point under projection 21 of the coded light pattern is imaged as a dark minimum point under projection 22 of the coded light pattern. Likewise, a bright saddle point under projection 21 is replaced by a dark saddle point under projection 22.

In projection 23 only the intensities in the carrier locations are inverted, and in projection 24 only the intensities in the payload locations are inverted.

A Rubik's Cube was selected as a demonstration example of an image object, because it contains squares of varying colors, and flat planes arranged in different angles with respect to the camera. In the selected object, the reflected pattern shows high contrast when reflected from squares of bright colors, and less contrast when reflected from squares of darker colors. This is a result of the fact that the illumination energy emitted by the system that was used in the provided images is reflected from bright surfaces, generally, to a larger extent than the energy's reflection from dark surfaces, where much of the energy is absorbed.

FIGS. 40A through 40H illustrate examples of some of the procedures which may be used with two projections of the same pattern, based on the details and upsamples taken from FIG. 39, in accordance with examples of the presently disclosed subject matter. System 200 may be configured to use any combination of one or more of the procedures disclosed with respect to FIGS. 40A through 40H. Likewise, stage 510 of method 500 may include implementing any combination of one or more of the procedures disclosed with respect to FIGS. 40A through 40H. All of the operations of FIGS. 40A-40H are executed by applying the predefined mathematical operation discussed with respect to one of the respective diagrams on the values of intensity value sets taken from the respective first image and second image. In the description of FIGS. 40A-40H, first image data is image data of the first image, and second image data is image data of the second image.

FIG. 40A demonstrates a procedure of summing (a) first image which captures projecting of the reference pattern (projection 21) onto the object, and (b) second image which captures projecting onto the object the rigidly diagonally shifted projection of the pattern (which results an inverse image of the reference pattern, i.e. projection 22). The result of this procedure is illustrated as procedure result 51, and it provides an image of the texture of the object, with reduced (and possibly even without) information resulting from the pattern, as if it was illuminated by a uniform light.

FIG. 40B demonstrates a procedure of subtracting (a) first image data which images projecting of the reference pattern (projection 21) onto the object, from (b) second image data which images projecting of a rigidly diagonally shifted projection of the pattern which results an inverse image of the reference pattern (i.e. projection 22). The result of this procedure is illustrated as procedure result 52, and it provides a signed signal (e.g. the portions of procedure result 52 illustrated by black color in the diagram are actually represented by negative numbers in the result of the computation, while the bright parts of the diagram are actually represented by positive numbers), and the effect of ambient light is canceled.

FIG. 40C demonstrates a procedure of summing (a) first image data which images projecting of the reference pattern (projection 21) onto the object, and (b) second image data which images projecting of a rigidly vertically shifted projection of the pattern which results an inverse-code image of the reference pattern (i.e. projection 24). The result of this procedure is illustrated as procedure result 53, and it provides an image in which only the carrier is represented, and not the coding. This may be used, for example, for locating the grid points of the coding in higher accuracy, thereby improving the decoding of the code.

FIG. 40D demonstrates a procedure of subtracting (a) first image data which images projecting of the reference pattern (projection 21) onto the object, from (b) second image data which images projecting of a rigidly horizontally shifted projection of the pattern which results an inverse-carrier image of the reference pattern (i.e. projection 23). The result of this procedure is illustrated as procedure result 54, and it provides an image in which only the carrier is represented as a signed signal (i.e. using both positive and negative numbers), and not the payload. This may be used, for example, for locating the grid points of the coding in higher accuracy, thereby improving the decoding of the code.

It is noted that the procedure of FIG. 40D may be further used in order to achieve one or more the following results: (a) canceling (or at least reducing) effects of ambient light, and (b) simplifying detection of the carrier and making it more robust, because it is now signed.

FIG. 40E demonstrates a procedure of summing (a) first image data which images projecting of the reference pattern (projection 21) onto the object, and (b) second image data which images projecting of a rigidly horizontally shifted projection of the pattern which results an inverse-carrier image of the reference pattern (i.e. projection 23). The result of this procedure is illustrated as procedure result 55, and it provides an image in which only the code (i.e. payload data) is represented, and not the carrier.

FIG. 40F demonstrates a procedure of subtracting (a) first image data which images projecting of the reference pattern (projection 21) onto the object, and (b) second image data which images projecting of a rigidly vertically shifted projection of the pattern which results an inverse-code image of the reference pattern (i.e. projection 24). The result of this procedure is illustrated as procedure result 56, and it provides an image in which only the code is represented as a signed signal (i.e. using both positive and negative numbers), and not the carrier.

It is noted that the procedure of FIG. 40F may be further used in order to achieve one or more the following results: (a) canceling (or at least reducing) effects of ambient light, and (b) simplifying decoding of the code (payload) and making it more robust, because it is now signed.

FIG. 40G demonstrates a procedure of taking the absolute value of the subtraction of (a) first image data which images projecting of the reference pattern (projection 21) onto the object, and (b) second image data which images projecting of a rigidly diagonally shifted projection of the pattern which results an inverse image of the reference pattern (i.e. projection 22). The result of this procedure is illustrated as procedure result 57, and it provides an image containing the outlines of the reference pattern (e.g. edges between areas of different color). These outlines are relatively thin and sharp, since they are located at the zero-crossing areas within the subtraction result, so it is possible to detect their location at sub-pixel accuracy, offering improved triangulation accuracy.

FIG. 40H demonstrates a procedure of taking the absolute value of the subtraction of (a) first image data which images projecting of the reference pattern (projection 21) onto the object, and (b) second image data which images projecting of a rigidly horizontally shifted projection of the pattern which results an inverse-carrier image of the reference pattern (i.e. projection 23). The result of this procedure is illustrated as procedure result 58, and it provides an image containing a mesh {grid} of borderlines, having their crossings emerge in place of the saddle-points of the reference pattern. These borderlines and their crossings are relatively thin and sharp, since they are located at the zero-crossing areas within the subtraction result, so it is possible to detect their location at sub-pixel accuracy, offering improved triangulation accuracy.

FIGS. 41A through 41D exemplify some of the procedures which may be used with one of the projections of the pattern in addition to another non-patterned lighting based on the details and upsamples taken from FIG. 39, in accordance with examples of the presently disclosed subject matter. System 200 may be configured to use any combination of one or more of the procedures disclosed with respect to FIG. 41. Likewise, stage 530 of method 500 may include implementing any combination of one or more of the procedures disclosed with respect to FIG. 41. All of the operations of FIG. 41 are executed by applying the predefined mathematical operation discussed with respect to one of the respective diagrams on the values of intensity value sets taken from the respective first image and second image. In the description of FIGS. 41A-40D, first image data is image data of the first image, and second image data is image data of the second image.

FIG. 41A demonstrates a procedure of subtracting (a) first image data which images the object with ambient light, without any pattern projected onto which, from (b) second image data which images projecting of the reference pattern (projection 21) onto the object. The result of this procedure is illustrated as procedure result 61, and it provides image data in which only the reflection of the coded pattern appears, without interferences from ambient light.

It is noted that ambient light may be subtracted from image data of the rigidly shifted projections as well, before applying any of the procedures of FIGS. 40A through 40H, and especially before applying the procedures which includes summing data from two images.

FIG. 41B demonstrates a procedure of dividing the intensities of each intensity values pair taken from (a) first image data which images projecting of the reference pattern (projection 21) onto the object, and (b) second image data which images the object illuminated by uniform light, without any pattern projected onto it (but possibly while intentionally lighting the object with uniform light, if required). The result of this procedure is illustrated as procedure result 62, and it provides a normalized image in which the effect of the texture of the object (i.e. albedo) is reduced and the reflected reference pattern is enhanced.

The concepts of bi-dimensionally coded light patterns which are the inverse-carrier image and/or inverse-code image of themselves under rigid shifts were discussed with respect to bi-dimensionally coded light pattern which are intensity coded light patterns which include (a) a set of carrier elements (e.g. carrier locations) in which bright and dim (or dark) intensities give rise to a carrier signal, and (b) a set of payload elements (e.g. payload locations), in which bright and dim intensities give rise to a spatial coding signal.

In such coded light patterns, the first projection and the second projection are rigidly shifted with respect to one another so that carrier locations of the first projection at least partly overlap carrier locations of the second projection, and so that payload locations of the first projection at least partly overlap payload locations of the second projection, and bright and dim intensities are inverted in overlapping locations of the first projection and of the second projection in the carrier locations, or in the payload locations. It is noted that optionally, both the carrier locations and the payload locations may demonstrate such intensity inversion, e.g. in the case of an "inverse" pattern, or partially in some locations (possibly most locations) within "partially inverse-carrier" and "partially inverse-code" as exemplified in FIGS. 35-38. The extent of overlap between feature elements across the two (or more) projections can be associated with various optical characteristics of the projection and imaging components. The processing of the images and the decoding of the reflected portion of the pattern projections (or of just one of the projections), and/or the cross processing of the projections (sometimes referred to herein as the predefined mathematical operation) may impart certain requirements with regard to the extent of overlap between feature elements across the two (or more) projections. The overlap is required to associate each feature element from one projection with a feature element in the other projection(s), and in order to be able to use the information that is obtained through the mathematical operation(s) discussed above. Thus, an algorithm which may be used to determine the extent of overlap between feature elements across projections takes into account some or all of the above considerations. For example, an optimization algorithm can be used with constraints to guarantee that a minimum extent of overlap exists.

Another way to look at it is that the first projection and the second projection are rigidly shifted with respect to one another so as to give rise to: at least one set of carrier overlapping locations in which carrier locations of the first projection and carrier locations of the second projection overlap one another at least partly, and at least one set of payload overlapping locations in which payload locations of the first projection and payload locations of the second projection overlap one another at least partly; wherein for at least one set of locations (whether periodically distributed or not) selected from a group consisting of: the at least one set of carrier locations and the at least one set of payload locations, intensity values of the first projection in locations of the set are inverted with respect to intensity values of the second projection in the respective locations of the set.

The outputs of the computations may yield various types of useful information which would otherwise be unavailable using only a single bi-dimensionally coded light pattern. Some of these outputs and few of their possible utilizations were offered above. It is noted that processing unit 240 may be configured to:

a. Compute, based on the plurality of the outcome values, information (e.g. high-accuracy information) for at least one of: (a) a set of carrier elements (e.g. carrier locations) of the first projection, and (b) a set of payload elements (e.g. payload locations) of the first projection. The high-accuracy information may have a data type selected from a group of data types consisting of: high accuracy location information (e.g. having sub-pixel accuracy information), and high accuracy color information (e.g. providing a signed representation of the pattern and/or carrier and/or payload, overcoming ambient light issues, or albedo of the object); and to b. Determine the range parameters for the object based on the computed information.

Figure 42:
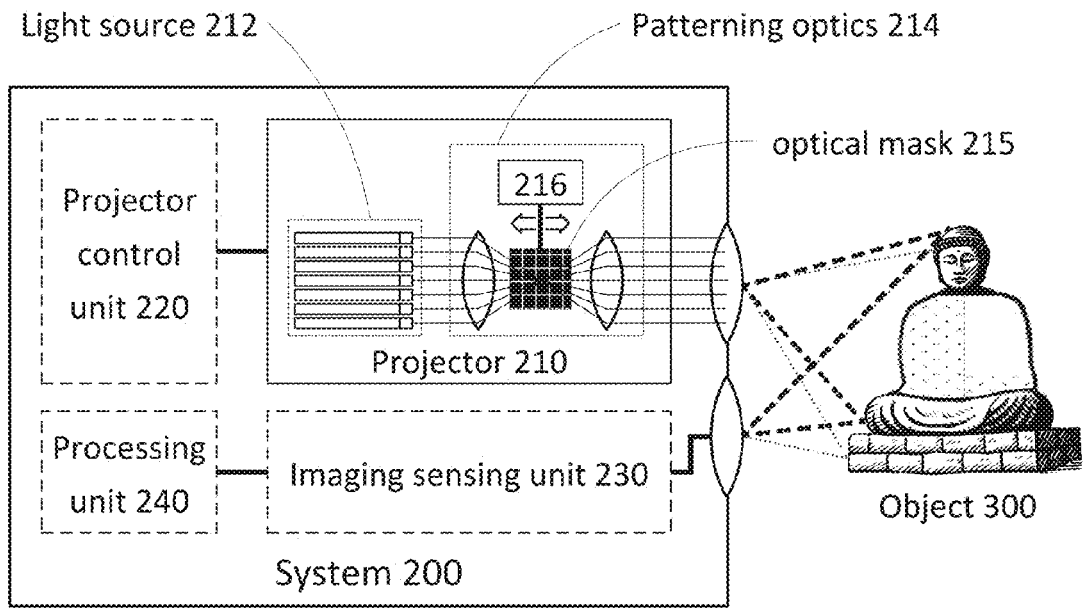
FIG. 42 is a functional block diagram illustrating an example of a system, in accordance with examples of the presently disclosed subject matter.

FIG. 42 is a functional block diagram illustrating an example of system 200, in accordance with examples of the presently disclosed subject matter. As exemplified in FIG. 42, the patterning optics 214 may include:

a. An optical mask 215, capable of patterning the at least one light beam passing through the optical mask. The optical mask may include a transparency mask of the bi-dimensionally coded light pattern, so that light emitted by light source 212 and passing through optical mask 215 would result in the light being coded by the bi-dimensionally coded light pattern.

b. Optical mask shifting module 216, operable to shift optical mask between a plurality of positions (including at least a first position and a second position). The optical mask shifting module 216 may be implemented, for example, using a piezoelectric unit.

Each projection of the coded light pattern may be projected when the mask is positioned (e.g. stationary) in one of the plurality of projection positions. The shifting between the plurality of positions may be limited to shifts in directions perpendicular to an optical axis of the projector, but this is not necessarily so. The number of positions to which optical mask shifting module 216 may correspond to the number of projections, but this is not necessarily so. It is noted that if the rigid shift required between the two projections includes rotation of the bi-dimensionally coded light pattern, this may be achieved by rotating optical mask 215 around an axis parallel to the optical axis. If the rigid shift required between the two projections includes line-reflection of the coded light pattern, this may be achieved by rotating optical mask 215 around an axis perpendicular to the optical axis.

The projector control unit 220 in such case may be configured to control moving of the optical mask between the plurality of positions, in order to control the projection of the first projection and of the second projection of the bi-dimensionally coded light pattern. Projector control unit 220 may be further configured to control light source 212 in order to control the projection of the first projection and of the second projection of the bi-dimensionally coded light pattern (e.g. in order to emit light only when optical mask 215 is positioned in one of the plurality of positions, and not in intermediary positions).

In the implementation of FIG. 42 (for example), the projector 210 is configured to project the first projection of the bi-dimensionally coded light pattern onto object 300 when optical mask 215 is in the first position, and to project the second projection of the coded light pattern onto the object 300 when the optical mask 215 is in the second position.

Optionally, system 200 may include a transparency mask shifting module 216 which is operable to shift the transparency mask 215 between a plurality of positions which include at least a first position and a second position, where projector 210 is configured to project the first projection of the bi-dimensionally coded light pattern onto object 300 when transparency mask 215 is in the first position, and to project the second projection of the bi-dimensionally coded light pattern onto object 300 when transparency mask 215 is in the second position. The extent of movement of the optical mask depends on the pattern used, and on the scale in which it is projected. For example, the movement between the two positions may be about 10 micrometer, about 100 micrometer, about 1 millimeter, about 10 millimeter etc.

Figure 43:
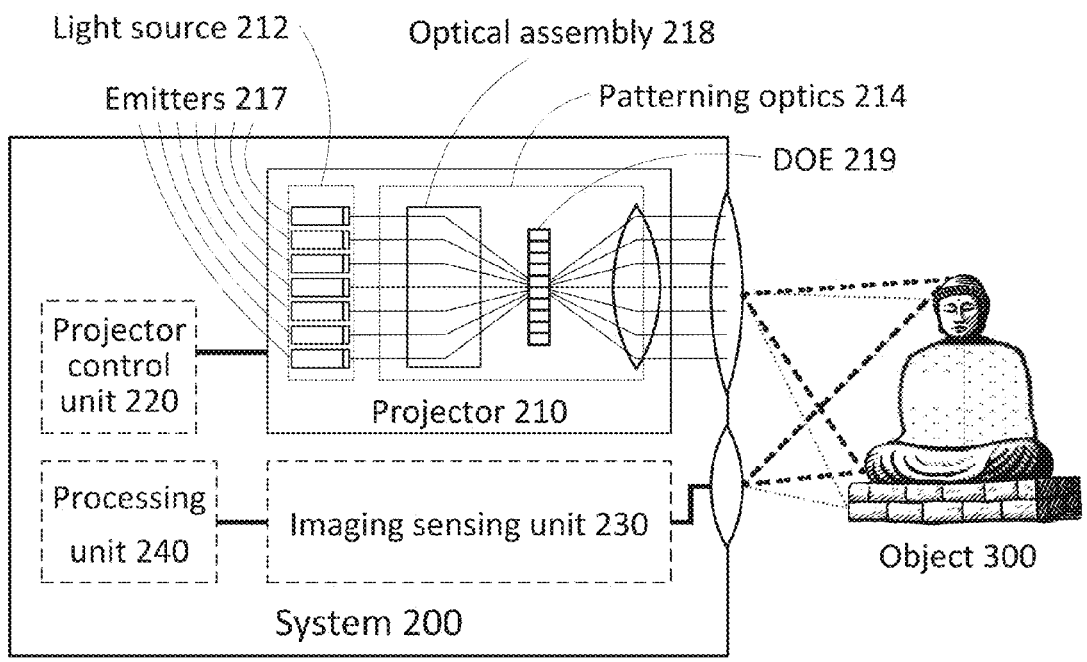
FIG. 43 is a functional block diagram illustrating an example of a system, in accordance with examples of the presently disclosed subject matter.

With respect to FIGS. 42 and 43, it is noted that—as discussed with respect to FIGS. 1A, 1B and 1C—units 220, 230 and 240 are optional. That is, system 200 may optionally include any combination of one or more of these units (220, 230 and 240)—but not necessarily so.

FIG. 43 is a functional block diagram illustrating an example of system 200, in accordance with examples of the presently disclosed subject matter. Optionally, projector 210 may include a light source which includes a laser array which include a plurality of individual emitters 217, each of the individual emitters 217 capable of generating a laser beam. System 200 may also include a projector control unit 220 which is configured to control activation of different subgroups of emitters 217 of the laser array, thereby resulting in projecting of the first projection when a first subgroup of emitters 217 is activated, and in projecting of the second projection when a second subgroup of emitters is activated 217.

Optionally, projector 210 may include (a) a diffractive optical element 219, operable to diffract one or more incident laser beams to provide structured light; and (b) an optical assembly 218, disposed between the light source and the diffractive optical element 219, the optical assembly 218 is operable to transform the laser beams to provide a plurality of transformed light beams and to direct the plurality of transformed light beams onto the diffractive optical element 219.

As exemplified in FIG. 43, the light source 212 may include a laser array which includes a plurality of individual emitters 217, each of the individual emitters capable of generating a laser beams propagating to optical assembly 218 of patterning optics 214. Patterning optical 214 may include:
  a. Diffractive optical element 219 (also referred to as DOE 219), operable to diffract one or more incident laser beams to provide structured light.
  b. Optical assembly 218 (which may include a plurality of optical elements such as lenses, mirrors, etc.), disposed between light source 212 and the diffractive optical element 219. Optical assembly 218 is operable to transform the plurality of light beams (arriving from emitters 217) to provide a plurality of transformed light beams and to direct the plurality of transformed light beams onto diffractive optical element 219, resulting in providing of a coded light pattern by the optical system.

For example, if the bi-dimensionally coded light pattern includes several copies of a basic recurring unit (such as rectangle 123 in FIGS. 5-34), DOE 219 may be operable to diffract one or more incident laser beams to provide the structured light which is structured to provide the recurring unit, and optical assembly 218 would direct different light beams towards DOE 219 in different angles, enabling to generate the bi-dimensionally coded light pattern by tiling the recurrent structured light several times.

The generation of different projections by system 200 if the later includes a diffractive optical element and a plurality of emitters (as exemplified in FIG. 43) may be enabled by using different subgroups of emitters for the different projections. Such an emitter is sometimes referred to as an addressable emitter array. The light beams would arrive to the diffractive optical element in different angles (originating from the different subgroups of emitters), and thereby projecting rigidly shifted projections of the bi-dimensionally coded light pattern. It is noted that shifting DOE 219 itself (like doing for optical mask 215 in the example of FIG. 42) may also be used—e.g. if rotation of the bi-dimensionally coded light pattern between the two projections is required.

Projector control unit 220 may thus be configured to control activation of different subgroups of emitters 217 of the laser array 212, thereby resulting in projecting of the first projection when a first subgroup of emitters 217 is activated, and in projecting of the second projection when a second subgroup of emitters 217 is activated.

Such a configuration may also be used for projecting the two rigidly shifted projections of the bi-dimensionally coded light pattern concurrently, if different subgroups of emitters 217 of the laser array 212 include lasers emitting in different wavelengths.

Figure 44:
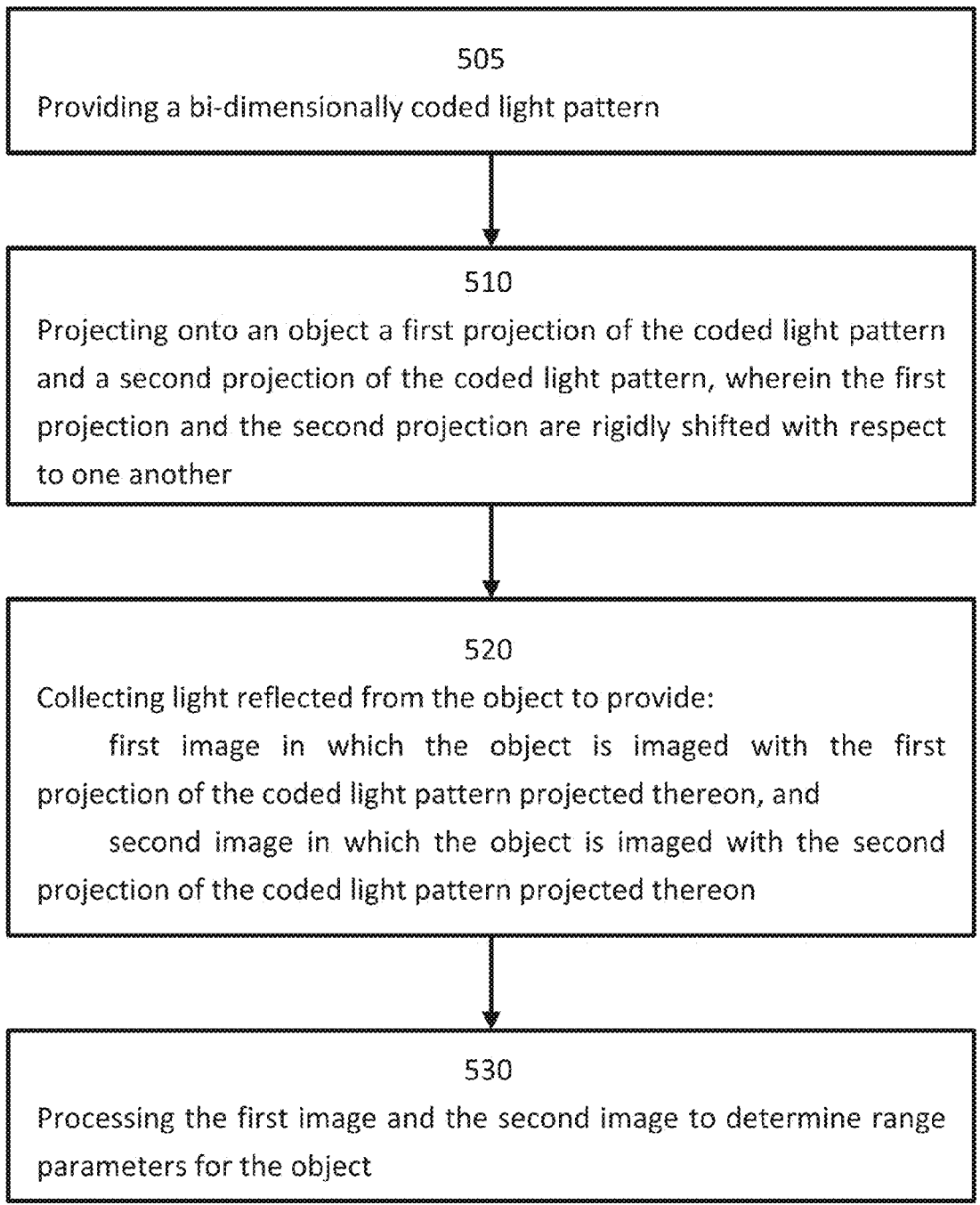
FIG. 44 is a flow chart illustrating an example of a method for computing range information for an object, in accordance with examples of the presently disclosed subject matter.

FIG. 44 is a flow chart illustrating an example of method 500, in accordance with examples of the presently disclosed subject matter. Method 500 is a method for computing range information for an object.

Referring to the examples set forth in the previous drawings, method 500 may be carried out by system 200. Different embodiments of system 200 may implement the various disclosed variations of method 500 even if not explicitly elaborated. Likewise, different embodiments of method 500 may include stages whose execution fulfills the various disclosed variations of system 200, even if succinctness and clarity of description did not necessitate such repetition.

Method 500 (as well as system 200) may be implemented to determine range parameters for various types of inspected objects, from a very minute scale (e.g. millimetric objects) to larger objects such as buildings.

Stage 505 of method 500 includes providing a bi-dimensionally coded light pattern.

Stage 510 of method 500 includes projecting onto the object a first projection of a bi-dimensionally coded light pattern and a second projection of the bi-dimensionally coded light pattern, wherein the first projection and the second projection are rigidly shifted with respect to one another. As stated with respect to system 200, the bi-dimensionally coded light pattern may be projected in stage 510 onto more than one object.

Referring to the examples set forth with respect to the previous drawings, stage 510 may be carried out by a projector such as projector 210, possibly under the control of a projector control unit such as projector control unit 220.

The bi-dimensionally coded light pattern projected in stage 510 may have any one or more of the characteristics discussed above with respect to the bi-dimensionally coded light pattern used by system 200, and especially with respect to FIGS. 3-41.

For example, the bi-dimensionally coded light pattern projected in stage 510 may be coded using discrete coding (as opposed to continuous coding)

Stage 520 of method 500 includes collecting light reflected from the object to provide: first image in which the object is imaged with the first projection of the bi-dimensionally coded light pattern projected thereon, and second image in which the object is imaged with the second projection of the bi-dimensionally coded light pattern projected thereon. The first image and the second image include features reflected off the object(s) upon which the pattern was projected.

It is noted that stage 520 may include generating image files, but this is not necessarily so, and it may also include providing image data which is not saved as a single file, such as real time stream of intensity values for different imaged locations.

Referring to the examples set forth with respect to the previous drawings, stage 520 may be carried out by an imaging sensing unit such as imaging sensing unit 230 (and imaging sensing unit 3030 of apparatus 3000, discussed below).

Stage 530 of method 500 includes processing the first image and the second image to determine range parameters for the object. Referring to the examples set forth with respect to the previous drawings, stage 530 may be carried out by a processing unit such as processing unit 240 (and processing unit 3040 of apparatus 3000, discussed below). Various ways in which the processing may utilize the first image and the second image are discussed with respect to processing unit 240 above, and with respect to FIGS. 48-50 below.

Stages 510, 520 and 530 may be executed in cycles, in each cycle the two projections of the bi-dimensionally coded light pattern are projected onto the object, the first image and the second image are acquired and processed in order to determine the range parameters. For example, range parameters to one or more objects may be determined in a rate which correspond to a video frame rate of a video in which the object is captured (either by the system which executed method 500—such as system 200—or by another system). The frame rate, processing rate, storage rate, and overall system rate can be associated with and depend upon the hardware and/or software which are used in some or all of the operations involved in the process of projecting the pattern, toggling between the two or more projections and any operation involved in the rigid shifting of the projections, the capturing or sensing of the reflected portion of the projected pattern and any other signal which is involved in the operation of the depth sensing system (such as visual light or RGB image), the processing of the captured signals/images including the decoding of the signals to obtain depth information and if applicable: any post processing of the depth information, including for example, color projection, storing of the depth information and any associated data, and communicating the depth information and any associated data.

FIG. 45 illustrates substages of projecting the first projection and the second projection of the bi-dimensionally coded light pattern onto the object (stage 510), in accordance with examples of the presently disclosed subject matter.

Stage 510 includes projecting the first projection of the bi-dimensionally coded light pattern onto the object (stage 511) and projecting the second projection of the bi-dimensionally coded light pattern, which is rigidly shifted with respect to the first projection, onto the object (stage 512).

It is noted that the projection of the two rigidly shifted projection of the bi-dimensionally coded light pattern may be continuous (e.g. for many frames in which range parameters are computed), but may also be intermittent or pulsed (e.g. projecting for durations which are significantly shorter than a duration of each frame, in order to reduce motion blur, save energy or for other reasons). In order to avoid corruption of one projection by the other(s), when one projection could interfere with another, the projections may be timed such at any time only one of the projections is emitted.

Also—if more than two rigidly shifted projections of the bi-dimensionally coded light pattern are used (in stage 510 as well as in the following stages), additional substages of projecting are included in stage 510.

Optionally, stage 511 and stage 512 may be carried out at least partly concurrently (i.e. so that the two rigidly shifted projections of the bi-dimensionally coded light pattern are projected onto the object at least partly concurrently. This may be achieved, for example, if the two projections are projected using different wavelengths.

Alternatively, the projecting of stage 511 and the projection of stage 512 may be executed at different times (i.e. without any overlap). This alternative is further explored in FIG. 46, which illustrates substages of stage 510 of projecting the first projection and the second projection of the bi-dimensionally coded light pattern onto the object, in accordance with examples of the presently disclosed subject matter.

If the two rigidly projections are not projected concurrently, optional stage 513 may be carried out between one projection and the other (in any order, if the two projections are alternated), stage 513 including changing a state of the projector which projects the bi-dimensionally coded light pattern.

For example, stage 513 may include optional stage 514 of shifting from one position to another an optical mask of the projector, which is capable of patterning at least one light beam passing through the optical mask. For example, the optical mask may include a transparency mask of the bi-dimensionally coded light pattern, so that light emitted by a light source of the projector and passing through the optical mask would result in the light coded by the bi-dimensionally coded light pattern. Referring to the examples set forth with respect to the previous drawings, stage 514 may be carried out by optical mask shifting module 216.

In another example, if a diffractive optical element is illuminated by light arriving from a plurality of individual emitters (as suggested, for example, with respect to FIG. 43), stage 513 may include optional stage 515 of alternating activation of different subgroups of such individual emitters, thereby resulting in projecting of the first projection when a first subgroup of emitters is activated, and in projecting of the second projection when a second subgroup of emitters is activated. The different subgroups may include emitters with similar light spectrum, or in different spectra.

It is noted that stage 513, if executed, includes changing the state of a projector of the bi-dimensionally coded light pattern so that the predefined rigid shift between the projections would be obtained.

The rigid shift between the projections (either if such a shift requires a change in a state of the projector between them—such or changing a location of a transparency mask or a DOE—or not), may be predetermined together with the design of the pattern, to achieve intended behaviors of the bi-dimensionally coded light pattern with respect to a rigidly shifted version of itself, such as discussed with respect to FIGS. 5-41. Such behaviors may include that the bi-dimensionally coded light pattern is, with respect to a shifted copy thereof, an inverse-image of itself, an inverse-code image of itself, and inverse-carrier image of itself, and so on. All of the variations discussed with respect to FIGS. 5-41 may be implemented for method 500 as well as for system 200.

Optionally, the bi-dimensionally coded light pattern is an intensity coded light pattern which includes a set of carrier feature elements (e.g. carrier locations) in which bright and dim intensities give rise to a carrier signal, and a set of payload feature elements (e.g. payload locations), in which bright and dim (or dark) intensities give rise to a spatial coding signal. In such case the first projection and the second projection may be rigidly shifted with respect to one another so that carrier locations of the first projection at least partly overlap carrier locations of the second projection, and so that payload locations of the first projection at least partly overlap payload locations of the second projection, and so that bright and dim intensities are inverted in overlapping locations of the first projection and of the second projection in the carrier locations, or in the payload locations. It is noted that optionally, both the carrier locations and the payload locations may demonstrate such intensity inversion, e.g. in the case of an "inverse" pattern, or partially in some locations (possibly most locations) within "partially inverse-carrier" and "partially inverse-code" as exemplified in FIGS. 35-38.

Optionally, the bi-dimensionally coded light pattern may be an intensity coded light pattern which includes at least one set of carrier locations (whether periodically distributed or not) and at least one set of payload locations (whether periodically distributed or not), and the first projection and the second projection may be are rigidly shifted with respect to one another (e.g. by having carrier locations of the first projection at least partly overlap carrier locations of the second projections) so as to give rise to: (a) at least one set of carrier overlapping locations in which carrier locations of the first projection and carrier locations of the second projection overlap one another at least partly, and (b) at least one set of payload overlapping locations in which payload locations of the first projection and payload locations of the second projection overlap one another at least partly.

Furthermore, the first projection and the second projection may be rigidly shifted with respect to one another (and the bi-dimensionally coded light pattern so designed) so that for at least one set of locations selected from a group consisting of: the at least one set of carrier locations and the at least one set of payload locations, intensity values of the first projection in locations of the set are inverted with respect to intensity values of the second projection in the respective locations of the set.

As aforementioned, the rigid shift between the first projection and the second projection is not necessarily parallel to any coding direction of the bi-dimensionally coded light pattern.

As aforementioned, a distinction between a first type of feature elements and a second type of feature elements may occur in the bi-dimensionally coded light pattern, and may be used in the analysis thereof (e.g. in the processing of the first image and of the second image). One possible distinction is a distinction between payload and carrier feature types, but other options of distinctions may also be used, as mentioned above.

Referring to stage 505 of providing the bi-dimensionally coded light pattern (and to the following stages in which the bi-dimensionally coded light pattern is used), providing the bi-dimensionally coded light pattern may include providing a bi-dimensionally coded light pattern which includes first feature elements and second feature elements. The first feature elements are feature elements which belong to a first set of feature elements, and the second feature elements are feature elements which belong to a second set of feature elements.

As discussed above, a spatial relation among the first feature elements and the second feature elements may be such that under a predetermined rigid shifting of the bi-dimensionally coded light pattern (e.g. between the two projections), in each pair out of a plurality of pairs of spatially overlapping feature types in the first and second projections, the feature elements of the second set of feature elements from the feature type in the first projection have a coding state that is different than a coding state of the feature elements of the second set of feature elements from a respective feature type of the second projection.

With respect to stage 510, each first feature element in the second projection of the bi-dimensionally coded light pattern (e.g. as imaged in the second image at stage 520) at least partly overlaps the corresponding first feature element in the first projection of the bi-dimensionally coded light pattern (e.g. as imaged in the first image at stage 520). Optionally, each second feature element in the second projection of the bi-dimensionally coded light pattern at least partly overlaps the corresponding second feature element in the first projection of the bi-dimensionally coded light pattern. Examples of utilization of the overlapping of feature elements of the same type in two projections are further investigated with respect to FIGS. 40A-40H

FIG. 47 illustrates substages of collecting light reflected from the object to provide the first image and the second image (stage 520), in accordance with examples of the presently disclosed subject matter.

Stage 520 includes collecting light reflected from the object to provide the first image in which the object is imaged with the first projection of the bi-dimensionally coded light pattern projected thereon (stage 512), and collecting light reflected from the object to provide the second image in which the object is imaged with the second projection of the bi-dimensionally coded light pattern projected thereon (stage 522). Stages 521 and 522 may be executed simultaneously, at partially overlapping periods, or at altogether different times.

The first image and the second image may be implemented as a single image (e.g. if the first projection and the second projection are projected using different wavelengths onto the object), or be different images (e.g. if the first projection and the second projection are projected at different times using the same wavelength or if a separate imaging sensor is dedicated for each separate wavelength).

FIG. 48 illustrates optional substages of processing the first image and the second image to determine range parameters for the object, in accordance with examples of the presently disclosed subject matter (stage 530).

Stage 530 may include a series of optional substages which includes stages 541, 542 and 543. Optional stage 541 includes obtaining from the first image and from the second image a plurality of intensity value sets, each intensity value set including an intensity value from the first image and a spatially corresponding intensity value from the second image.

Optional stage 542 includes applying a predefined mathematical operation on the values of each of the intensity value sets, to provide an outcome value for each of the sets.

For example, the predefined mathematical operation is selected from a group of mathematical operations including: addition, subtraction, absolute value of subtraction and division. Clearly, other, possibly more complex, mathematical procedures may be executed over the values of the different intensity value sets.

Optional stage 543 includes determining the range parameters for the object based on a plurality of the outcome values.

It is noted that stage 530 may include applying various image-processing algorithms, to each one of the first image or the second image for example, such algorithms may include noise reduction algorithms, contrast enhancement algorithms, etc. Stage 530 may also include applying various image-processing algorithms to an outcome image (also referred to as intermediate image) which can be generated by processing the first image and the second image (or one of these images with another image), e.g. using a generation process which is described below. For example, stage 530 may include applying low-pass filter and/or bandpass filter to any one of these images, before or after it is being processed. In another example, stage 530 may include applying intentional blurring to any one of these images, before or after it is being processed. Many other image-processing algorithms may be used as well.

FIG. 49 illustrates optional substages of processing the first image and the second image to determine range parameters for the object (stage 530), in accordance with examples of the presently disclosed subject matter. Stage 530 may include a series of optional substages which includes stages 551, 552, 553 and 554.

The stages shown in FIG. 49 pertain to a process in which the first image is analyzed for determining the range parameters (as is done by using a single projection of a single coded light pattern, as is done in some of the references mentioned in the background and including in U.S. Pat. Nos. 8,090,194, 8,208,719 and 8,538,166 and International patent application WO2008/062407, all of which are incorporated herein by reference), and using the second image in combination with the first image for improving the analysis of the first image, thereby reaching better results (e.g. decoding information which could not be otherwise decoded, e.g. because of ambient light, albedo of the imaged object, blur, etc.).

Stage 552 includes processing the first image and the second image for computing information (e.g. high-accuracy information) for a set of locations in the first image.

The set of locations for which information is computed may include, for example, at least one of the following:
a. A set of carrier elements (e.g. carrier locations) of the first projection (whether periodically distributed or not);
b. A set of payload elements (e.g. payload locations) of the first projection (whether periodically distributed or not);
c. A set of coding locations (in which coding information such as code-bits is stored in the image, e.g. in cases where there is no clear distinction of payload locations and carrier locations).

The information (e.g. the high-accuracy information) computed for the set of locations may be of different types. For example, all of the information which may be yielded from processing such as the processes discussed with respect to FIGS. 39, 40A-40H 41A-41D may be computed at stage 552.

For example, the information (e.g. the high-accuracy information) may have a data type selected from a group of data types consisting of: high accuracy location information and high accuracy color information; and determining the range parameters for the object based on the high accuracy information.

It is noted that the high-accuracy information may include (or be based on) the outcome values computed at stages 541 and 542, but this is not necessarily so.

Stage 552 may be preceded by optional stage 551 of processing the first image for computing preliminary information for a set of locations in the first image. Stage 551 may include, for example, determining rough locations for a set of grid points, and stage 552 may in such an example include determining high-accuracy location information for this set of grid points. However, this is not necessarily required, and stage 552 may be executed without being based on preliminary results of a preliminary stage based only on the first image, such as stage 551.

Stage 552 is followed by stage 553 of acquiring coding information from a set of coding locations of the first image (which may be the payload-locations, or other coding locations if there is no clear distinction between payload and carrier information). For example, stage 553 may include obtaining for each coding location a "0" or "1" value, when the bi-dimensionally coded light pattern is a binary coded light pattern.

Stage 554 includes processing the coding information for determining the range parameters for the object.

While not limited to prior art algorithms, several algorithms of determining range parameters by analyzing spatial coding information are known in the art, and may be used in stage 554. Some such algorithms are discussed in some of the references mentioned in the background, including in U.S. Pat. Nos. 8,090,194, 8,208,719 8,538,166 and International patent application WO2008/062407, all of which are incorporated herein by reference.

It is noted that while not necessarily so, the processing at stage 554 may also be based on the second image, or on values computed based on both the first image and the second image (such as these computed at stage 552, e.g. high-accuracy location information).

For example, stage 554 may include identifying the location of features (especially the code bits in the coding locations) along respective epipolar lines, and associating these locations along the epipolar lines with 3D coordinates in space from which the features were reflected.

This process of correspondence between feature locations along epipolar lines and 3D spatial coordinates is carried out through triangulation techniques. For each identified feature in the 2D image, a corresponding 3D coordinate is thus derived indicating the point in space from which that feature was reflected off an imaged object. Through a compilation of all such 3D coordinates, a 3D point cloud is derived that gives a three dimensional or depth map of the imaged object.

It is noted that further processing of the point cloud may yield a 3D mesh which essentially fuses the points of the 3D cloud into 3D surfaces. This mesh may also be texture mapped, possibly based on additional texture capture of the objects in the scene or based on the non-patterned texture image provided by the procedure demonstrated in FIG. 40.1.

FIG. 50 is a flow chart illustrating an example of optional substages of stage 530 of processing the first image and the second image to determine range parameters for the object, in accordance with examples of the presently disclosed subject matter. The flow of FIG. 50 may be used to demodulate and decode an illumination-encoded image (e.g. the first image).

The flow illustrated in FIG. 50 includes optional stages 561, 562 and 563. The flow illustrated in FIG. 50 pertains to coded light pattern which include first feature elements (of a first type of feature elements) and second feature elements (of a second type of feature elements), as discussed above.

Stage 561 includes obtaining coding states from the first image and from the second image, and generating a plurality of coding states sets, each coding state set including a coding state of a first feature element from the first image and a coding state of a spatially corresponding first feature element from the second image. For example, each coding set may include a coding state of corresponding payload elements in both of these images. For example, each coding set may include a coding state of corresponding carrier elements in both of these images. For example, each coding set may include intensities values of corresponding feature elements in both of these images. For example, each coding set may include intensities values of corresponding pixels in both of these images. For example, each coding set may include average intensities values of corresponding feature elements (each including a plurality of pixels) in both of these images.

It is noted that the coding states sets may be implemented as n-tuples (n≥2) of coding states. If each coding state contain only one coding state information from the first image and one coding state information from the second image, than the coding states sets may be referred to as coding states pairs. In an example, each coding states set may be implemented as an intensity value set, including an n-tuple of intensity values, where each of the intensity values of the n-tuple corresponds to image data obtained from one of the projections and where all of the intensity values of the n-tuple spatially correspond to one another (e.g. sampling intensity values of light arriving from the same spot on object 300, in the different lightings).

It is noted that other coding states in addition or instead of intensity values may be used, such as shape of the feature element, optical polarity, contrast with environment, n-order derivative of intensities in one or more directions, and so on. It is further noted that more than one coding state may be taken from each image for a single coding states set. For example, both intensity and polarity of a single location (e.g.

pixel) of the first image, and intensity and polarity of a corresponding location in the second image may be used in a 4-tuple coding states set, which pertain to information of two projections of the bi-dimensionally coded light pattern. In another example, multiple intensity values may be taken in each location from each image—corresponding to different colors in a multispectral image (e.g. Red, Green and Blue (RGB) intensities, or different Infrared (IR) frequencies intensities.

Stage 562 includes processing the coding states of each of the coding states sets, to provide an outcome value for each of the coding state sets. For example, stage 562 may include applying a predefined mathematical operation on the n values of each of the n-tuples (of the coding states sets), to provide an outcome value for each of the n-tuples (e.g. applying summation, averaging, finding minimal or maximal value, and so on).

Stage 563 includes determining the range parameters for the object based on a plurality of the outcome values. Stage 563 may include, by way of example, implementing any one or more of the procedures discussed with respect to FIGS. 40A-40H and 41A-41D, in any combination of such two or more procedures.

It is noted that method 500 may also include a stage of determining parameters for future instances of stages 510, 520 and/or 530, based on the processing of first image and/or the second image. For example, based on the quality of the image data obtained from projection one or more projections of the coded light pattern onto a scene which include the object, the method may include determining to use two or more projections of the coded light pattern, and the required processing of the results. Especially, if the coded light pattern has more than one possible behavior under different rigid shifts (e.g. inverse-image, inverse-carrier, and/or inverse-code), the analysis of the image data may be used for determining which processing to use, and possibly which rigid shift to apply in stage 520.

Referring to method 500 as a whole (as well as to system 200 as a whole), it is noted that in the description above, many of the examples were provided with respect to division of the coded light pattern (and therefore the first image and the second image) to feature elements types corresponding to payload information and carrier information (e.g. payload locations and carrier locations).

These examples were provided to present the reader with various examples which are relevant to many types of bi-dimensionally coded light patterns. It is nevertheless noted that other distinctions between different types of feature elements may be used (as discussed above). Furthermore, not all of the coded light patterns which may be used within the scope of the present invention include a distinction between payload and carrier—or the distinction may be not a clear cut one.

It is therefore emphasized again that any distinction between types of feature sets may be used, and that the stages of method 500 may be implemented on feature elements types of different kinds. Therefore, method 500 (as well as system 200) further extends to include any variation in which a plurality of first feature elements of a first feature elements type is used instead of the payload elements (e.g. payload locations) discussed above (mutatis mutandis), and in which a plurality of second feature elements of a second feature elements type is used instead of the carrier elements (e.g. carrier locations) discussed above (mutatis mutandis).

Referring to method 500 as a whole (and to system 200 as a whole), and including to the use of coding states sets of various kinds as discussed above, it is noted that the utilization of procedures such as the one discussed with respect to FIGS. 40A-40H and to FIGS. 41A-41D may include as an intermediate stage processing of the first image and the second image (and possibly other images, if any) to generate at least one outcome image (also referred to as "intermediate image"), and then processing the one or more outcome images in order to determine range parameters. The processing of the outcome images may be followed again by processing of the first and/or the second image, based on information gained by processing the one or more outcome images.

For example, the intermediate image may be generated by applying a mathematical operation to the set of images including the first image and the second image. For example, the first image and the second image may be added to one another, subtracted from one another, averaged, divided one by the other, and so on. More complex mathematical operations may also be used (e.g. absolute value of subtraction).

More generally, method 500 may include generating an outcome image in which the color of each pixel is based on the outcome value of a corresponding coding states set. For example, the color of each pixel in the outcome image may be determined by summing the intensity values of pixel in corresponding locations in the first image and in the second image. The determining of stage 530 in such case may include determining the range parameters for the object based on the outcome image. System 200 may be configured and adapted accordingly, mutatis mutandis.

The outcome image may be characterized in any different qualities, such as any combination of one or more of the following qualities:
 a. Locations of the first feature elements are resolvable in sub-pixel accuracy;
 b. Locations of the second feature elements are resolvable in sub-pixel accuracy;
 c. Edges in the coded light pattern are resolvable in sub-pixel accuracy;
 d. Borders between feature elements are resolvable in sub-pixel accuracy;
 e. A plurality of pixels are associated with positive outcome values and a plurality of pixels are associated with negative outcome values (e.g. positive and negative outcome values are associated with payload feature elements—thereby giving rise to positive and negative payload outcome values).

Examples of these qualities are presented in the procedure results of FIGS. 40A-40H and 41A-41D.

Figure 51:
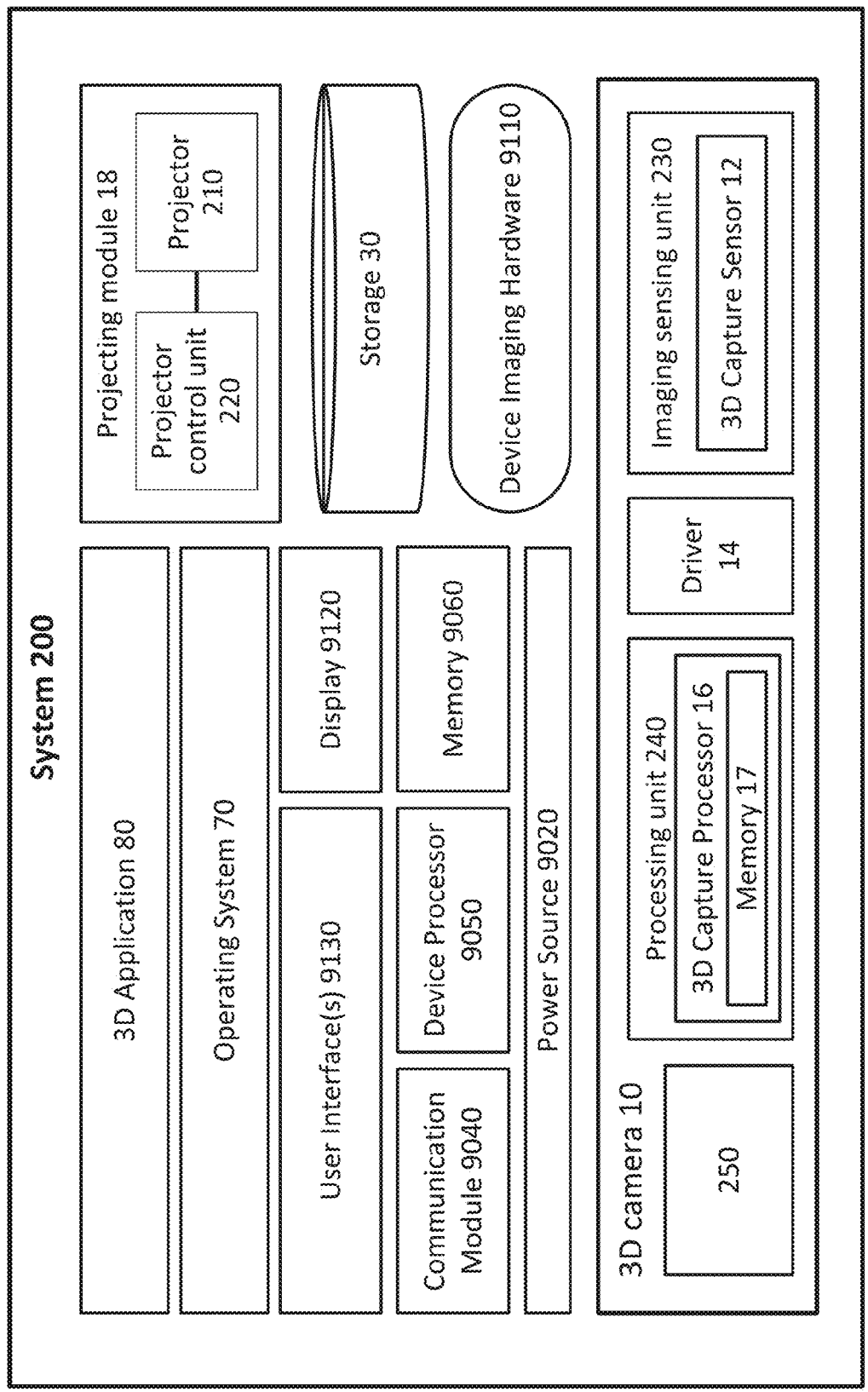
FIG. 51 is a functional block diagram illustrating an example of an optical system, in accordance with examples of the presently disclosed subject matter.

FIG. 51 is a functional block diagram illustrating an example of optical system 200, in accordance with examples of the presently disclosed subject matter. In FIG. 51 there is presented a possible utilization of the projection of the structured light pattern 150 in system 200, to capture three dimensional (3D) images. The capturing of 3D images by system 200 is facilitated by determining range parameters for objects imaged in different pixels of the image. It is noted that these possible uses are offered by way of a non-limiting example, as many other uses will present themselves to a person who is of ordinary skill in the art. Furthermore, while the functionalities of utilizing the projection of system 200 are discussed as being implemented by components of the same system 200, it will be clear that such functionalities may also be implemented by an external system and with additional, fewer or other components for utilizing the projection.

The following discussion relates to a system for managing 3D capture. It will be clear to a person who is of ordinary skill in the art that the following discussion is also applicable to methods and computer program products for managing 3D capture, mutatis mutandis, and that the latter are not discussed in detail for reasons of brevity.

According to examples of the presently disclosed subject matter, managing the 3D capture (sometimes also referred to as depth sensing) can include managing use of resources in a mobile computing device, more particularly, a mobile communication device such as a smartphone, a tablet and/or their likes according to predefined rules or criteria. In further examples of the presently disclosed subject matter, managing the 3D capture can include managing use of one or more 3D capturing resources in a mobile communication device. Yet further by way of example, managing the 3D capture can include managing one or more of: power consumption, a memory and/or storage utilization, allocation communication bandwidth consumption, allocation of processing resources (e.g., CPU cycles) etc. In the following description, by way of non-limiting example for a mobile computing device, reference is typically made to a mobile communication device.

Throughout the following description, reference is made to the term "3D capture". The term 3D capture relates to a technological process which involves utilizing a plurality of resources of a mobile communication device to obtain depth or range data (3D data) with respect to a certain scene. Thus, according to examples of the presently disclosed subject matter, managing 3D capture can include managing operation of at least one resource that is involved in the 3D capture or managing operation of at least one software feature of the 3D capture. It would be appreciated that at least in some respects, in some cases, or under certain conditions modifying the operation of a resource that is involved in the 3D capture can affect the operation of at least one software feature of the 3D capture, and vice versa.

Referring to FIG. 51 (and to system 200 generally), it is noted that system 200 may be implemented as a mobile communication device, such as a smartphone, a lap-top computer or another hand-held device. As can be seen in FIG. 51, and by way of example, system 200 may include a various components that are capable of providing 3D depth or range data. In the example of FIG. 51 there is shown a configuration of system 200 which includes an active stereo 3D camera 10, but in further examples of the presently disclosed subject matter other known 3D cameras can be used. Those versed in the art can readily apply the teachings provided in the examples of the presently disclosed subject matter to other 3D camera configurations and to other 3D capture technologies.

By way of example, the 3D camera 10 can include: a 3D capture sensor 12 (which may optionally be part of the aforementioned imaging sensing unit 230 or replace it), a driver 14, and a 3D capture processor 16 (which may optionally be part of the aforementioned processing unit 230 or replace it). System 200 also includes a projection module 18, which includes emitter array 210, optical subunit 220 and DOE 230. Optionally, projection module 18 may further include output optics 220.

In this example, the projection module 18 is configured to project a structured light pattern and the 3D capture sensor 12 is configured to capture an image which corresponds to the reflected pattern, as reflected from the environment onto which the pattern was projected. U.S. Pat. No. 8,090,194 to Gordon et. al. describes an example structured light pattern that can be used in a projection module component of a 3D camera, as well as other aspects of active stereo 3D capture technology and is hereby incorporated into the present application in its entirety. International Application Publication No. WO2013/144952 describes an example of a possible projection module design (also referred to as "flash design"), and is hereby incorporated by reference in its entirety.

By way of example, emitter array 210 which is included in the projection module 18 may include an IR light source, such that it is capable of projecting IR radiation or light, and the 3D capture sensor 12 can be and IR sensor, that is sensitive to radiation in the IR band, and such that it is capable of capturing the IR radiation that is returned from the scene. The projection module 18 and the 3D capture sensor 12 are calibrated. According to examples of the presently disclosed subject matter, the driver 14, the 3D capture processor 16 or any other suitable component of the system 200 can be configured to implement auto-calibration for maintaining the calibration among the projection module 18 and the 3D capture sensor 12.

The 3D capture processor 16 can be configured to perform various processing functions, and to run computer program code which is related to the operation of one or more components of the 3D camera. The 3D capture processor 16 can include memory 17 which is capable of storing the computer program instructions that are executed or which are to be executed by the processor 16.

The driver 14 can be configured to implement a computer program which operates or controls certain functions, features or operations that the components of the 3D camera 10 are capable of carrying out.

According to examples of the presently disclosed subject matter, system 200 can also include hardware components in addition to the 3D camera 10, including for example, a power source 9020, storage 30, a communication module 9040, a device processor 40 and memory 9060 device imaging hardware 9110 a display unit 9120 and other user interfaces 9130. It should be noted that in some examples of the presently disclosed subject matter, one or more components of system 200 can be implemented as distributed components. In such examples, a certain component can include two or more units distributed across two or more interconnected nodes. Further by way of example, a computer program, possibly executed by the device processor 40, can be capable of controlling the distributed component and can be capable of operating the resources on each of the two or more interconnected nodes.

It is known to use various types of power sources in a mobile communication device. The power source 9020 can include one or more power source units, such as a battery, a short-term high current source (such as a capacitor), a trickle-charger, etc.

The device processor 9050 can include one or more processing modules which are capable of processing software programs. The processing module can each have one or more processors. In this description, the device processor 9050 different types of processor which are implemented in system 200, such as a main processor, an application processor, etc.). The device processor 9050 or any of the processors which are generally referred to herein as being included in the device processor can have one or more cores, internal memory or a cache unit.

The storage unit 30 can be configured to store computer program code that is necessary for carrying out the operations or functions of system 200 and any of its components. The storage unit 30 can also be configured to store one or more applications, including 3D applications 80, which can be executed on system 200. In a distributed configuration one or more 3D applications 80 can be stored on a remote computerized device, and can be consumed by system 200 as a service. In addition or as an alternative to application program code, the storage unit 30 can be configured to store data, including for example 3D data that is provided by the 3D camera 10.

The communication module 9040 can be configured to enable data communication to and from the mobile communication device. By way of example, examples of communication protocols which can be supported by the communication module 9040 include, but are not limited to cellular communication (3G, 4G, etc.), wired communication protocols (such as Local Area Networking (LAN)), and wireless communication protocols, such as Wi-Fi, wireless personal area networking (PAN) such as Bluetooth, etc.

It should be noted that that according to some examples of the presently disclosed subject matter, some of the components of the 3D camera 10 can be implemented on the mobile communication hardware resources. For example, instead of having a dedicated 3D capture processor 16, the device processor 9050 can be used. Still further by way of example, system 200 can include more than one processor and more than one type of processor, e.g., one or more digital signal processors (DSP), one or more graphical processing units (GPU), etc., and the 3D camera can be configured to use a specific one (or a specific set or type) processor(s) from the plurality of device processors.

System 200 can be configured to run an operating system 70. Examples of mobile device operating systems include but are not limited to: such as Windows Mobile™ by Microsoft Corporation of Redmond, Wash., and the Android operating system developed by Google Inc. of Mountain View, Calif. It is noted that if system 200 is not a mobile system, other operating systems may be used (e.g. Windows, Linux, etc.).

The 3D application 80 can be any application which uses 3D data. Examples of 3D applications include a virtual tape measure, 3D video, 3D snapshot, 3D modeling, etc. It would be appreciated that different 3D applications can have different requirements and features. A 3D application 80 may be assigned to or can be associated with a 3D application group. In some examples, the device 9100 can be capable of running a plurality of 3D applications 80 in parallel.

Imaging hardware 9110 can include any imaging sensor, in a particular example, an imaging sensor that is capable of capturing visible light images can be used. According to examples of the presently disclosed subject matter, the imaging hardware 9110 can include a sensor, typically a sensor that is sensitive at least to visible light, and possibly also a light source (such as one or more LEDs) for enabling image capture in low visible light conditions. According to examples of the presently disclosed subject matter, the device imaging hardware 9110 or some components thereof can be calibrated to the 3D camera 10, and in particular to the 3D capture sensor 12 and to the projection module 18. It would be appreciated that such a calibration can enable texturing of the 3D image and various other co-processing operations as will be known to those versed in the art.

In yet another example, the imaging hardware 9110 can include a RGB-IR sensor that is used for capturing visible light images and for capturing IR images. Still further by way of example, the RGB-IR sensor can serve as the 3D capture sensor 12 and as the visible light camera. In this configuration, the driver 14 and the projection module 18 of the 3D camera, and possibly other components of the device 9100, are configured to operate in cooperation with the imaging hardware 9110, and in the example given above, with the RGB-IR sensor, to provide the 3D depth or range data.

The display unit 9120 can be configured to provide images and graphical data, including a visual rendering of 3D data that was captured by the 3D camera 10, possibly after being processed using the 3D application 80. The user interfaces 9130 can include various components which enable the user to interact with system 200, such as speakers, buttons, microphones, etc. The display unit 9120 can be a touch sensitive display which also serves as a user interface.

The 3D capture processor 16 or the device processor 9050 or any sub-components or CPU cores, etc. of such processing entities can be configured to process a signal that is received from the 3D capture sensor 12 or from the device imaging hardware 9110, in case the device imaging hardware 9110 is capable of and is configured to serve the 3D camera 10. For convenience, in the following description, the core 3D capture functions shall be attributed, in a non-limiting manner, to the 3D capture processor 16 and to the 3D capture processor 16. However, it would be appreciated that the functionality and task allocation between the various components and sub components of system 200 are often a design choice.

According to examples of the presently disclosed subject matter, the 3D capture processor 16 can be configured to collect imaging data, process the imaging data, analyze the imaging data, produce imaging results, imaging content, and/or imaging display, etc.

According to examples of the presently disclosed subject matter, the 3D capture processor 16 can receive as input an IR image and calibration information. By way of example, the calibration information may relate to IR sensor (as an example of a 3D capture sensor) and projector (such as the projection module 18). In some examples of the presently disclosed subject matter, the 3D capture processor 16 can also receive as input a color image, e.g., from the device imaging hardware 9110, and a color camera—IR camera calibration information.

By way of example, the processing that is carried out by the 3D capture processor 16 can include pre-processing, optical character recognition (OCR), error correction and triangulation. The pre-processing function can include operations for removing sensor noise and for improving signal quality, e.g., by resolving optical issues, such as speckles. The OCR function translates areas in the image to one of a plurality of code words that were used in the pattern that was projected by the projection module 18 and which was captured by the 3D capture sensor 12. The error correction operation can include computations which use pre-existing knowledge on the projected pattern/code to correct erroneous labeling of code words or of features of code words (which can lead to changing of a label of one or more code words). The triangulation function takes into account the imaging geometry to extract the depth information. An example of a triangulation procedure that is made with reference to active triangulation methods is provided in U.S. Pat. No. 8,090,194 to Gordon et. al.

According to examples of the presently disclosed subject matter, the 3D capture processor 16 can also perform a color projection function, whereby the color from a color sensor (e.g., from the device imaging hardware 9110) is projected onto the 3D data. It would be appreciated that the color projection function (as any other function described here with reference to the 3D capture processor 16) can be carried out by the device processor 9050 or any processing component thereof.

Additional processes which may involve processing operations and which can be implemented as part of a 3D data processing pipeline for certain 3D applications can (but not necessarily) include some (e.g., one, two, three, . . . ) of the following: live system control (e.g., auto gain, auto exposure, control of active source power and pulse duration, etc.), point cloud registration, denoising, feature classification, feature tracking, various 3D vision uses, passive camera processing (e.g., pose estimations, shape from motion etc.), inertial measurement unit (IMU) processing (e.g., Kalman filters), time stamping, ISP functions (demosaic, gama correction), compression, calibration quality monitoring, etc. It would be appreciated that the above operations can be carried out on the 3D capture processor 16, on the device processor 9050 or on both (the processing tasks can be divided among the various processing resource, either in advance or in real-time).

According to examples of the presently disclosed subject matter, the 3D camera 10, after processing of the signal from the sensor 12 and possibly from other sources, can be configured to provide as output one or more of the following: a set of 3D points, typically with normals (point cloud), where the normals can be computed using adjacent points; a textured mesh—triangulation (generating polygonal surface) using adjacent; depth map with color map (color projection). Those versed in the art would appreciate that additional outputs can be provided by the 3D camera 10. As mentioned above, some of the processing attributed in some examples of the presently disclosed subject matter to the 3D camera 10 and to the 3D capture processor 16 can be carried out outside the 3D camera 10, and in particular by the device processor 9050, and so some of the output which are attributed here to the 3D camera 10 can be generated outside what is referred to as the 3D camera in the examples shown in FIG. 15 and in the description of FIG. 15 provided herein.

According to examples of the presently disclosed subject matter, the device processor 9050, possibly in cooperation with the 3D capture processor 16, can be configured to determine or receive data with respect to the state of the resources of the mobile communication system 9100. The resources state data can be organized in any suitable form. For example, related or alternative resources can be grouped, resources which are linked by some tradeoff can be linked, resources whose usage crossed some threshold can be grouped, etc.

According to examples of the presently disclosed subject matter, in addition to the usage state information, the device processor 9050 can be configured to obtain or receive, e.g., from the memory 9060, additional information which can be useful for determine the usage state of one or more resources of system 200. For example, the device processor 9050 can obtain data which relates to expected resources usage, for example, as result of scheduled tasks or based on statistics with respect to the device 9100 or its resources behavior in terms of resource usage and/or based on statistics with respect to the behavior of applications running on the device in terms of resource usage. In another example, expected resources usage can relate to tasks that are expected to be carried out, either as a result of processes that are already running one the mobile communication device, or for any other reason.

According to examples of the presently disclosed subject matter, the term "resource availability profile" is used in the description and in the claims to describe the data that is used in the mobile communication device to describe the current or expected state of one or more resources of the mobile communication device, in particular to describe the state of the resources that are associated with the operation of a 3D application, or which are expected to be effected by the operation of a 3D application or any of its features.

According to examples of the presently disclosed subject matter, the device processor 9050 can be configured to continuously monitor the state of the resources of system 200 and can update to resource availability profile accordingly. In further examples of the presently disclosed subject matter the device processor 9050 can be configured to routinely monitor the resources state and update the resource availability profile, where the timing of the update is either determine according to predefined intervals, or is determined based on some input that is received at the device processor. In yet another example, the device processor 9050 updates to resource availability profile when a certain event occurs, such as an event which affects the availability of at least one resource of the mobile communication device.

Throughout the description and in the claims reference is made to the term "3D application". The term 3D application as used herein relates to a computer program code that can run as an application on a mobile communication platform (whether hosted locally or whether hosted remotely and consumed as a service on a mobile communication device), and which computer program code embodies at least one feature which uses 3D data, in particular 3D data that is provided by or obtained from a 3D camera. Such a feature is termed in the description and in the claims as a 3D capture feature. Many examples of 3D applications exist in the market and the following are a small sample of which: a virtual tape measure, a room modeling environment, 3D segmentation and model creation, augmented reality games, etc.

It would be appreciated that a 3D application, or a 3D capture feature of a 3D application can have certain attributes characteristics and requirements. Furthermore, in order to enable, support and/or execute different 3D capture features, different resources (hardware resource but possibly also software resources) allocation requirements can exist (including different levels of a given resource), or from another perspective, or according to different implementations, different 3D capture features can consume different resources (including different levels of a given resource).

For example, assume a 3D conferencing application having a full-view feature and a face-only feature, where the full scene feature involves capturing and processing 3D data from the entire field of view of the sensor, and the face-only feature involves utilizing only the resources that are required for obtaining 3D data of an area in the scene where the face of a person facing the 3D capture sensor is detected. Among the two features, it is highly probable that the full view feature of the 3D capture application will consume greater processing, memory and power resources compared to the face only feature.

According to examples of the presently disclosed subject matter, a given feature of a given 3D application 80 can be associated with a particular part of the software program code of the 3D application. Alternatively or additionally, a feature of a 3D application 80 can be associated with a particular resource, such a particular hardware component or a particular software program code external to 3D application 80 and running on system 200. For example, a feature of a 3D application can be associated with an inertial measurement unit (not shown) of system 200.

According to examples of the presently disclosed subject matter, for each feature there can be provided a cost measure. The term "cost measure" as used herein and in the claims relates to a measure of a feature's estimated, expected or measured consumption of a given resource or of a resource group, or of one resource from a resource group, or the measure can be global measure of the feature's resource consumption. In yet further example, the cost measure can relate to the feature's estimated, expected or measured consumption of a resource or resources at a given mode of the respective 3D capture application.

By way of example, the cost measure of each feature can include a plurality of measures for a plurality of resources. Still further by way of example, the cost measure can include measures for alternative resources, and such measures and the resources with which they are associated can be indicated as alternatives. It would be noted that providing such alternative measures can enable preforming various tradeoff computations including with respect to different configurations of a given feature, and in another example, with respect to implementation of different features in different 3D applications or in different operational mode of a given (the same) 3D application.

Furthermore, it is possible that two or more 3D applications which are functionally connected to one another would be executed in system 200, and the relation between the 3D applications can be indicated, e.g., to the device processor 9050, and the device processor 9050 can be configured to take into account the relations and cross effect of the related 3D applications of some features thereof when processing a cost measure of a given feature of one of the related 3D applications.

By way of example the cost measure of a given 3D application feature can be provided as explicit data that is stored as part of the feature program code, or that is otherwise associated with the feature program code. In a further example, the cost measure of a given 3D application feature can be determined (e.g., calculated) based on previous behavior of the feature and of one or more resources which are utilized to enable the feature. In yet further examples, the cost measure of a given 3D application feature can be determined based on statistical data, for example, based on the resource consumption of related features, possibly of related 3D applications, and possibly also under similar operating conditions, on similar mobile communication devices, etc.

The cost measure can be provided in various forms. For example, the cost measure can include information related to an amount or level of power (electricity) consumption, capacity consumption (e.g. consumption of processing power, consumption of memory, consumption of communication bandwidth, etc.). In another example, the cost measure can provide a measure of an aspect of user experience such as increased or reduced latency, frame rate, accuracy of output, etc.

According to examples of the presently disclosed subject matter, in addition to the cost measure of a given feature of a 3D capture application, a functional measure can be obtained with respect to the feature. The term "functional measure" as used herein relates to an indication provided in respect of the functional value of a 3D capture application feature in respect of which the functional measure is provided. By way of example, the functional value of a feature indicates the value, importance or contribution of the feature to the user experience. In another example, the functional value of a feature indicates the value, importance or contribution of the feature for enabling additional features of the 3D capture application, or the value, importance or contribution of the feature for enabling features of other applications.

Still further by way of example the functional measure of a given feature can relate to a specific mode of operation of the respective 3D capture application, and the functional measure relates to the functional value of the respective feature in the respective mode of the 3D capture application.

According to examples of the presently disclosed subject matter, each 3D application can have at least one mode of operation. According to examples of the presently disclosed subject matter, a 3D application can include a live-mode. The term "live-mode of a 3D capture application" (or "live-mode" in short) as used in the description and in the claims relates to a mode of the 3D application in which instant (real time or near real time, e.g., up to 1 second of latency) feedback is provided (e.g., presented on a display) to a user (human or program) of the 3D application. Still further by way of example, the feedback provided in the live mode of the 3D application, possibly together with additional features of the live mode, can facilitate a certain measure of control over the an ongoing capturing process of 3D data. For example, instant feedback which is provided by the mobile communication device in the live mode of a 3D application can enable modification of one or more configurations and/or features or usage of at least one resource of the mobile communication device the modify the results of the ongoing 3D capture process. Examples of modification which can be enabled by the live mode include changing an orientation of the 3D imaging components, modifying a level of illumination provided by the projector, changing the type of pattern that is used by the projector, and control over software resources of the mobile communication device, such as modifying a level of gain applied to the incoming signal from the sensor, changing the type of error correction used in the decoding process, etc.

According to examples of the presently disclosed subject matter, a resource of the mobile communication device, as used herein can relate to a component or a sub-component, a firmware routine, or a software program running of the mobile communication device.

As would be appreciated by those versed in the art, in case a 3D application also operates at a non-live mode, the hardware and/or software configuration that is used in the 3D capture live-mode can have effect on operation of the non-live mode of the 3D application, and can have an effect on the resources that are used in the non-live mode of the 3D application, including the level of usage, etc. In another example, the stream of data that is passed on a non-live mode of the 3D capture, e.g., for further processing can also be influenced by the actual implementation of the live-mode of the respective 3D application.

In the present disclosure and in the claims, the term "non-live mode of a 3D application" (or "non-live mode" in short) (e.g., latency is above 1 second or above 2-3 seconds), relates to a mode of operation of a 3D application, other than a live mode. According to examples of the presently disclosed subject matter, a non-live mode of a 3D application is a mode which does not take place concurrently with the 3D capture operation. Still by way of example, a non-live mode of a 3D application usually involves further utilization of resources, including, for example, further processing of the 3D data. Still further by way of example, the non-live mode can include further processing by the device processor 9050 of system 200 or in another example, further processing by external (and remote) resources.

It would be appreciated that in addition to the live-mode of a given 3D application several non-live modes can exist, each of which can have different features, or features that have different configurations. By way of example, the modes can differ from one another in the amount of latency, as well as in other characteristics.

According to examples of the presently disclosed subject matter, a given mode of a 3D application can include at least two features, where the two features are alternative to one another, and wherein in the given mode of the application it is possible to use only one of the two features. Further by way of example, each one of the two alternative features can have a different resource consumption.

According to examples of the presently disclosed subject matter, two different modes of a certain 3D application can have one or more common 3D application features. Further by way of example, a given feature of a 3D application can have a different configuration or different characteristics in different modes of a given 3D application. It would be noted, a given feature which can have different resource consumption characteristics in different configurations of the feature. In case a 3D application that is subject to the resource management procedure according to examples of the presently disclosed subject matter, has identical sets of features across two modes of operation which are used in the resource management procedure, at least one of the features can have a different configuration in each of the two modes of operation.

In other examples, two different modes of a certain 3D application can have entirely different features (none of the features is common).

According to a further aspect of the presently disclosed subject matter, a 3D application or given features of a 3D application can have a local mode and a remote mode. According to examples of the presently disclosed subject matter, in the local mode of a given feature most, including all, of the resources which are consumed by the feature of the 3D application reside locally or are mostly local features of the mobile communication device, and in the remote mode of the feature most, including all, of the resources which are consumed by the feature are local on a remote node (are external to the mobile communication device), e.g., most of the resources are in the cloud.

In one example, the 3D capture processor 16 or the device processor 9050 can be configured to determine which feature of a 3D application 80 to use in a given mode of the application, or whether to use a feature of a first mode of the 3D application or a feature of a second mode of the 3D application based on resource availability information relating to an availability or to a state of one or more resource of the mobile communication device, such battery power, processing power, memory resources, communication bandwidth, availability of remote processing, etc. Still further by way of example the decision regarding which feature to use in particular mode can be further based on one or more hardware cost parameters which are associated with the feature.

Figure 52:
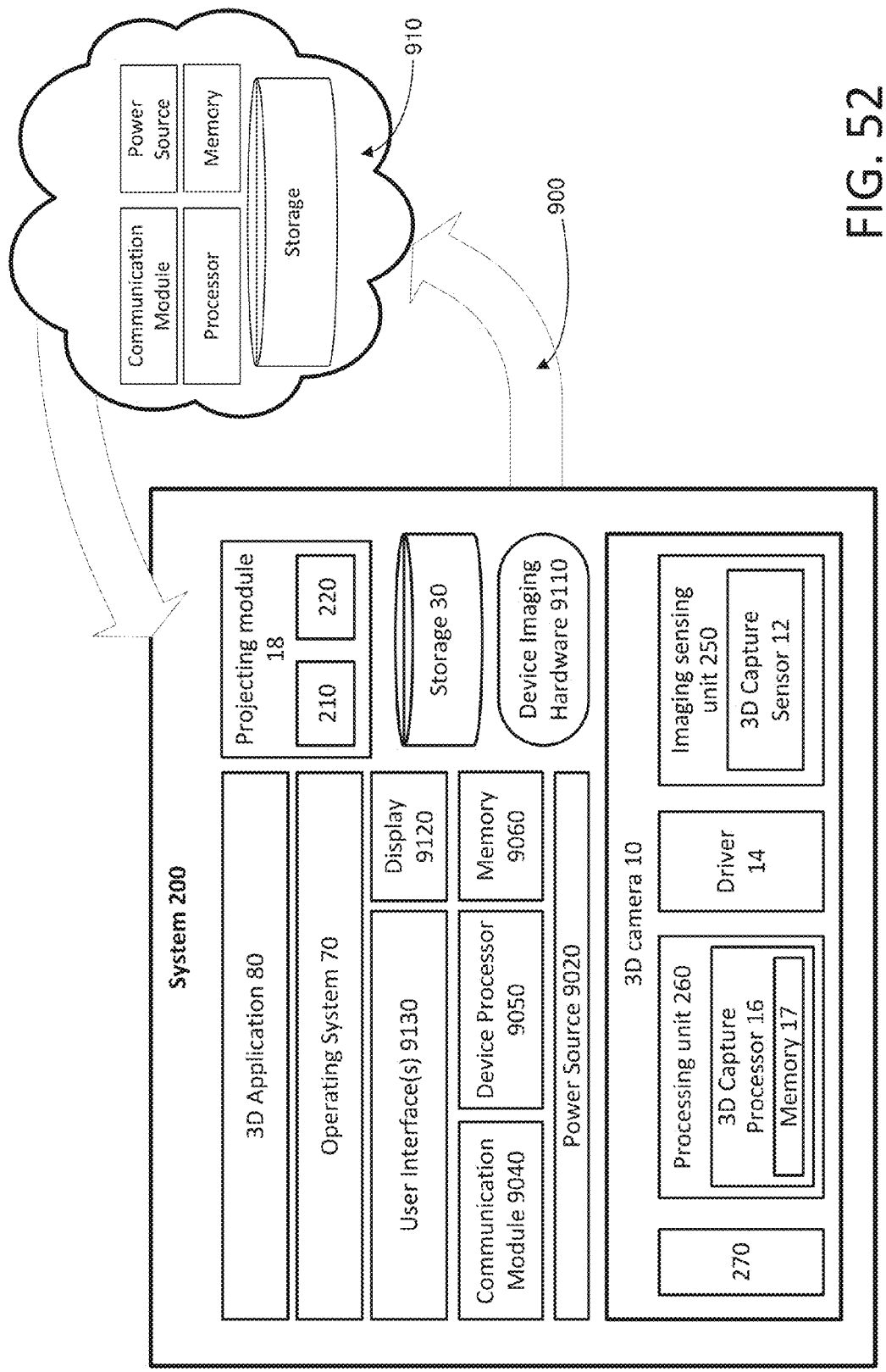
FIG. 52 is a block diagram illustration of a system according to examples of the presently disclosed subject matter, including support for a remote mode of a 3D capture application feature, in accordance with examples of the presently disclosed subject matter.

FIG. 52 is a block diagram illustration of a system according to examples of the presently disclosed subject matter, including support for a remote mode of a 3D capture application feature. As can be seen in FIG. 51, the system 900 includes a cloud platform 910, which includes resources that enable remote implementation of some or all of the process which are associated with a given feature of a 3D capture application.

Figure 56A:
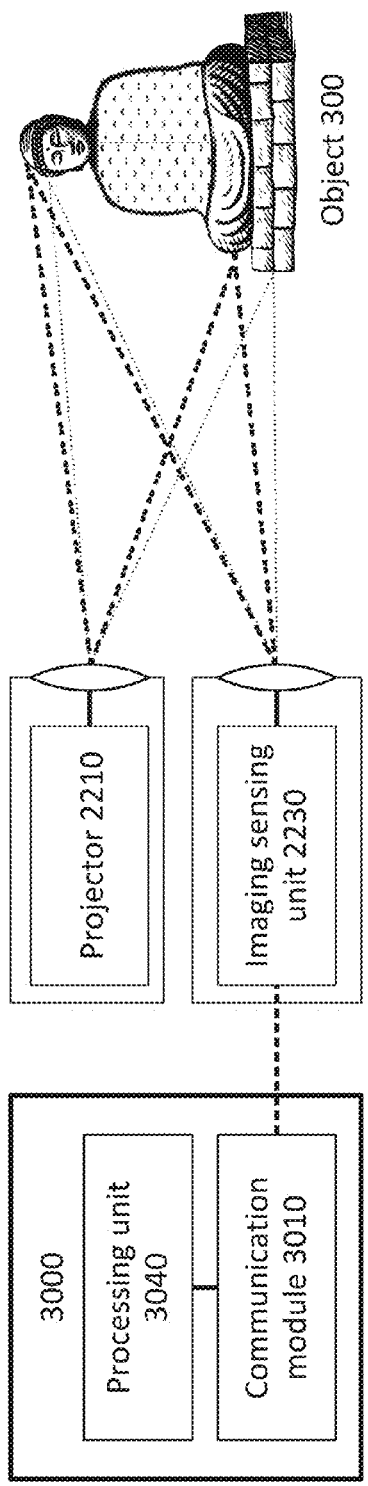
FIGS. 56A, 56B, and 56C are functional block diagrams illustrating examples of apparatus 3000 which is configured to obtain distance data of a scene which includes at least one object, in accordance with examples of the presently disclosed subject matter.
Figure 56B:
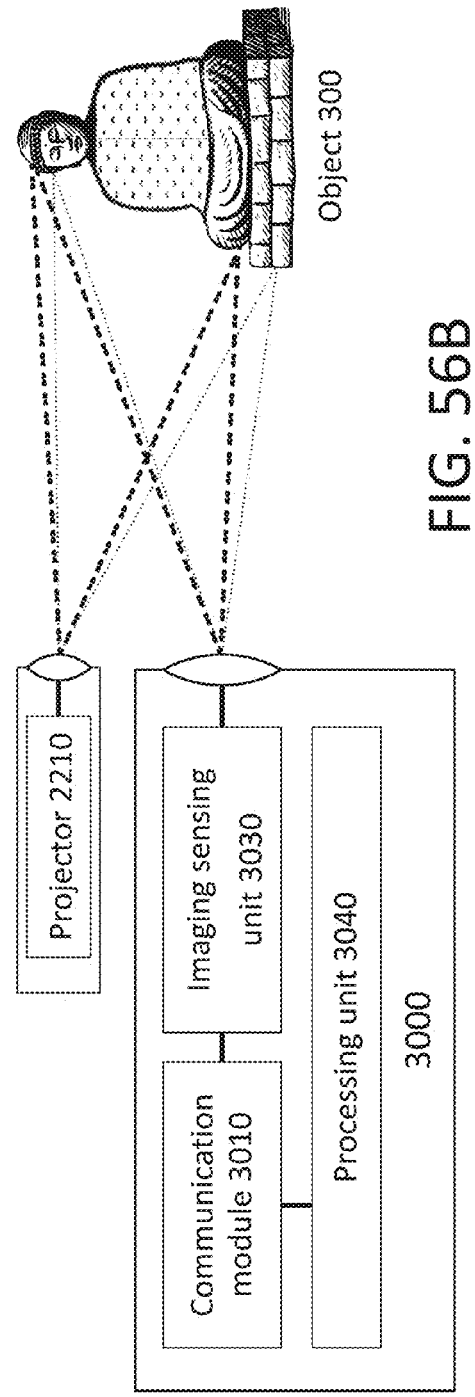
Figure 56C:
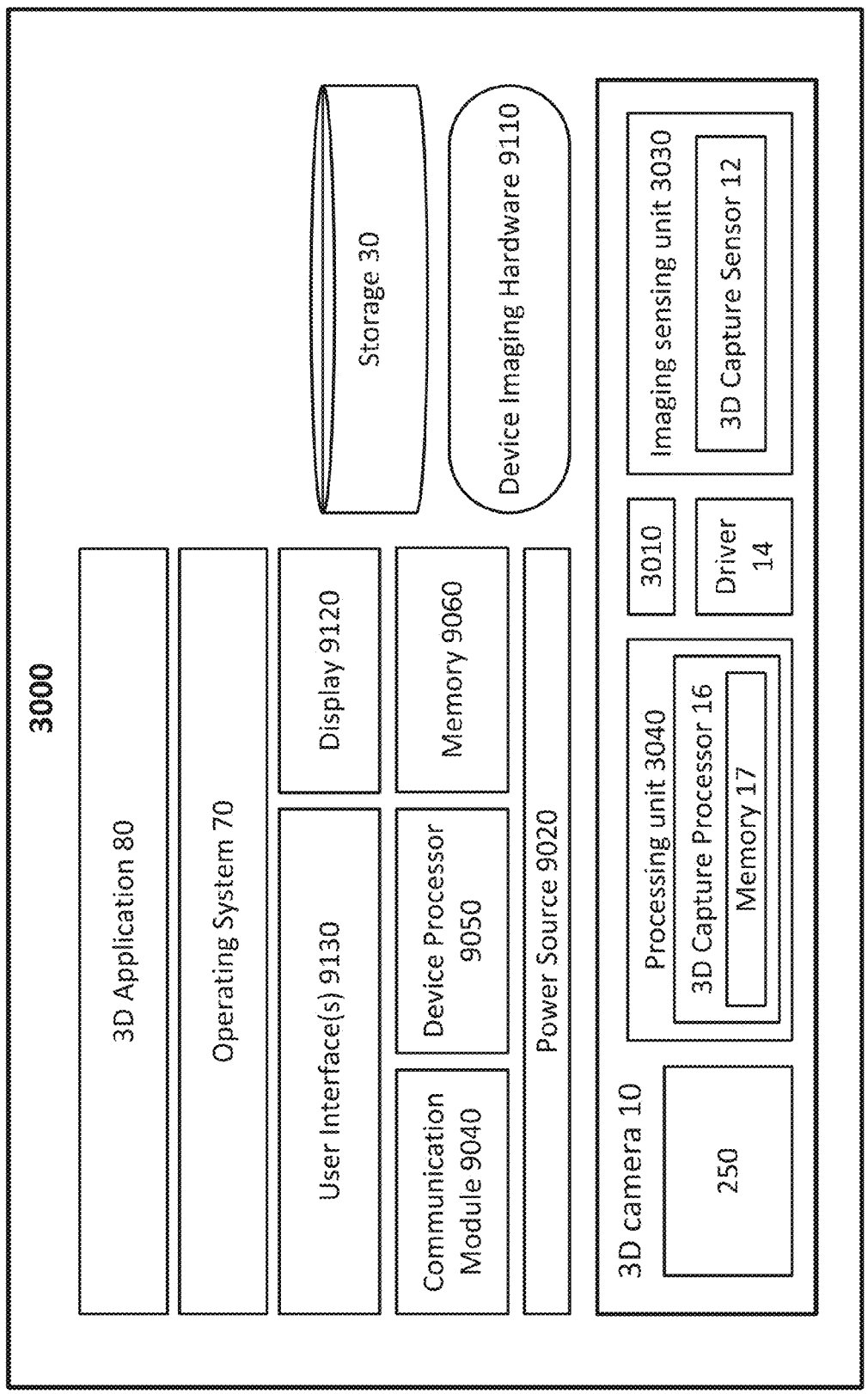

FIGS. 56A, 56B, and 56C are functional block diagrams illustrating examples of apparatus 3000 which is configured to obtain distance data of a scene which includes at least one object, in accordance with examples of the presently disclosed subject matter.

Apparatus 3000 includes communication interface 3010 which is operable to receive a first image in which the object is imaged with a first projection of a bi-dimensionally coded pattern is projected on the object, and a second image in which a second projection of the bi-dimensionally coded pattern is projected on the object, wherein the first projection and the second projection are rigidly shifted with respect to one another.

For example, communication module 3010 may be operable to receive the first image and the second image from an imaging sensing unit. The imaging sensing unit may be part of apparatus 3000 (i.e. optional imaging sensing unit 3030), or external to it (i.e. imaging unit 2230).

Communication module 3010 may be operable to receive the first image and the second image wirelessly, and/or over wired connection. Communication module 3010 is also configured to provide the first image and the second image to processing unit 3040. Optionally, communication module 3010 may be further configured to send information to the imaging sensing unit (e.g. for requesting image data to be provided) and/or to other systems or entities (e.g. for providing processing results or other information of processing unit 3040).

The first image and the second image may pertain to the same image (or images)—for example if the two projections are projected concurrently, but may also pertain to different images, e.g. if the first projection and the second projection are projected one after the other.

It is noted that any one of the patterns which are described above (either by an explicit visual example or by discussion of it properties) may be the bi-dimensionally coded light pattern which is projected onto object 300 during the acquisition of the first image and of the second imaged which are received by communication module 3010.

Apparatus 3000 also includes processing unit 3040, which is configured to process the first image and the second image to determine range parameters for the object.

It is noted that processing unit 3040 may implement each and every feature, capability, structure and variation of processing unit 240, mutatis mutandis. For reasons of brevity and clarity of the disclosure, it is noted that the elaborated disclosure of processing unit 240 is applicable also for processing unit 3040 of apparatus 3000, mutatis mutandis.

Referring to the examples set forth in the previous drawings, it is noted that processing unit 3040 may be configured to execute stage 530. Different embodiments of processing unit 3040 may implement the various disclosed variations of stage 530 even if not explicitly elaborated.

Optionally, apparatus 3000 further includes imaging sensing unit 3030 which is configured to capture the first image and the second image.

It is noted that imaging sensing unit 3030 may implement each and every feature, capability, structure and variation of imaging sensing unit 230, mutatis mutandis. For reasons of brevity and clarity of the disclosure, it is noted that the elaborated disclosure of imaging sensing unit 230 is applicable also for imaging sensing unit 3030 of apparatus 3000, mutatis mutandis.

Referring to the examples set forth in the previous drawings, it is noted that imaging sensing unit 3030 may be configured to execute stage 520. Different embodiments of imaging sensing unit 3030 may implement the various disclosed variations of stage 520 even if not explicitly elaborated.

Generally, imaging sensing unit 230 is operable and configured to capture one or more images of the object with the multiple projections of the bi-dimensionally coded light pattern projected thereon.

As aforementioned, any pattern described above—either explicitly or implicitly—with respect to system 200 and/or to method 500, may also be used as the pattern whose images are processed by apparatus 3000 (and especially by processing unit 3040).

Furthermore, any relationship between the first projection and the second projection of the a bi-dimensionally coded light pattern discussed with respect to system 200, to method 500, and/or to any one of the patterns, may also be used as a relationship between the projections whose images are processed by apparatus 3000. This pertains to spatial relationships, temporal relationships, color relationships, and any other relationship which may pertain between the two projections.

Referring to processing unit 3040, optionally processing unit 3040 is configured to: (a) obtain from the first image and from the second image a plurality of intensity value sets, each intensity value set comprising an intensity value from the first image and a spatially corresponding intensity value from the second image; (b) apply a predefined mathematical operation on the values of each of the intensity value sets, to provide an outcome value for each of the sets; and (c) determine the range parameters for the object based on a plurality of the outcome values.

While not necessarily so, the predefined mathematical operation used by processing unit 3040 in action (b) above may be selected from a group of mathematical operations consisting of: addition, subtraction, absolute value of subtraction and division.

Optionally, processing unit 3040 may be configured to: (a) compute, based on the plurality of the outcome values, high-accuracy information for at least one of: (i) a set of carrier elements of the first projection, and (ii) a set of payload elements of the first projection, wherein the high-accuracy information having a data type selected from a group of data types consisting of: high accuracy location information and high accuracy color information; and to (b) determine the range parameters for the object based on the high accuracy information.

Optionally, processing unit 3040 may be configured to: (a) obtain coding states from the first image and from the second image; (b) generate a plurality of coding states sets, each coding state set including a coding state of a feature element of the first set from the first image and a coding state of a spatially corresponding feature element of the first set from the second image; (c) process the coding states of each of the coding states sets, to provide an outcome value for each of the coding state sets; and (d) determine the range parameters for the object based on a plurality of the outcome values.

Optionally, processing unit 3040 may be configured to apply as part of action (c) of the previous paragraph a predefined mathematical operation which is selected from a group of mathematical operations consisting of: addition, subtraction, absolute value of subtraction and division.

Optionally, processing unit 3040 may be configured to generate an outcome image in which the color of each pixel is based on the outcome value of a corresponding coding states set; and to determine the range parameters for the object based on the outcome image; wherein the outcome image is characterized in at least one of the following qualities: (a) locations of the first feature elements are resolvable in sub-pixel accuracy; (b) locations of the second feature elements are resolvable in sub-pixel accuracy; (c) edges in the bi-dimensionally coded light pattern are resolvable in sub-pixel accuracy; (d) borders between feature elements are resolvable in sub-pixel accuracy; (e) a plurality of pixels are associated with positive outcome values and a plurality of pixels are associated with negative outcome values.

It is noted that while apparatus 3000 was discussed as using two projections of a single a bi-dimensionally coded light pattern for determining range parameters, more than two projections of the a bi-dimensionally coded light pattern may be used (similarly to what is discussed with respect to system 200 and/or to method 500).

Furthermore, while apparatus 3000 was discussed as using two projections of a single a bi-dimensionally coded light pattern for determining range parameters, other light patterns (e.g. uniform light, etc.) may be used in addition to two or more projections of the a bi-dimensionally coded light pattern (similarly to what is discussed with respect to system 200 and/or to method 500).

Referring to FIG. 56C, it is noted that components of apparatus 3000 other than units 3010, 3030 and 3040 are numbered using numeral references identical to those used in FIGS. 51 and 52. As aforementioned, the identical reference numerals are repeated among the figures to indicate corresponding or analogous elements. The components of FIG. 56C (other than components 3010, 3030 and 3040) have corresponding and analogous structure and functionality to the corresponding components discussed with respect to FIGS. 51 and 52.

FIGS. 57A and 57B are flow charts illustrating examples of method 4500, in accordance with examples of the presently disclosed subject matter. Method 4500 is a method for computing range information for an object.

Referring to the examples set forth in the previous drawings, method 4500 may be carried out by apparatus 3000 and/or by system 200. Different embodiments of apparatus 3000 and/or system 200 may implement the various disclosed variations of method 4500 even if not explicitly elaborated. Likewise, different embodiments of method 4500 may include stages whose execution fulfills the various disclosed variations of apparatus 3000 and/or system 200, even if succinctness and clarity of description did not necessitate such repetition.

Method 4500 includes at least stage 525 and stage 530 (which was discussed in details with respect to method 500). Stage 525 includes receiving a first image in which an object is imaged with the first projection of a coded light pattern projected thereon, and second image in which the object is imaged with the second projection of the coded light pattern projected thereon. These first projection and second projection are being rigidly shifted with respect to one another. Referring to the examples set forth with respect to the previous drawings, stage 525 may be executed by communication module 3010. It is noted that optionally, referring to the examples set forth with respect to the previous drawings, stage 525 may also be considered to be executed by processing unit 3040.

Stage 530 includes, as aforementioned, processing the first image and the second image to determine range parameters for the object. The whole discussion of various variations and substages of stage 530 offered above with respect to method 500 is also applicable to method 4500. Referring to the examples set forth with respect to the previous drawings of apparatus 3000, stage 530 may be executed by processing unit 3040.

Optionally, method 4500 may also include, prior to stage 525, stage 520 of collecting light reflected from the object to provide: the first image in which the object is imaged with the first projection of the bi-dimensionally coded light pattern projected thereon, and the second image in which the object is imaged with the second projection of the bi-dimensionally coded light pattern projected thereon. As aforementioned, these first projection and second projection are being rigidly shifted with respect to one another.

A program storage device which is readable by machine is further disclosed, the program storage device tangibly embodies a program of instructions executable by the machine to perform method for computing range information for an object. While not necessarily so, the program of instructions may include instructions for the execution of method 4500.

The program storage device is readable by machine, and it tangibly embodies the program of instructions executable by the machine to perform method for computing range information for an object, which includes the steps of:

a. collecting light reflected from the object to provide: a first image in which the object is imaged with a first projection of a bi-dimensionally coded light pattern projected thereon, and second image in which the object is imaged with the second projection of the bi-dimensionally coded light pattern projected thereon; wherein the first projection and the second projection are rigidly shifted with respect to one another; and b. processing the first image and the second image to determine range parameters for the object.

Optionally, the bi-dimensionally coded light pattern is coded using discrete coding.

Optionally, the processing includes:

a. obtaining from the first image and from the second image a plurality of intensity value sets, each intensity value set including an intensity value from the first image and a spatially corresponding intensity value from the second image;

b. applying a predefined mathematical operation on the values of each of the intensity value sets, to provide an outcome value for each of the sets; and c. determining the range parameters for the object based on a plurality of the outcome values.

Optionally, the predefined mathematical operation is selected from a group of mathematical operations consisting of: addition, subtraction, absolute value of subtraction and division.

Optionally, the processing includes:

a. computing, based on the plurality of the outcome values, high-accuracy information for at least one of: (a) a set of carrier elements of the first projection, and (b) a set of payload elements of the first projection, wherein the high-accuracy information having a data type selected from a group of data types consisting of: high accuracy location information and high accuracy color information; and b. determining the range parameters for the object based on the high accuracy information.

Optionally, the rigid shift between the first projection and the second projection is not parallel to any coding direction of the bi-dimensionally coded light pattern.

Optionally, each of the first projection and the second projections includes a plurality of feature types, where each feature type is formed by a unique formation of feature elements from a first set of feature elements and from a second set of feature elements; and in each pair out of a plurality of pairs of spatially overlapping feature types in the first and second projections, the feature elements of the second set of feature elements from the feature type in the first projection have a coding state that is different than a coding state of the feature elements of the second set of feature elements from a respective feature type of the second projection.

Optionally, each feature type is formed by a unique formation of feature elements from the first set of feature elements, from the second set of feature elements, and from at least one additional set of feature elements, other than the first set and the second set.

Optionally, in each pair out of the plurality of pairs of spatially overlapping feature types in the first and second projections, the feature elements of the second set of feature elements from the feature type in the first projection are an inverse of the corresponding feature elements of the second set of feature elements from a respective feature type of the second projection.

Optionally, in each pair out of the plurality of pairs, for each feature element from the first set of feature elements that is included in the feature type of the first projection, an inverse of the feature element is included in the feature type of the second projection.

Optionally, the rigid shift between the first projection and the second projection provides a desired relation among the feature elements in the feature types in each of the plurality of pairs.

Optionally, the rigid shift between the first projection and the second projection causes feature elements from the first set of feature elements to appear as inverse feature elements in the second projection.

Optionally, for each group of feature elements of the first set out of a plurality of groups of adjacent feature elements of the first set in the bi-dimensionally coded light pattern, the group of feature elements is decodable to provide information indicative of location of the group of feature elements in the bi-dimensionally coded light pattern.

Optionally, a plurality of subgroups of feature elements of the first set may be processed to detect one or more feature elements of the second set.

Optionally, each feature element of the first set in the second projection at least partly overlap a corresponding first feature element in the first projection.

Optionally, the processing includes:

a. obtaining coding states from the first image and from the second image;

b. generating a plurality of coding states sets, each coding state set including a coding state of a first feature element from the first image and a coding state of a spatially corresponding first feature element from the second image;

c. processing the coding states of each of the coding states sets, to provide an outcome value for each of the coding state sets; and d. determining the range parameters for the object based on a plurality of the outcome values.

The program storage device according to claim 96, wherein the processing includes applying a predefined mathematical operation which is selected from a group of mathematical operations consisting of: addition, subtraction, absolute value of subtraction and division.

Optionally, the program of instructions further includes instructions executable by the machine to perform: generating an outcome image in which the color of each pixel is based on the outcome value of a corresponding coding states set; wherein the determining includes determining the range parameters for the object based on the outcome image; wherein the outcome image is characterized in at least one of the following qualities: (a) locations of the first feature elements are resolvable in sub-pixel accuracy; (b) locations of the second feature elements are resolvable in sub-pixel accuracy; (c) edges in the bi-dimensionally coded light pattern are resolvable in sub-pixel accuracy; (d) borders between feature elements are resolvable in sub-pixel accuracy; (e) a plurality of pixels are associated with positive outcome values and a plurality of pixels are associated with negative outcome values.

Optionally, the program of instructions further includes instructions executable by the machine to perform: controlling a projection onto the object of the first projection of the bi-dimensionally coded light pattern and of the second projection of the bi-dimensionally coded light pattern. Referring to the examples set forth with respect to the previous drawings, the controlling of the projection may include controlling an operation of projector 210 and/or external projector 2210.

Optionally, the program of instructions further includes instructions executable by the machine to perform: controlling collection of light reflected from the object to provide the first image the second image. Referring to the examples set forth with respect to the previous drawings, the controlling of the collection may include controlling an operation of imaging sensing unit 230, 1230, and/or 3030.

The program of instructions is such which makes a computer to execute a method for computing range information for an object. While not necessarily so, the program of instructions may be such which makes a computer to execute method 4500.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It will be appreciated that the embodiments described above are cited by way of example, and various features thereof and combinations of these features can be varied and modified.

While various embodiments have been shown and described, it will be understood that there is no intent to limit the invention by such disclosure, but rather, it is intended to cover all modifications and alternate constructions falling within the scope of the invention, as defined in the appended claims.

What is claimed is:

1. A system, comprising:
    a projector operable to project onto a scene a first projection of a bi-dimensionally coded pattern comprising a plurality of feature types in a first projection and the projector is operatable to project onto the scene a second projection of the bi-dimensionally coded pattern, such that the first projection and the second projection are a predefined rigid transformation with respect to one another, giving rise to a first set of feature types in the first projection of the pattern and a corresponding second set of feature types in the second projection of the pattern, and wherein each one of the feature types from the second set of feature types spatially overlaps with a respective feature type from the first set of feature types forming a respective plurality of overlapping feature type pairs;
    at least one image sensor configured to capture at least a first image of a reflected portion of the first projection and a second image of a reflected portion of the second projection;
    at least one processor configured to apply a predefined mathematical operation between the first image and the second image to compute a derived image;
    the at least one processor is configured to extract from the derived image a plurality of product values, wherein each one of the product values is a result of the application of the predefined mathematical operation over an area of the first and second images that is associated with a respective pair of overlapping feature types from the plurality of overlapping feature type pairs;
    the at least one processor is configured to extract depth information for the scene using the plurality of product values and the first image, the second image or both.

2. The system according to claim 1, wherein each pair of overlapping feature types from the plurality of overlapping feature type pairs, comprises a first feature type from the first projection, and a second feature type from the second projection, and the first feature type and the second feature type of each pair are different bi-dimensional formations.

3. The system according to claim 2, wherein in a pair of overlapping feature types, a feature element of the feature type from the first projection has a coding state that is different than a coding state of a corresponding feature element of the feature type from the second projection.

4. The system according to claim 3, wherein in a pair of overlapping feature types, the feature element of the feature type from said first projection and the corresponding feature element of the feature type from said second projection have inverse coding states.

5. The system according to claim 1, further comprising:
    a light coding element configured to provide the bi-dimensionally coded pattern; and
    a projection shifter operable to shift the light coding element between at least a first and a second state, wherein the projector is configured to project the first projection of the bi-dimensionally coded light pattern onto the object when the light coding element is in the first state, and to project the second projection of the bi-dimensionally coded light pattern onto the object when the light coding element is in the second state.

6. The system according to claim 5, wherein the light coding element is a transparency mask.

7. The system according to claim 1, wherein the bi-dimensionally coded light pattern is coded using discrete coding.

8. The system according to claim 1, wherein the system comprises:
    a light source which comprises an emitters array comprising a plurality of individual emitters, each of the individual emitters capable of generating a beam of light, and
    wherein the at least one processor is configured to control activation of at least a first subgroup and a second subgroup of emitters of the emitters array, and the at least one processor is configured to activate the first subgroup of emitters to project the first projection, and the at least one processor is configured to activate the second subgroup of emitters to project the second projection.

9. The system according to claim 8, further comprising a light coding element, and wherein the light coding element is a diffractive optical element.

10. The system according to claim 1, wherein the bi-dimensionally coded light pattern is an intensity coded light pattern, and wherein each feature type of the coded light pattern comprises one or more carrier location in which bright or dim intensities give rise to a carrier signal, and at least one payload locations in which bright or dim intensities give rise to a spatial coding signal;

wherein the first projection and the second projection are a predefined rigid transformation with respect to one another, so that carrier locations of feature types in the first projection at least partly overlap carrier locations of respective feature types in the second projection, and so that payload locations of feature types in the first projection at least partly overlap payload locations of respective feature types in the second projection;

wherein for each one of the overlapping feature type pairs, bright and dim intensities are inverted in overlapping locations of the overlapping feature type pair in at least one of the carrier locations or in at least one of the payload locations.

11. The system according to claim 10, wherein the predefined mathematical operation is selected from a group of mathematical operations consisting of: addition, subtraction, absolute value of subtraction and division.

12. The system according to claim 10, wherein the processing unit is configured to:

compute, based on the plurality of the product values, information for at least one of: (a) a set of carrier elements of the first projection, and (b) a set of payload elements of the first projection, wherein the computed information having a data type selected from a group of data types consisting of: location information and color information; and determine the range parameters for the object based on the computed information.

13. The system according to claim 1, where the predefined rigid transformation associated with the first projection and the second projection is not parallel to any coding direction of the bi-dimensionally coded light pattern.

14. The system according to claim 1, wherein in each pair of the plurality of pairs of spatially overlapping feature types in the first and second projections, each feature element of a feature type in the first projection is an inverse of a corresponding feature element of a respective feature type in the second projection.

15. A method of computing range information, comprising:

providing a bi-dimensionally coded light pattern comprising a plurality of feature types;

projecting onto a scene a first projection of the bi-dimensionally coded light pattern and a second projection of the bi-dimensionally coded light pattern, such that the first projection and the second projection are a predefined rigid transformation with respect to one another, giving rise to a first set of feature types in the first projection of the pattern and a corresponding second set of feature types in the second projection of the pattern, and wherein each one of the feature types from the second set of feature types overlaps with a respective feature type from the first set of feature types forming a respective plurality of overlapping feature type pairs;

obtaining a first image of a reflected portion of the first projection of the bi-dimensionally coded light pattern, and a second image of a reflected portion of the second projection of the bi-dimensionally coded light pattern; and applying a predefined mathematical operation between the first image and the second image to compute a derived image;

extracting from the derived image a plurality of product values, wherein each one of the product values is a result of the application of the predefined mathematical operation over an area of the first and second images that is associated with a respective pair of overlapping feature types from the plurality of overlapping feature type pairs;

extracting range parameters for the scene using the plurality of product values and the first image, the second image or both.

16. The method according to claim 15, wherein the bi-dimensionally coded light pattern is coded using discrete coding.

17. The method according to claim 15, wherein the processing comprises:

obtaining from the first image and from the second image a plurality of intensity value sets, each intensity value set comprising an intensity value from the first image and a spatially corresponding intensity value from the second image;

applying a predefined mathematical operation on the values of each of the intensity value sets, to provide a product value for each of the intensity sets; and determining range parameters based on a plurality of product values and the first image, the second image or both.

18. The method according to claim 15, wherein the predefined mathematical operation is selected from a group of mathematical operations consisting of: addition, subtraction, absolute value of subtraction and division.

19. The method according to claim 17, further comprising:

computing, based on the plurality of the outcome values information for at least one of: (a) a set of carrier elements of feature types in the first projection, and (b) a set of payload elements of feature types in the first projection, wherein the information is selected from a group of data types consisting of: location information and color information, and wherein the information is at a greater resolution relative to respective information that is extracted using respective methods from any one of the first or the second images alone; and determining the range parameters for the object based on the computed outcome values.

20. The method according to claim 15, wherein the predefined rigid transformation is not parallel to any coding direction of the bi-dimensionally coded light pattern.

21. The method according to claim 15, wherein each of the first projection and the second projection includes a plurality of feature types, each feature type is formed by a different formation of feature elements from a first set of feature elements and from a second set of feature elements; and wherein in each pair of the plurality of pairs of spatially overlapping feature types, the feature elements of the second set of feature elements from the feature type in the first projection have a coding state that is different to a coding state of the feature elements of the second set of feature elements from a respective feature type of the second projection.

22. The method according to claim 21, wherein in each pair of the plurality of pairs of spatially overlapping feature types in the first and second projections, the feature elements of the second set of feature elements from the feature type in the first projection are an inverse of the corresponding feature elements of the second set of feature elements from a respective feature type of the second projection.

23. The method according to claim 21, wherein in each pair of the plurality of pairs of spatially overlapping feature types in the first and second projections, for each feature element from the first set of feature elements that is included in the feature type of the first projection, an inverse of the feature element is included in the feature type of the second projection.

24. The method according to claim 21, wherein the predefined rigid transformation causes feature elements from the first set of feature elements to appear as inverse feature elements in the second projection.

25. An apparatus for providing a bi-dimensional coded light pattern on a scene, comprising:
a light source;
a light coding element configured to provide the bi-dimensionally coded light pattern comprising a plurality of feature types when illuminated by the light source; and
a projection shifter operable to shift between a first projection of the bi-dimensionally coded pattern and a second projection of the bi-dimensionally coded pattern, wherein the first projection and the second projection are a predefined rigid transformation with respect to one another, and under the predefined rigid transformation a first set of feature types in the first projection of the pattern and a corresponding second set of feature types in the second projection of the pattern are formed, and wherein each one of the feature types from the second set of feature types spatially overlaps with a respective feature type from the first set of feature types forming a respective plurality of overlapping feature type pairs;
at least one image sensor configured to capture at least a first image of a reflected portion of the first projection and a second image of a reflected portion of the second projection;
at least one processor configured to apply a predefined mathematical operation between the first image and the second image to compute a derived image;
the at least one processor is configured to extract from the derived image a plurality of product values, wherein each one of the product values is a result of the application of the predefined mathematical operation over an area of the first and second images that is associated with a respective pair of overlapping feature types from the plurality of overlapping feature type pairs;
the at least one processor is configured to extract depth information for the scene using the plurality of product values and the first image, the second image or both.

26. The apparatus according to claim 25, wherein in a pair of overlapping feature types, the feature element of the feature type from the first projection has a coding state that is different to a coding state of the corresponding feature element of the feature type from the second projection.

27. The apparatus according to claim 26, wherein in a pair of overlapping feature types, the feature element of the feature type from said first projection and the corresponding feature element of the feature type from said second projection have inverse coding states.

28. The apparatus according to claim 25, wherein the bi-dimensionally coded light pattern is coded using discrete coding.

29. The apparatus according to claim 25, wherein the projection shifting module is operable to shift the light coding element between at least a first and a second state, wherein the apparatus is configured to project the first projection of the bi-dimensionally coded light pattern onto the object when the light coding element is in the first state, and to project the second projection of the bi-dimensionally coded light pattern onto the object when the light coding element is in the second state.

30. The apparatus according to claim 29, wherein the light coding element is a transparency mask.

31. The apparatus according to claim 25, wherein the light source comprises an emitters array comprising a plurality of individual emitters, each of the individual emitters capable of generating a beam of light, and wherein the at least one processor is configured to control activation of at least a first subgroup and a second subgroup of emitters of the emitters array, and the at least one processor is configured to activate the first subgroup of emitters to project the first projection, and the at least one processor is configured to activate the second subgroup of emitters to project the second projection.

32. The apparatus according to claim 31, wherein the light coding element is a diffractive optical element.

33. The apparatus according to claim 25, wherein the bi-dimensionally coded light pattern is an intensity coded light pattern, and wherein each feature type of the coded light pattern comprises at least one carrier location in which bright or dim intensities give rise to a carrier signal, and at least one payload location, in which bright or dim intensities give rise to a spatial coding signal;
wherein the first projection and the second projection are a predefined rigid transformation with respect to one another so that carrier locations of feature types in the first projection at least partly overlap carrier locations of respective feature types in the second projection, and so that payload locations of feature types in the first projection at least partly overlap payload locations of respective feature types in the second projection;
wherein for each one of the overlapping feature type pairs, bright and dim intensities are inverted in overlapping locations of the overlapping feature type pairs in at least one of the carrier locations or in at least one of the payload locations.

34. The apparatus according to claim 25, wherein the projection shifting module is configured such that the predefined rigid transformation is not parallel to any coding direction of the bi-dimensionally coded light pattern.

35. The apparatus according to claim 25,
wherein each of the first projection and the second projection includes a plurality of feature types, each feature type is formed by a unique formation of feature elements from a first set of feature elements and from a second set of feature elements; and
wherein in each pair of the plurality of pairs of spatially overlapping feature types, the feature elements of the second set of feature elements from the feature type in the first projection have a coding state that is different to a coding state of the feature elements of the second set of feature elements from a respective feature type of the second projection.

36. The apparatus according to claim 35, wherein in each pair of the plurality of pairs of spatially overlapping feature types in the first and second projections, the feature elements of the second set of feature elements from the feature type in the first projection are an inverse of the corresponding feature elements of the second set of feature elements from a respective feature type of the second projection.

37. The apparatus according to claim 35, wherein in each pair of the plurality of pairs of spatially overlapping feature types in the first and second projections, for each feature element from the first set of feature elements that is included in the feature type of the first projection, an inverse of the feature element is included in the feature type of the second projection.

38. The apparatus according to claim 35, wherein the predefined rigid transformation causes feature elements from the first set of feature elements to appear as inverse feature elements in the second projection.

* * * * *